O. THIEME.
CALCULATING MACHINE.
APPLICATION FILED AUG. 1, 1916.

1,317,604.

Patented Sept. 30, 1919.
38 SHEETS—SHEET 1.

Witnesses;
J. Adolph Bishop
Wm. Janus

Inventor;
Otto Thieme,
By F. R. Cornwall
Atty.

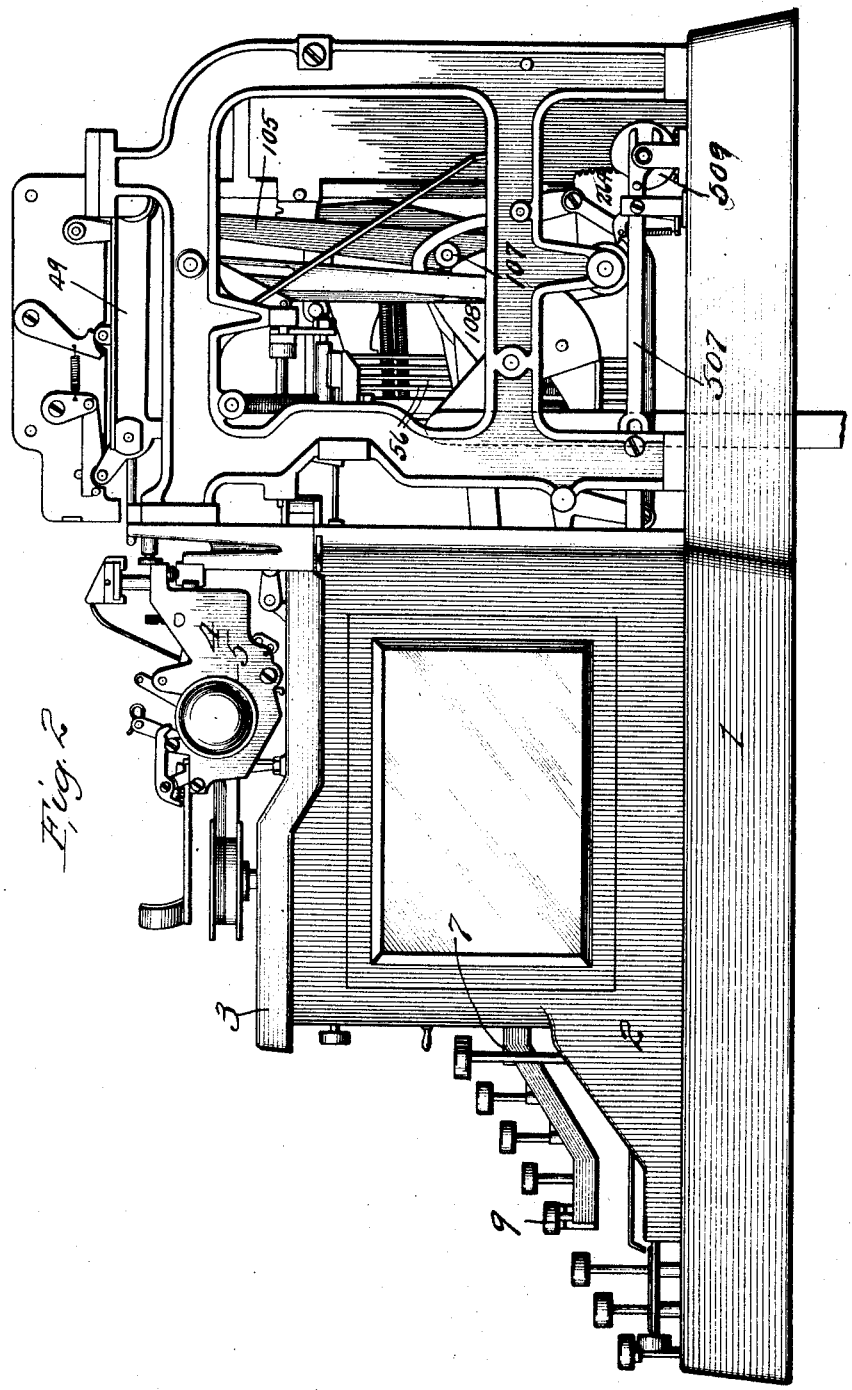

O. THIEME.
CALCULATING MACHINE.
APPLICATION FILED AUG. 1, 1916.
1,317,604.
Patented Sept. 30, 1919.
38 SHEETS—SHEET 3.
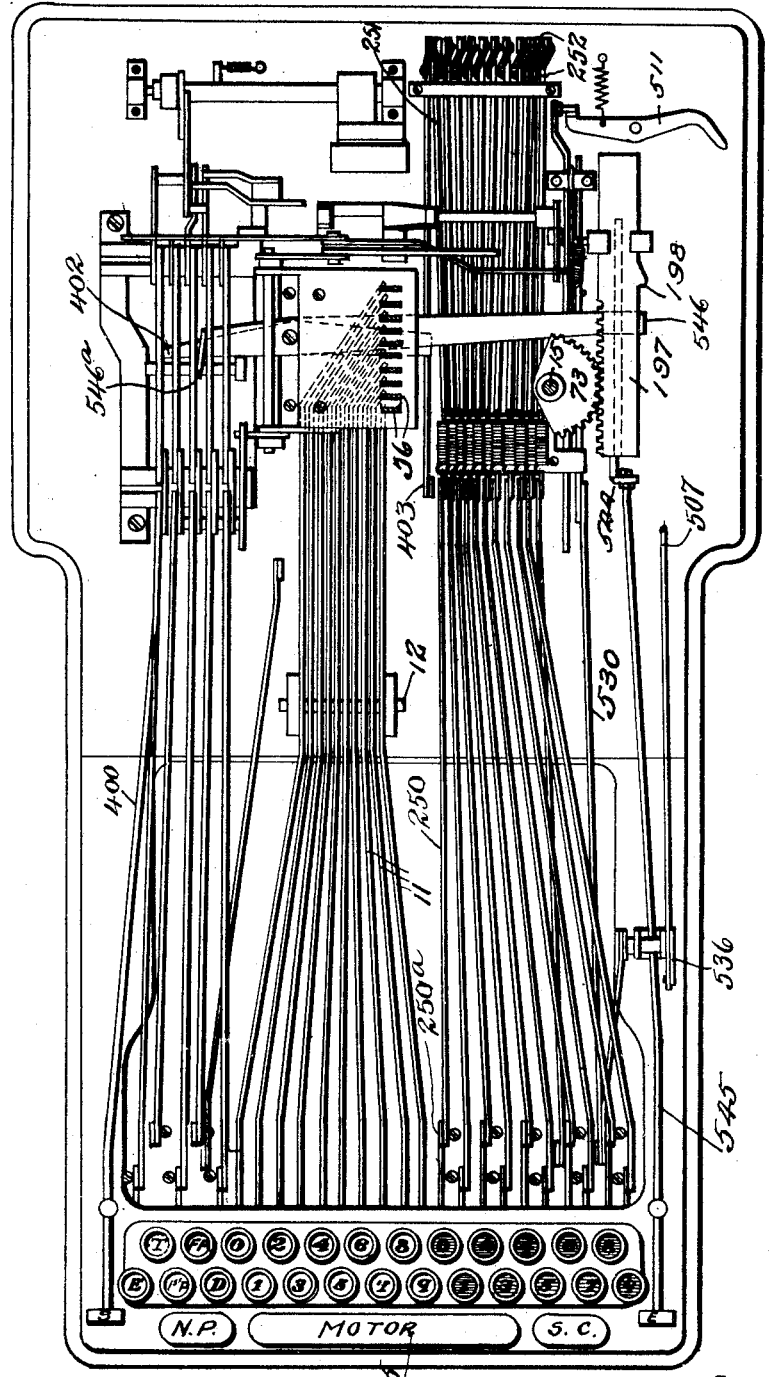

O. THIEME.
CALCULATING MACHINE.
APPLICATION FILED AUG. 1, 1916.
1,317,604.
Patented Sept. 30, 1919.
38 SHEETS—SHEET 4.
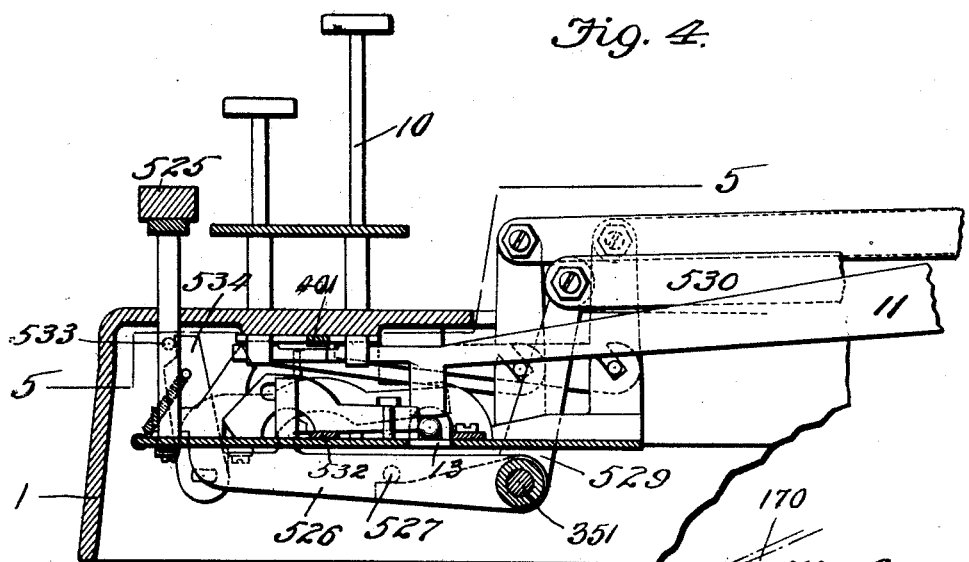
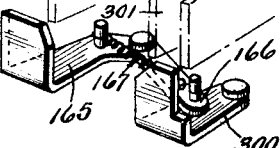
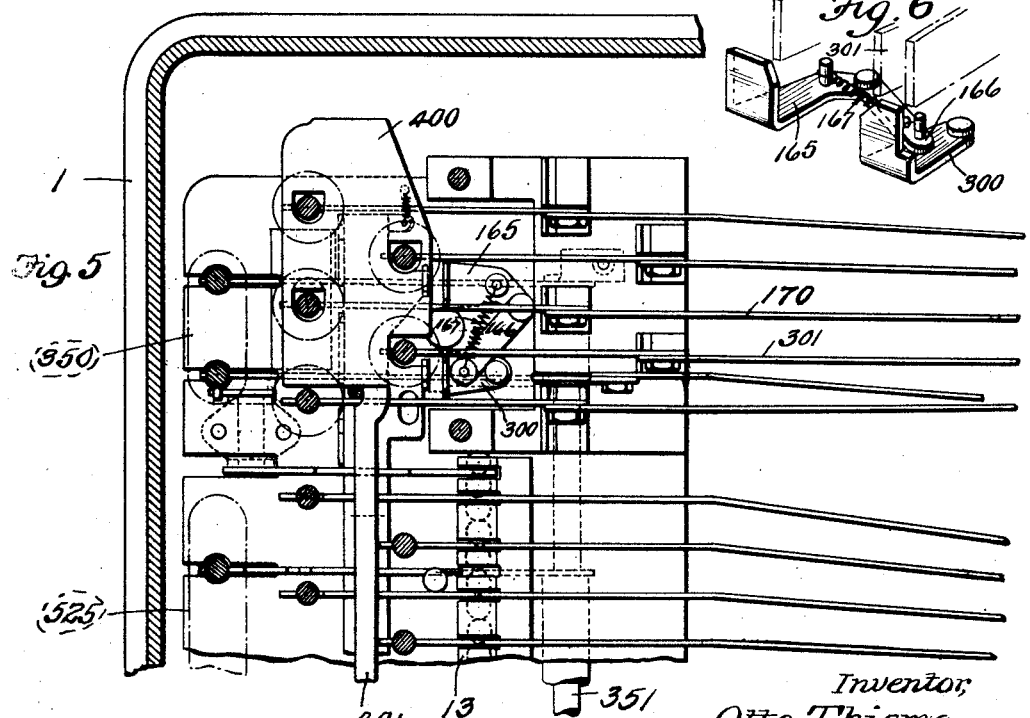
Inventor,
Otto Thieme,
Witnesses;

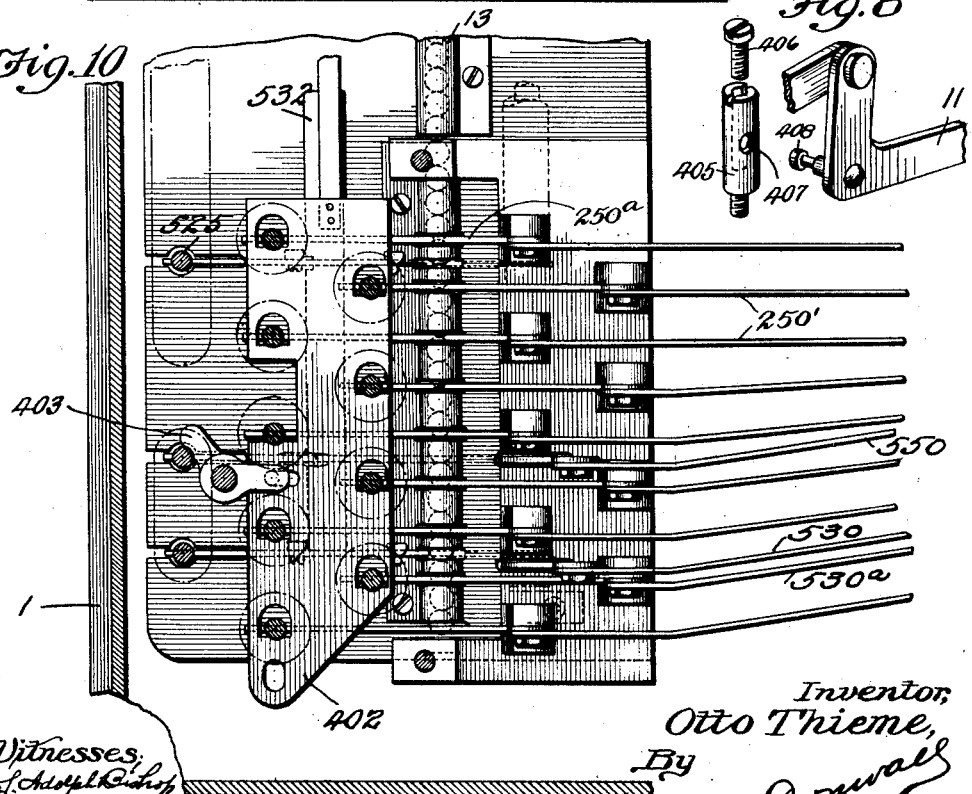

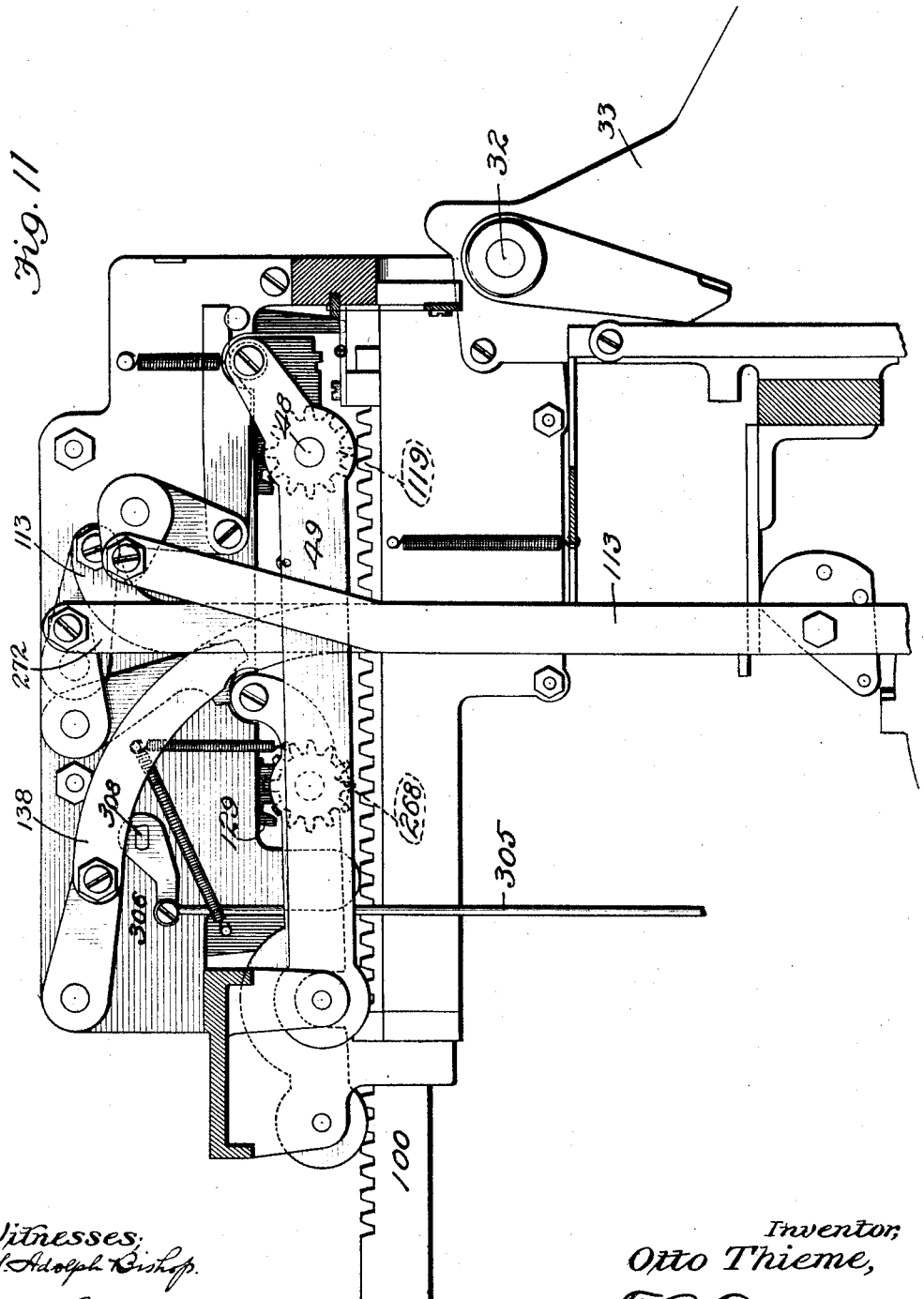

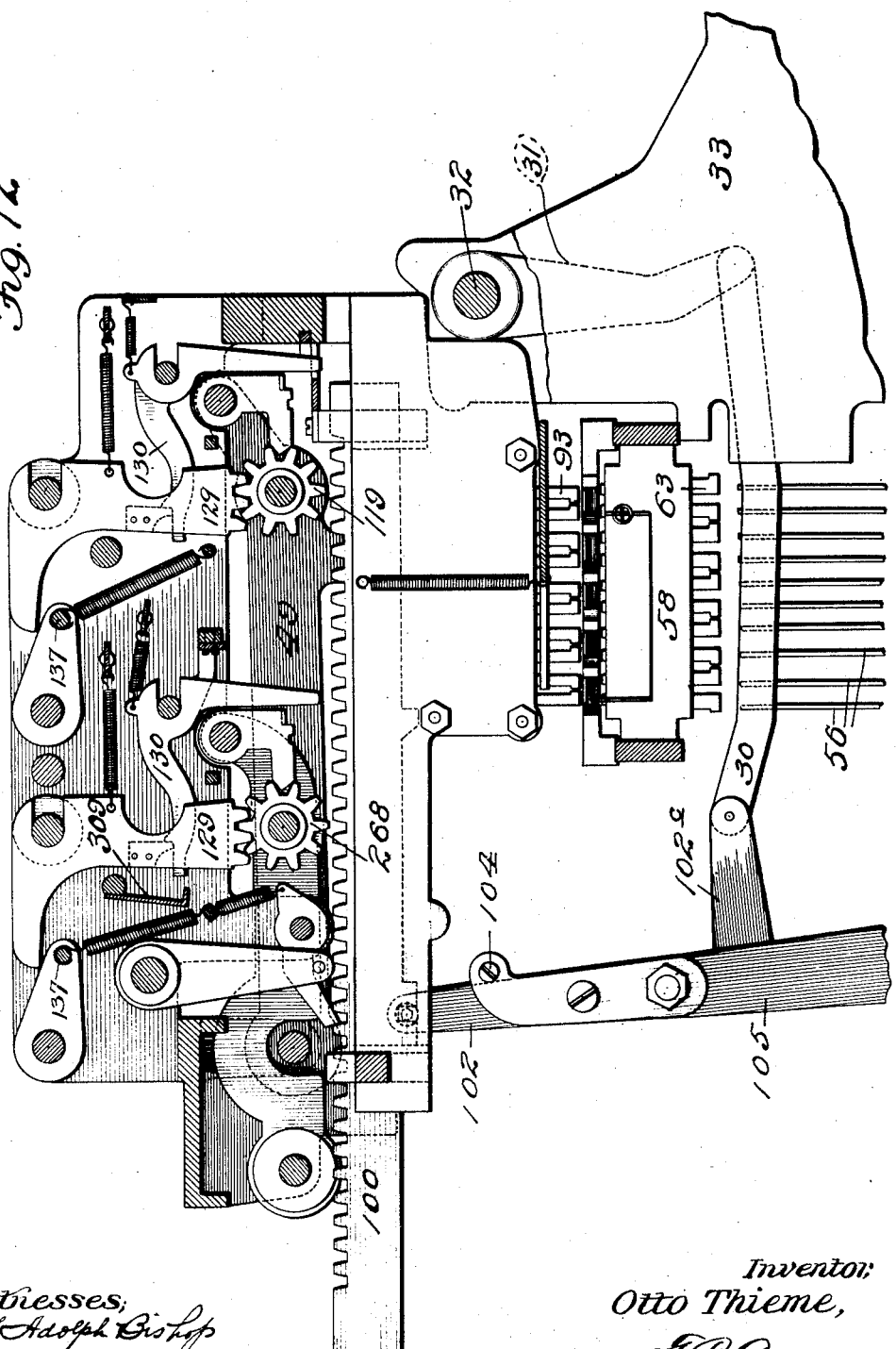

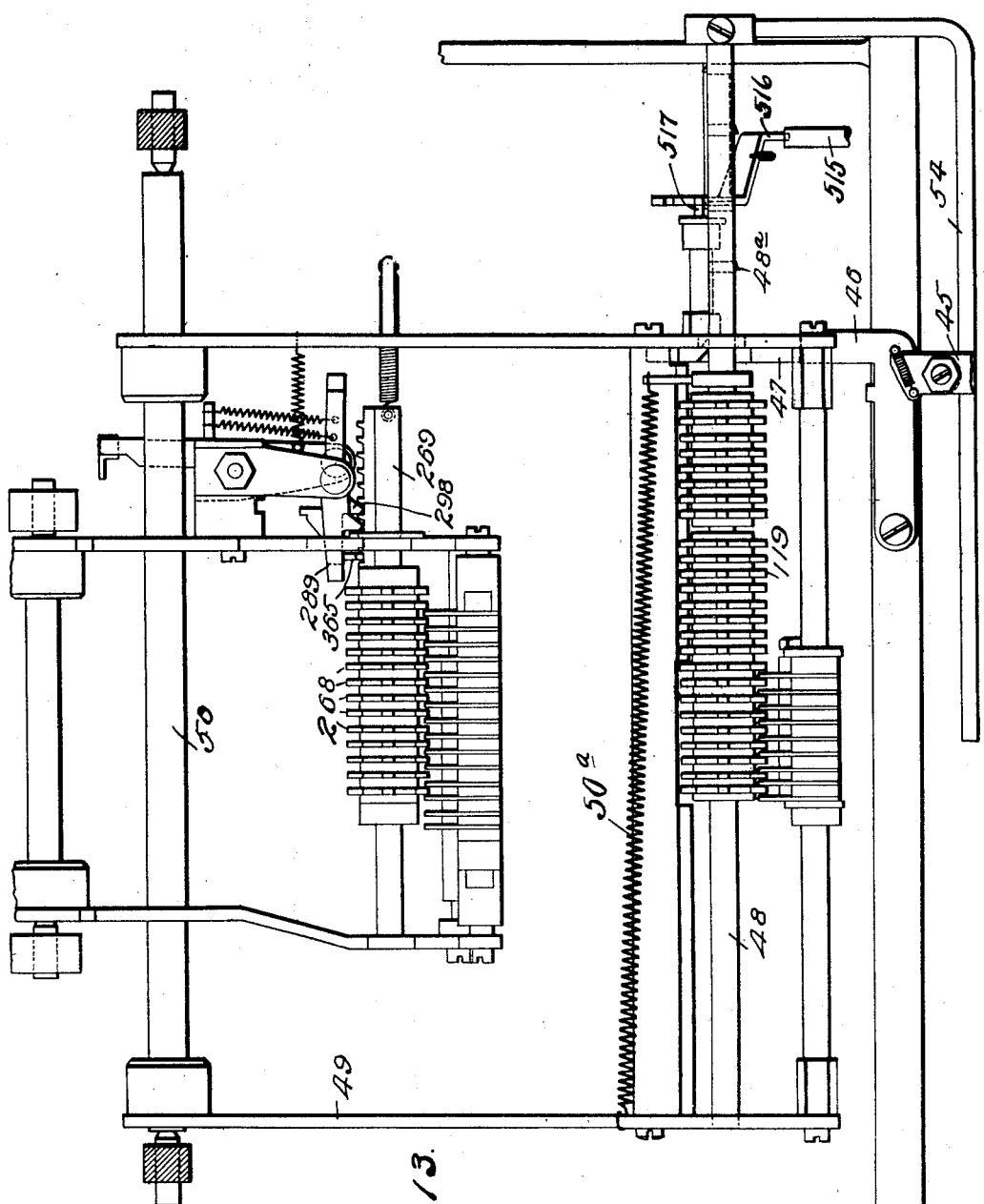

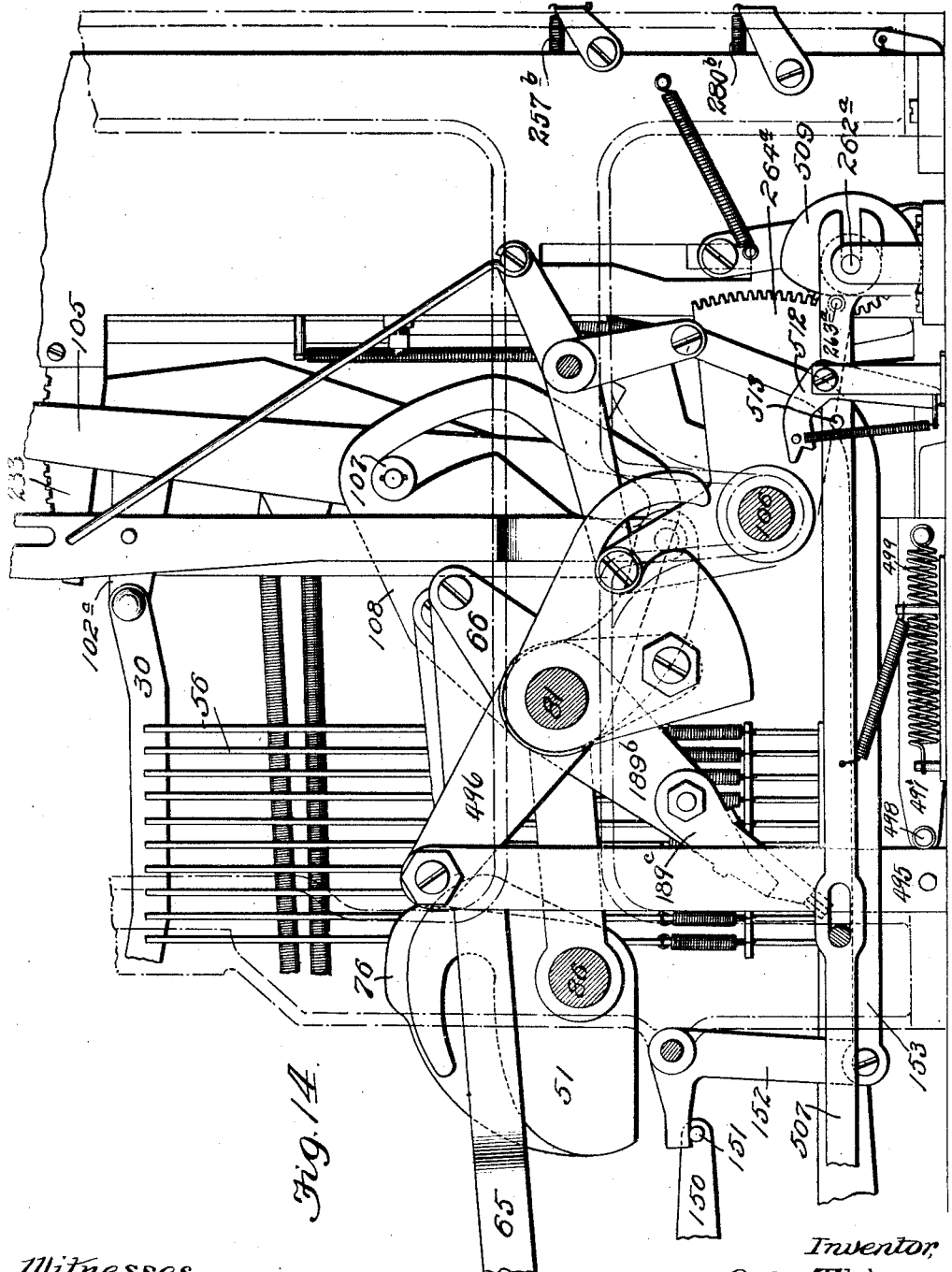

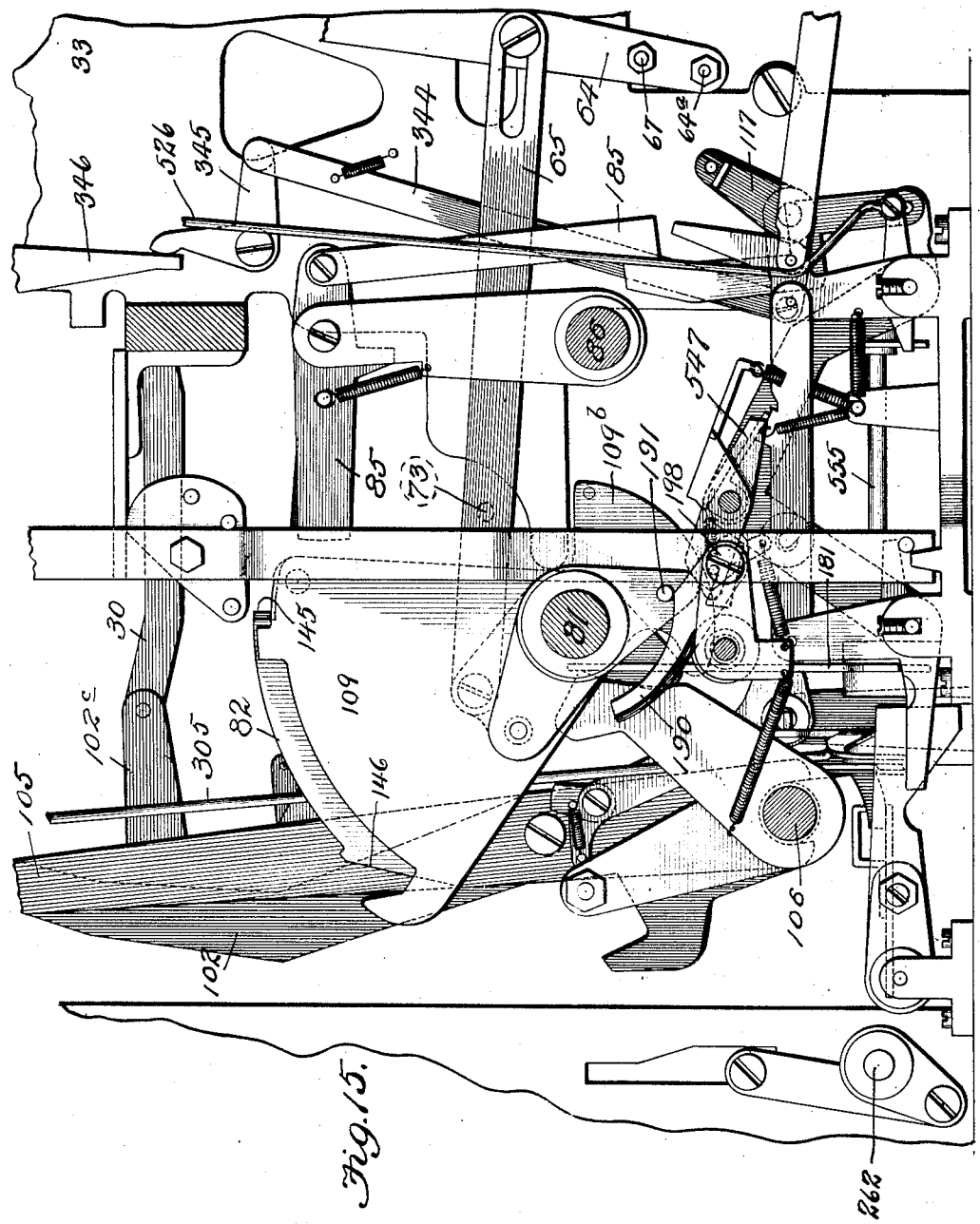

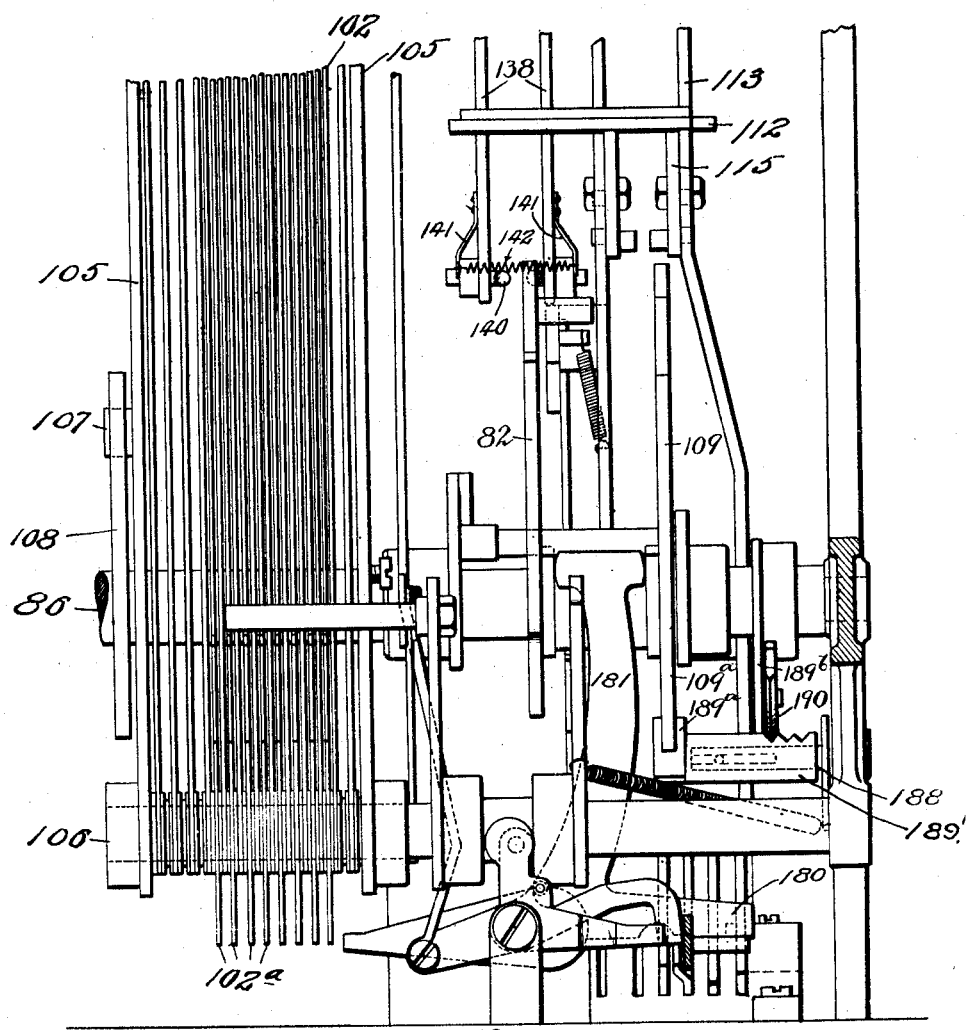
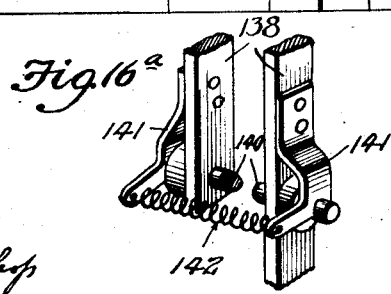

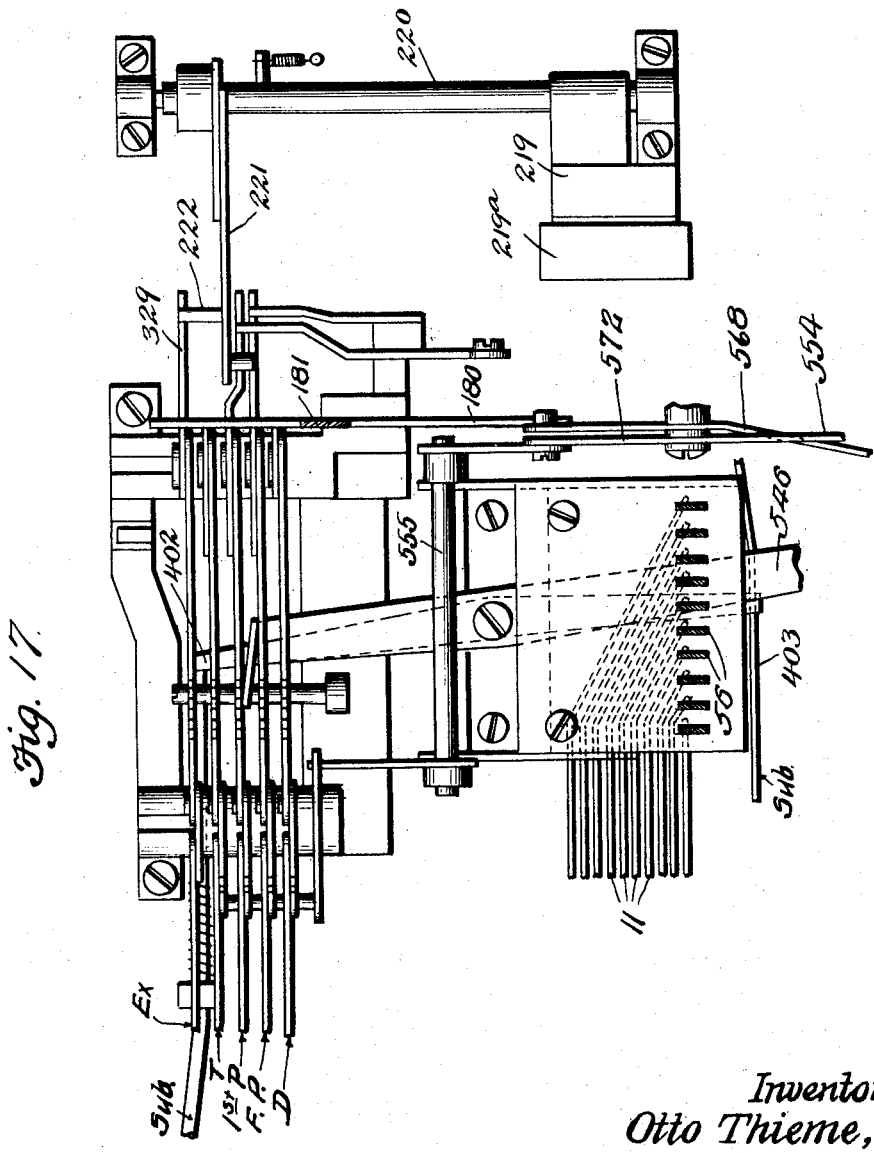

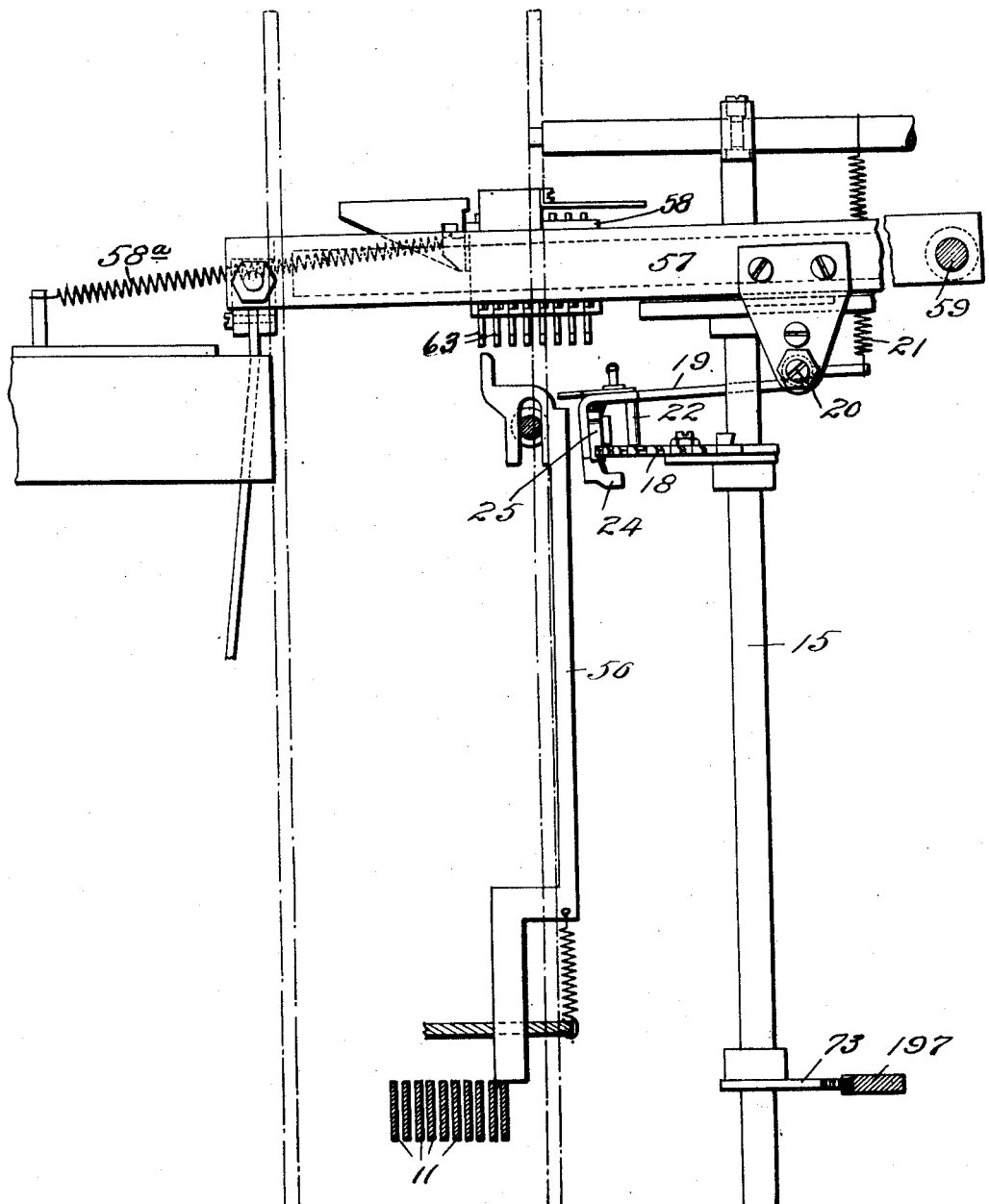

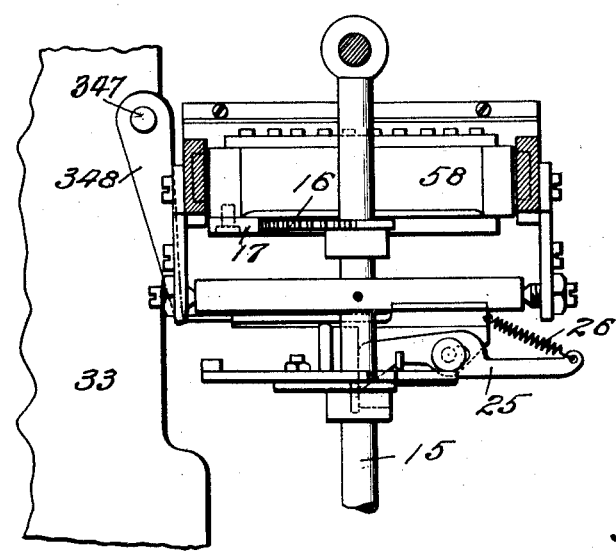
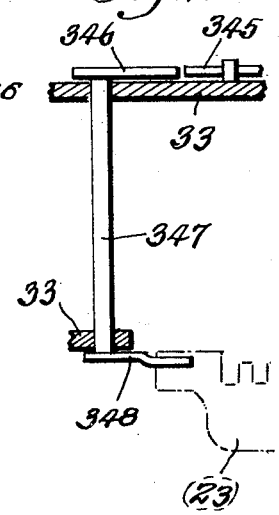
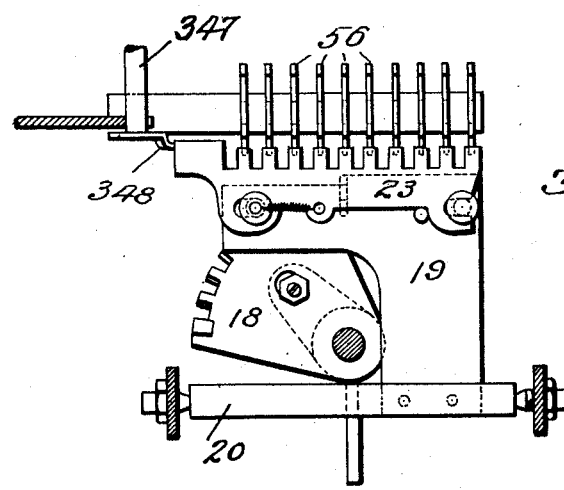

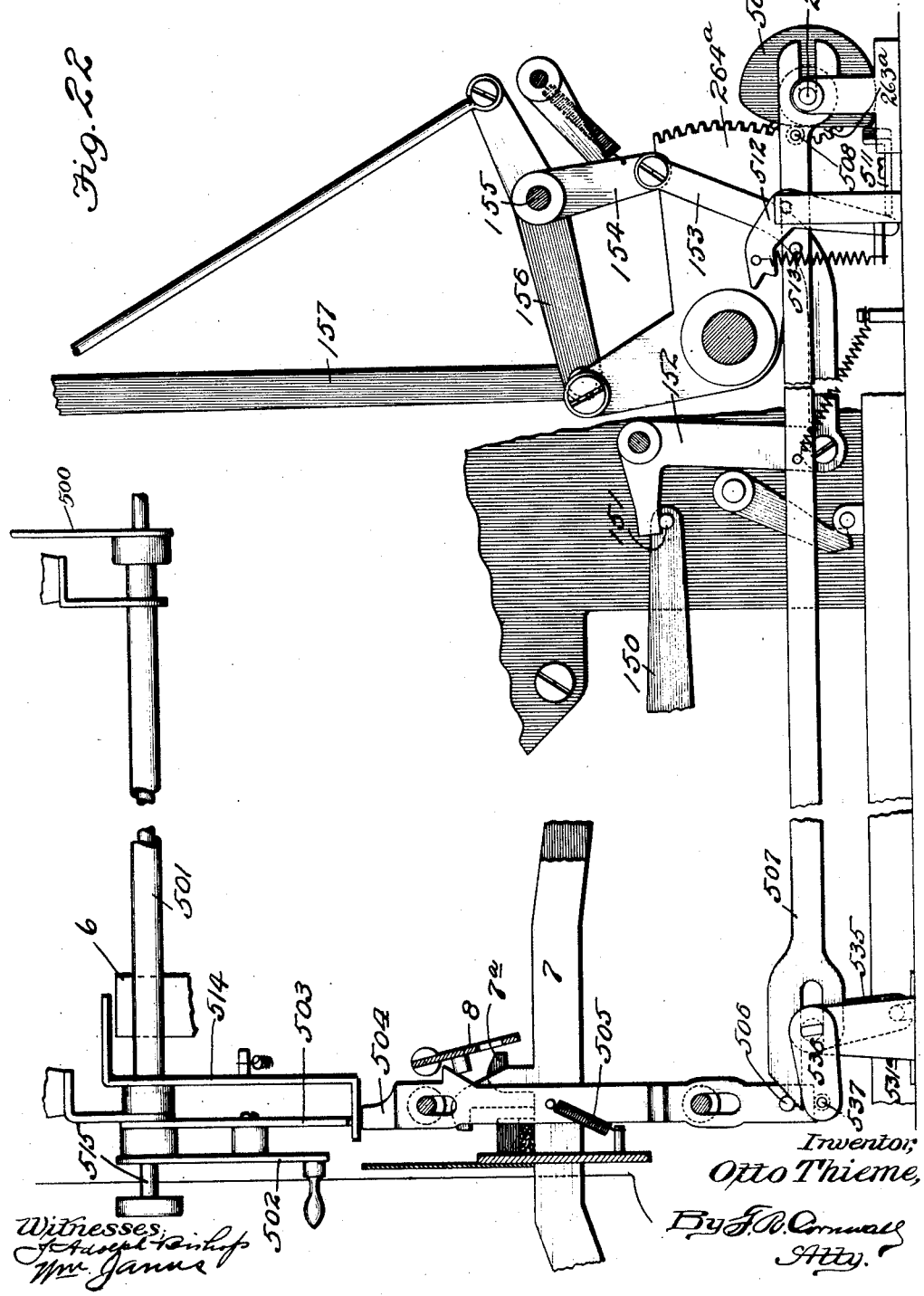

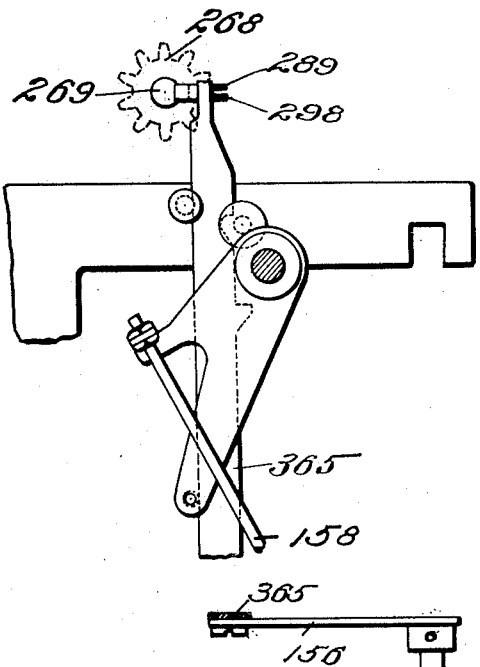
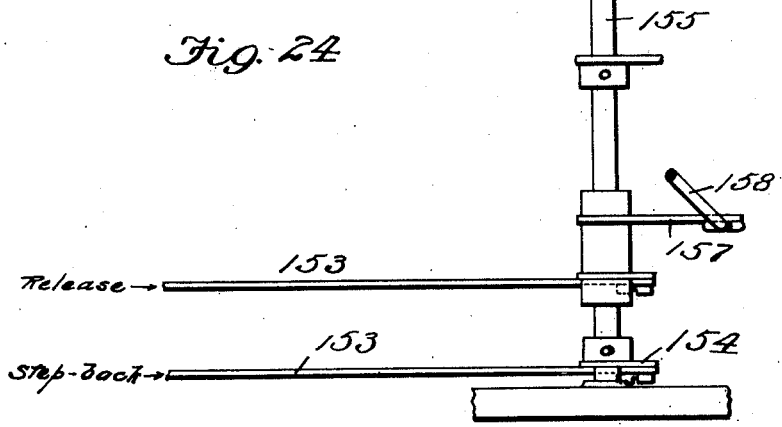

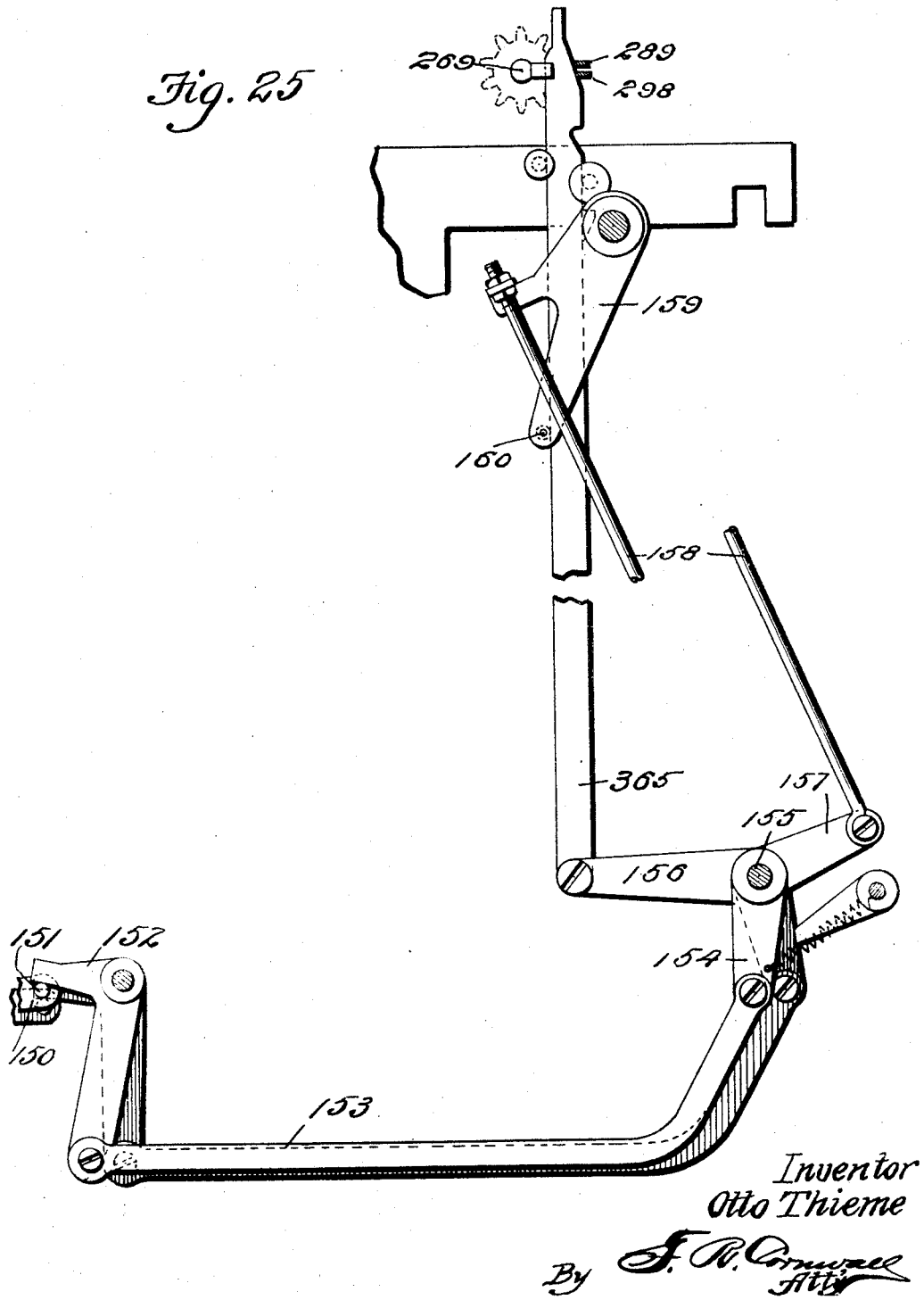

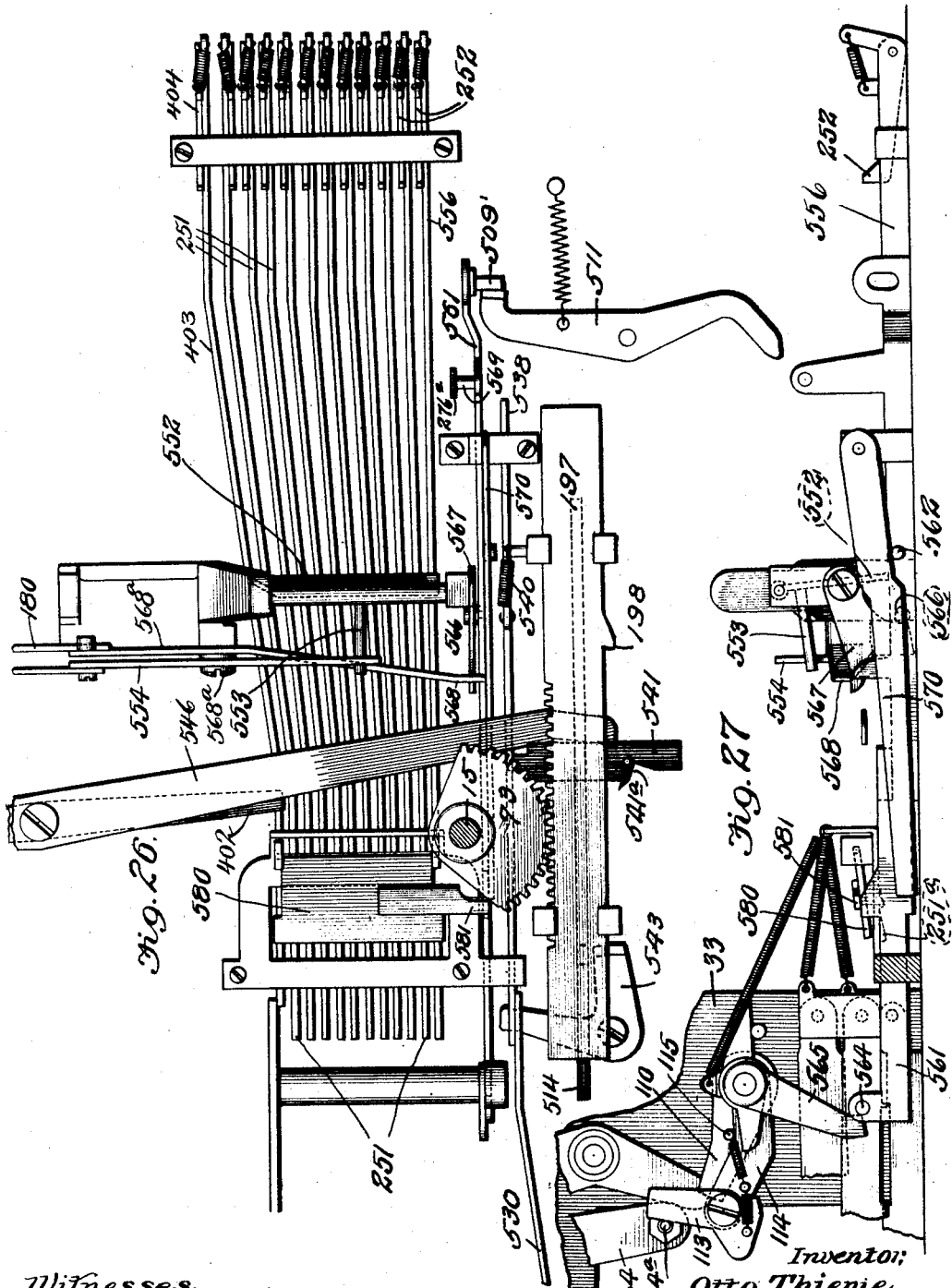

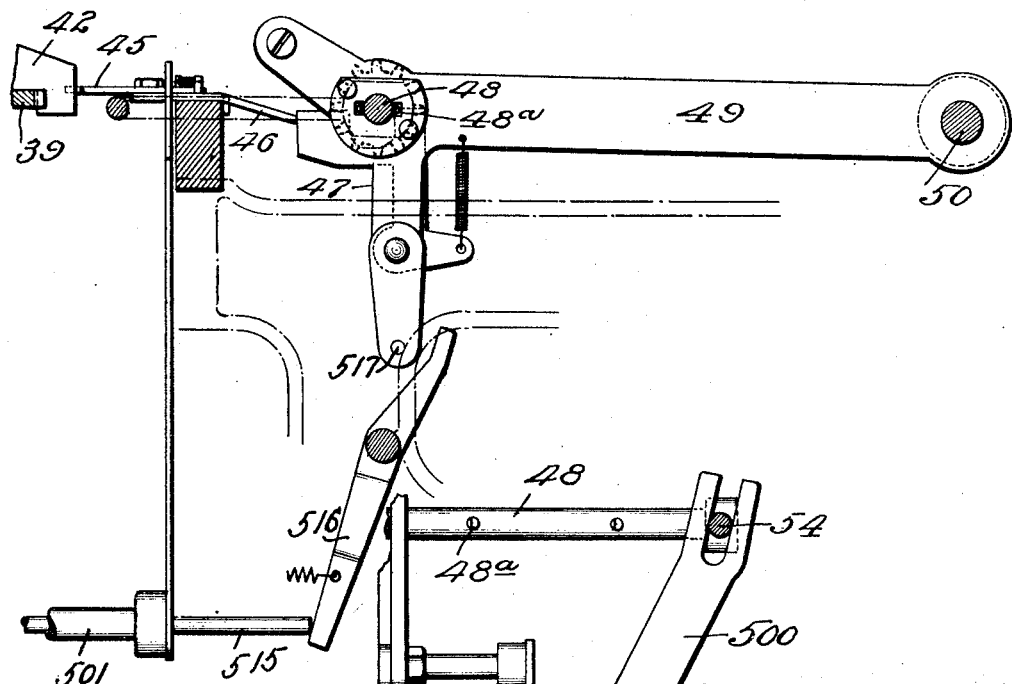
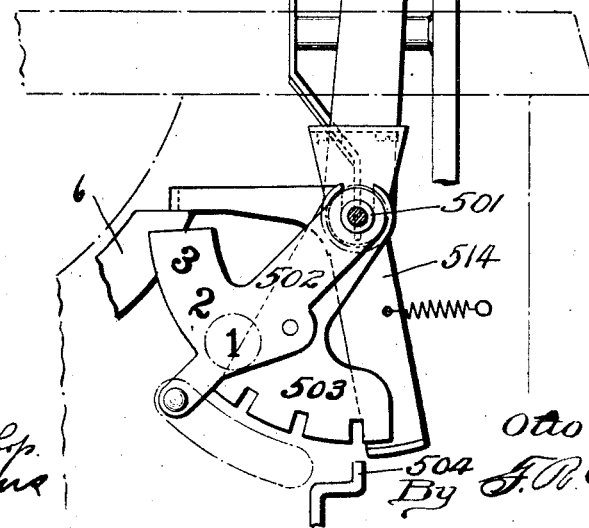

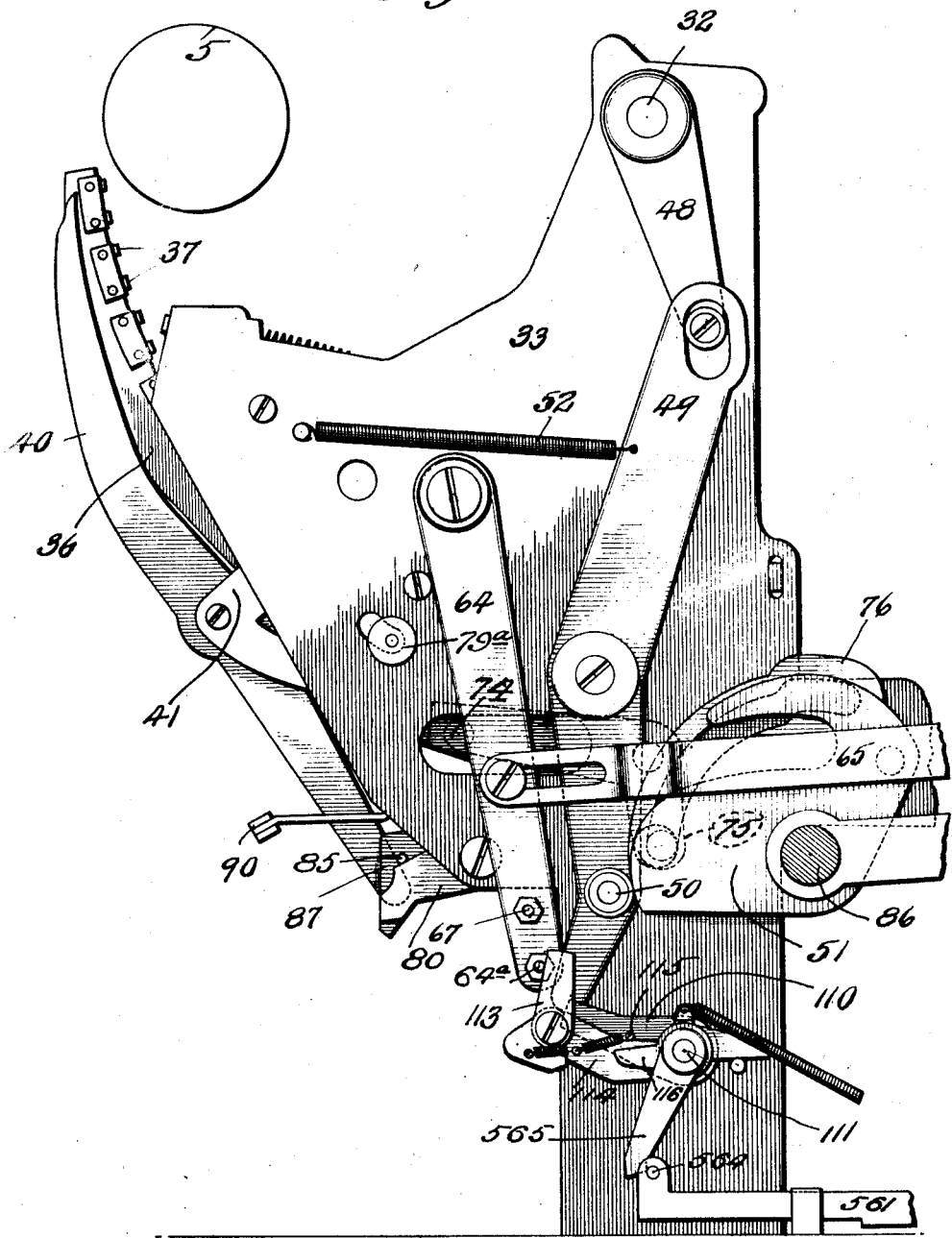

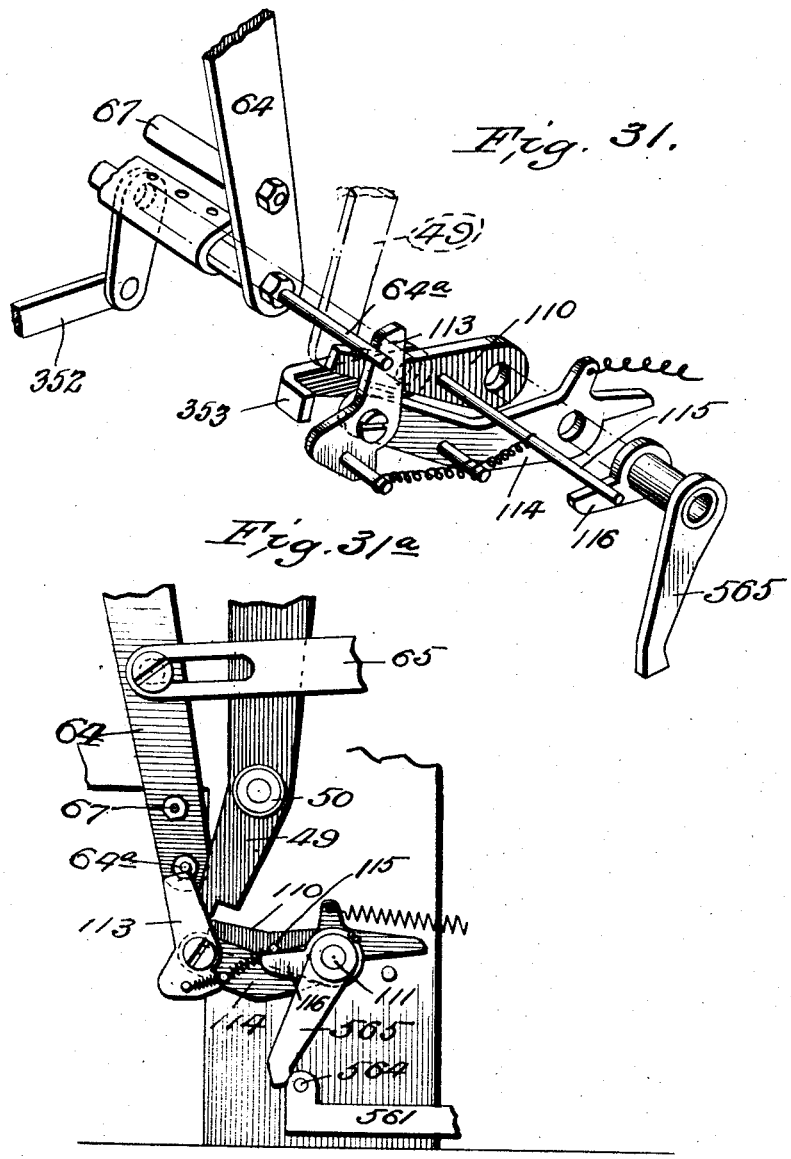

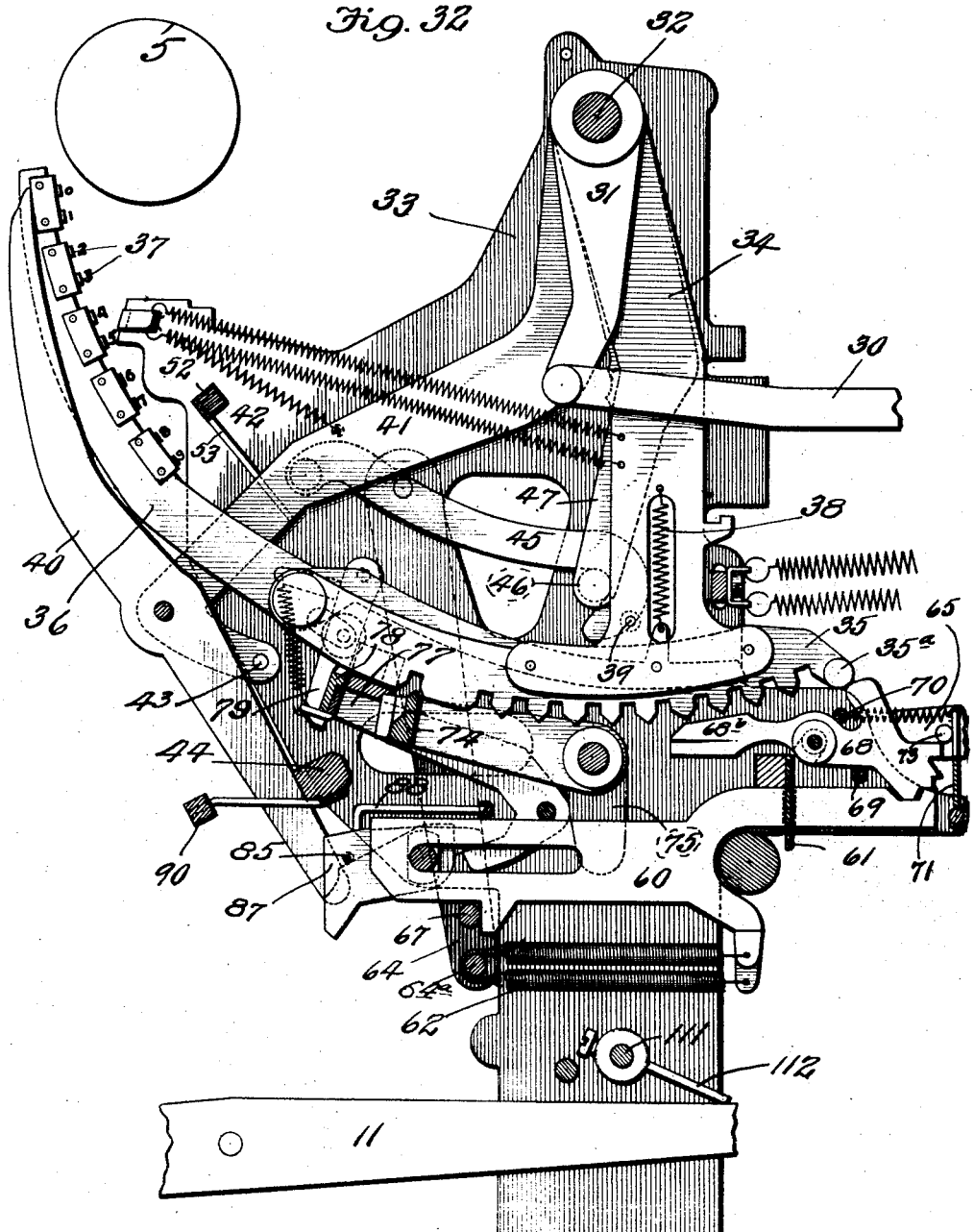

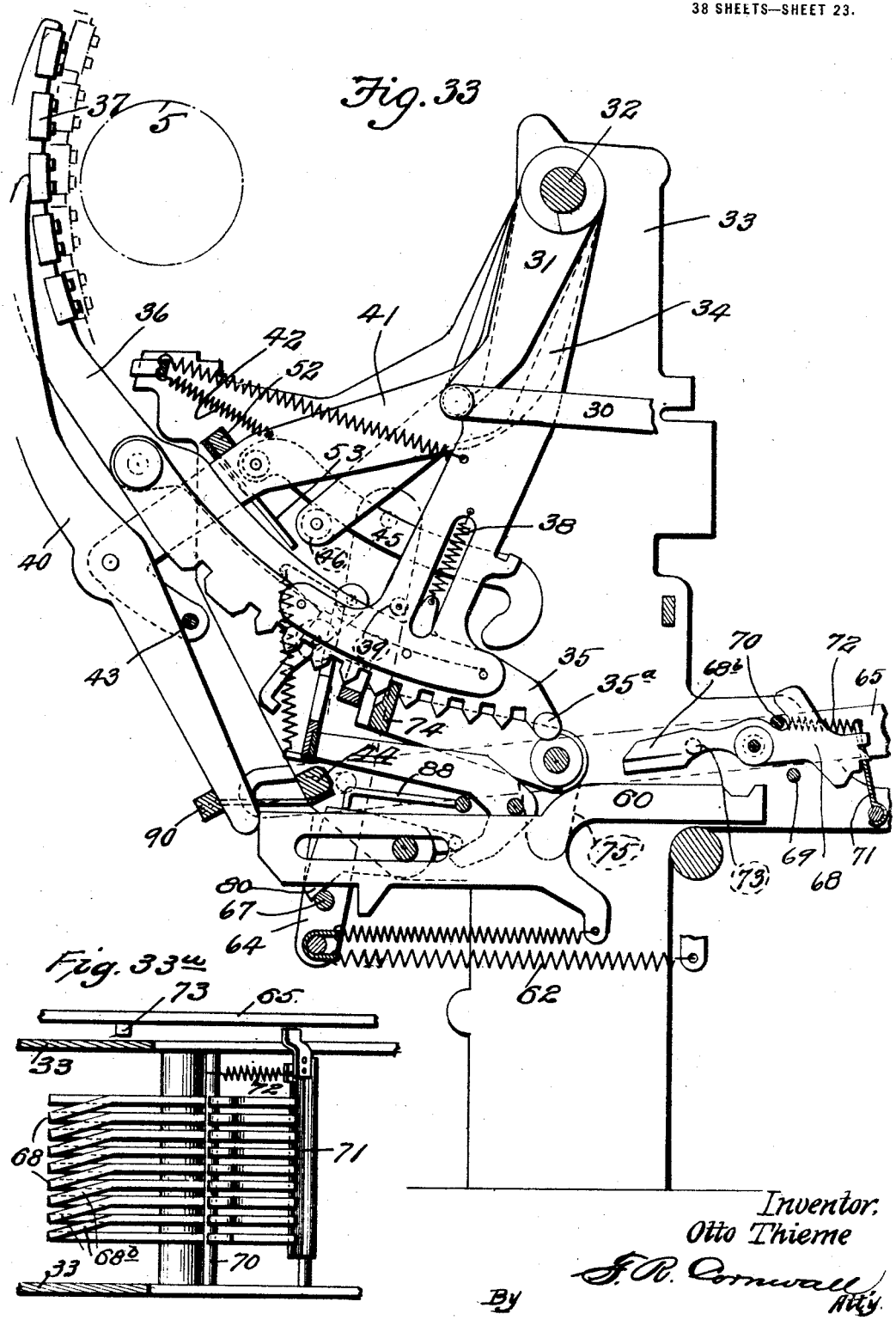

O. THIEME.
CALCULATING MACHINE.
APPLICATION FILED AUG. 1, 1916.
1,317,604.
Patented Sept. 30, 1919.
38 SHEETS—SHEET 24.
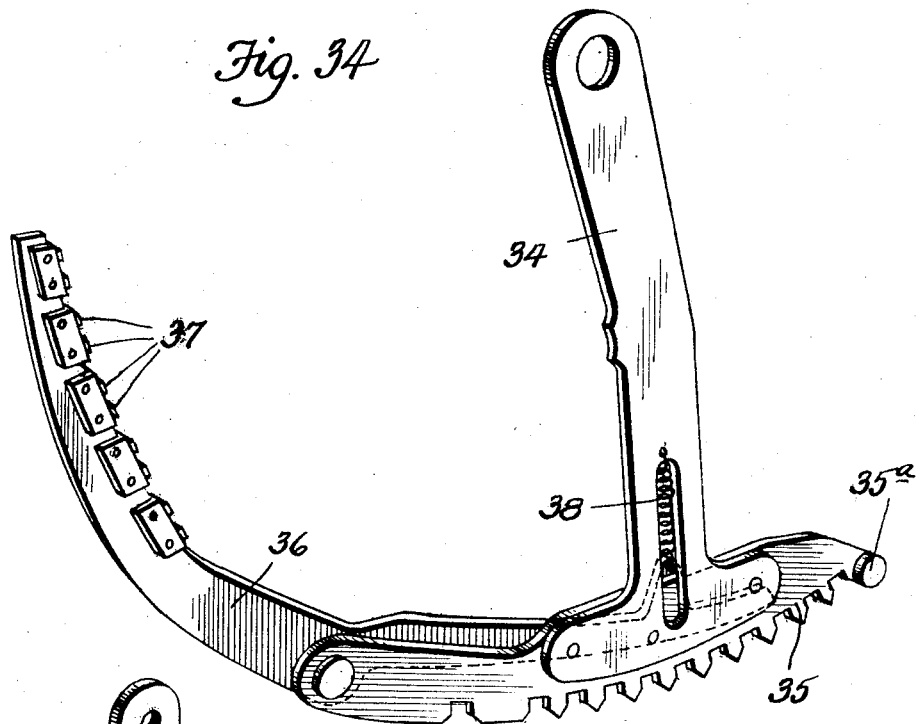
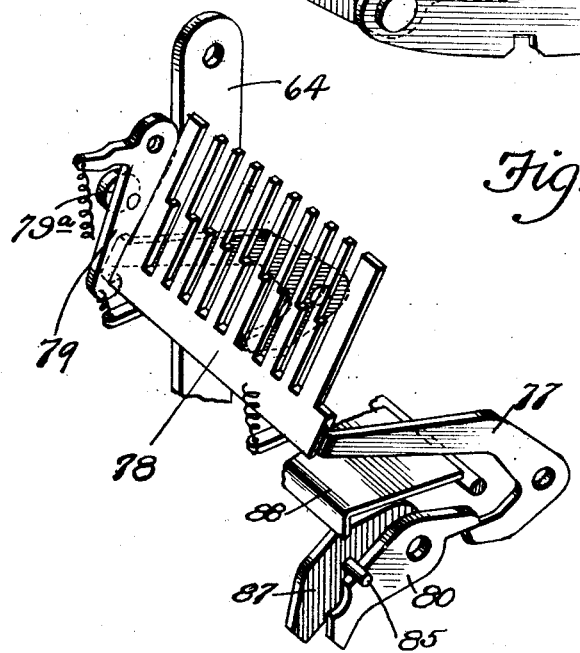
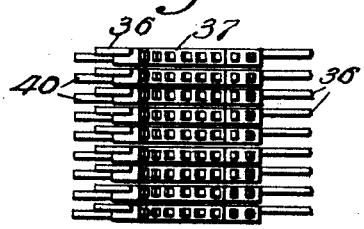
Inventor
Otto Thieme
By F. R. Cornwall Atty

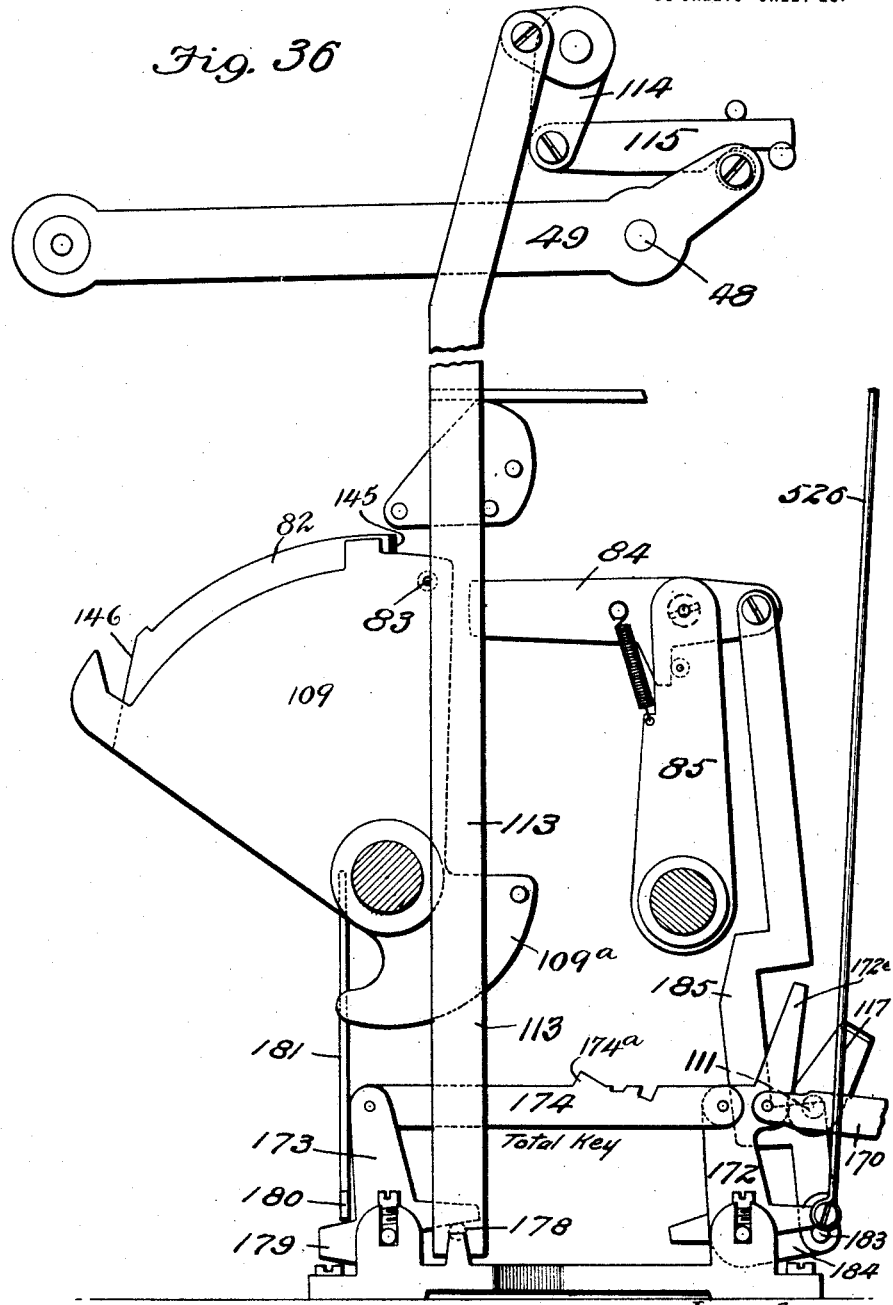

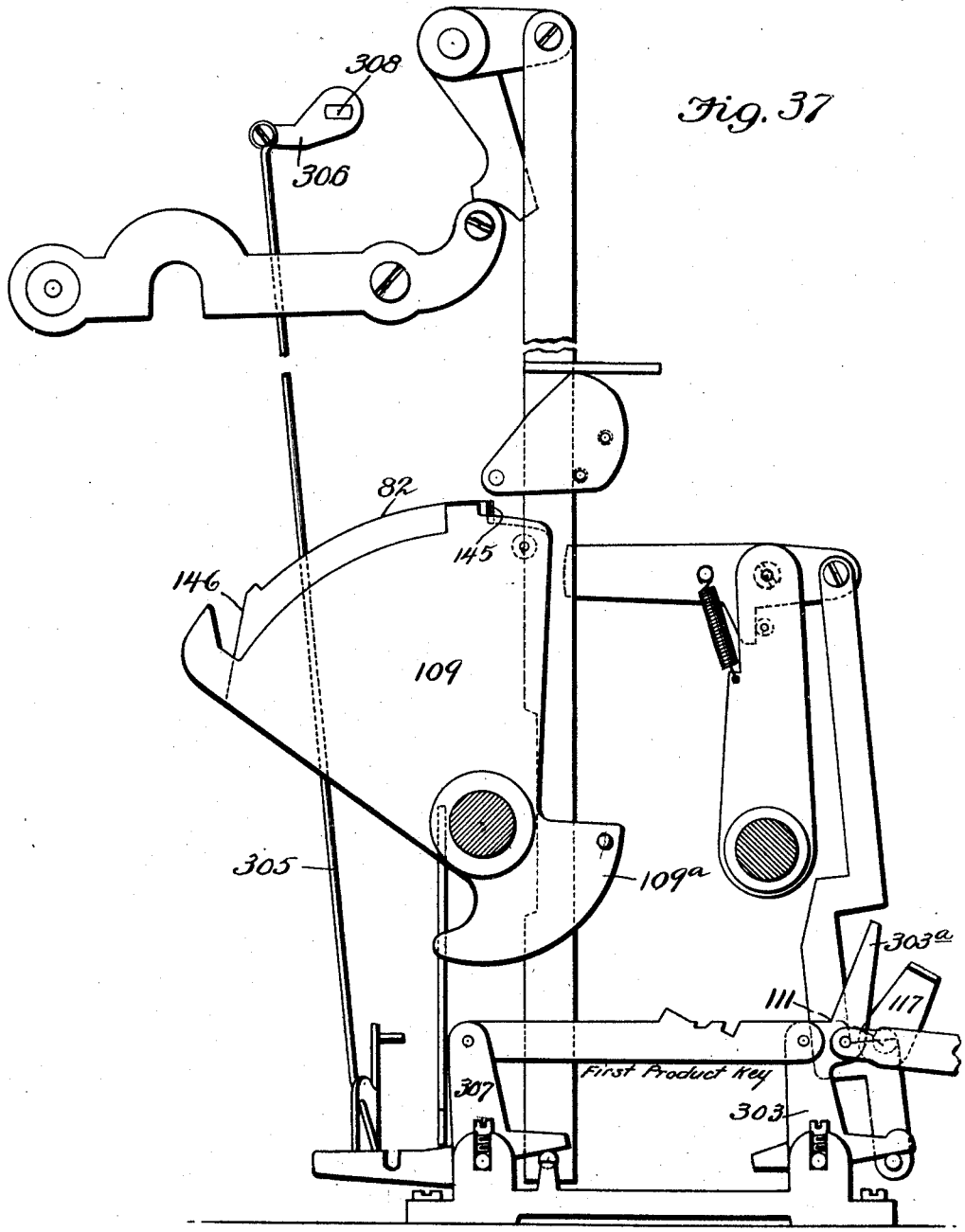

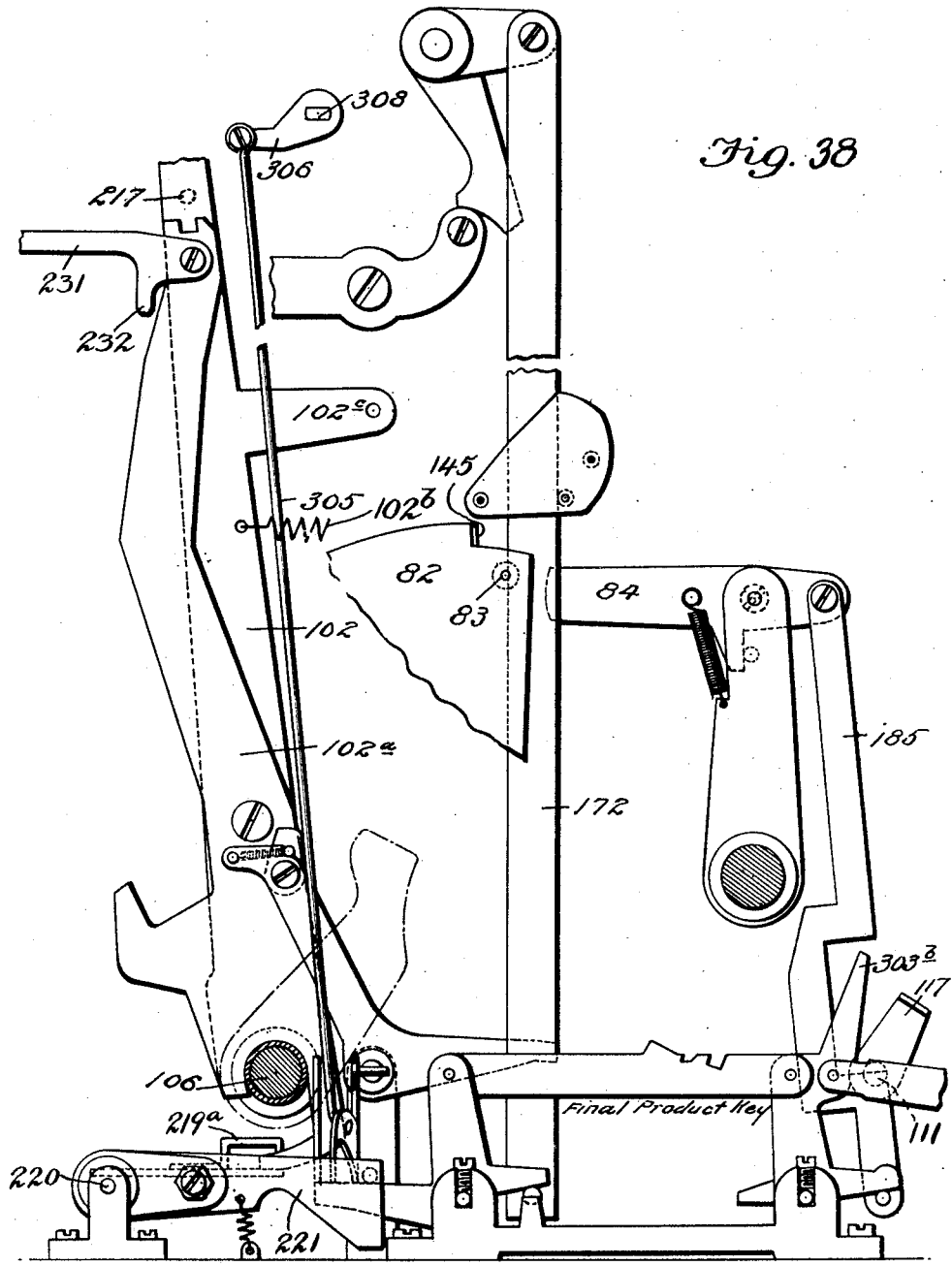

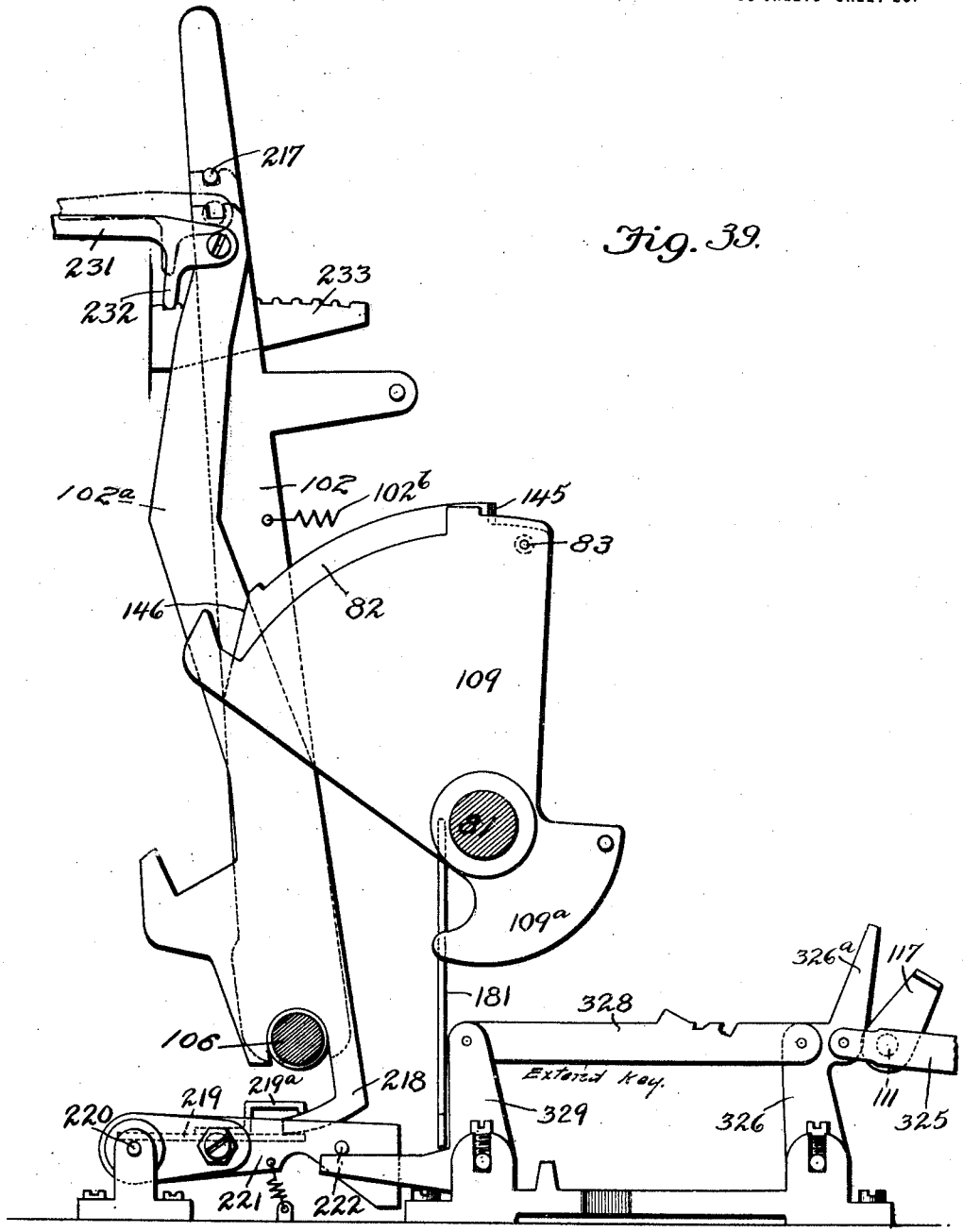

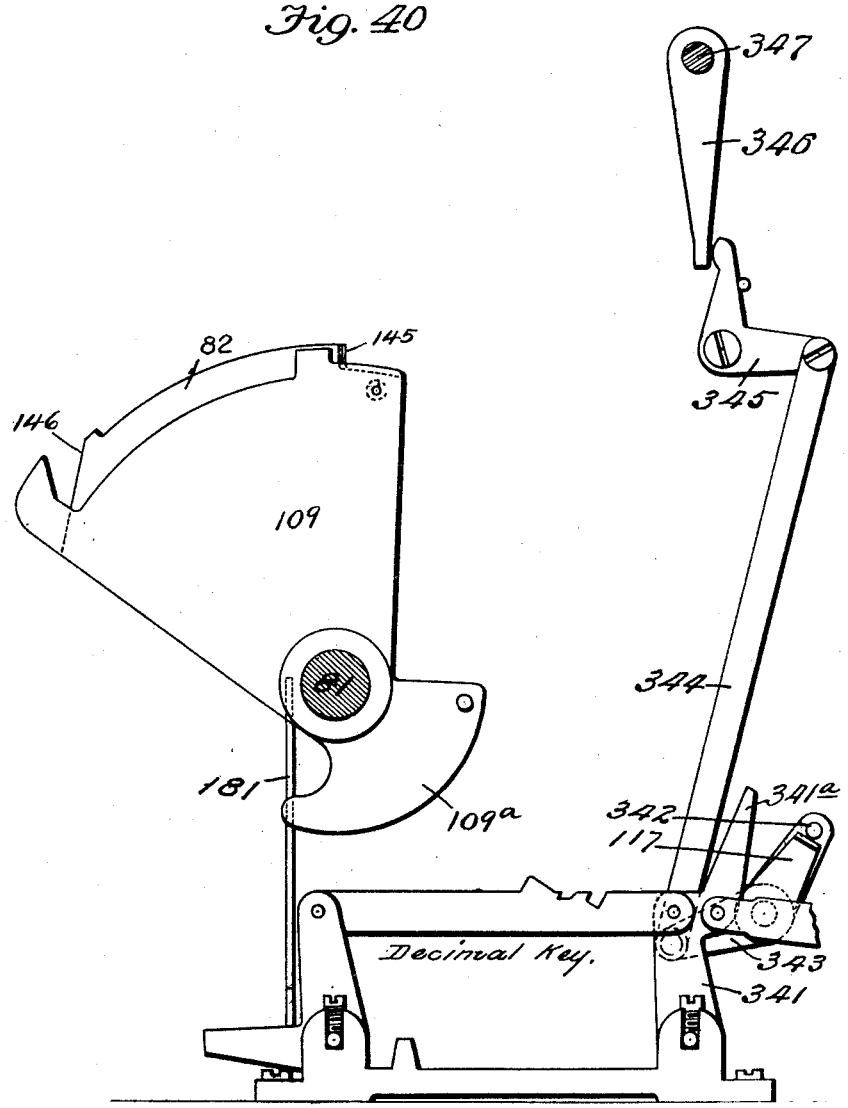

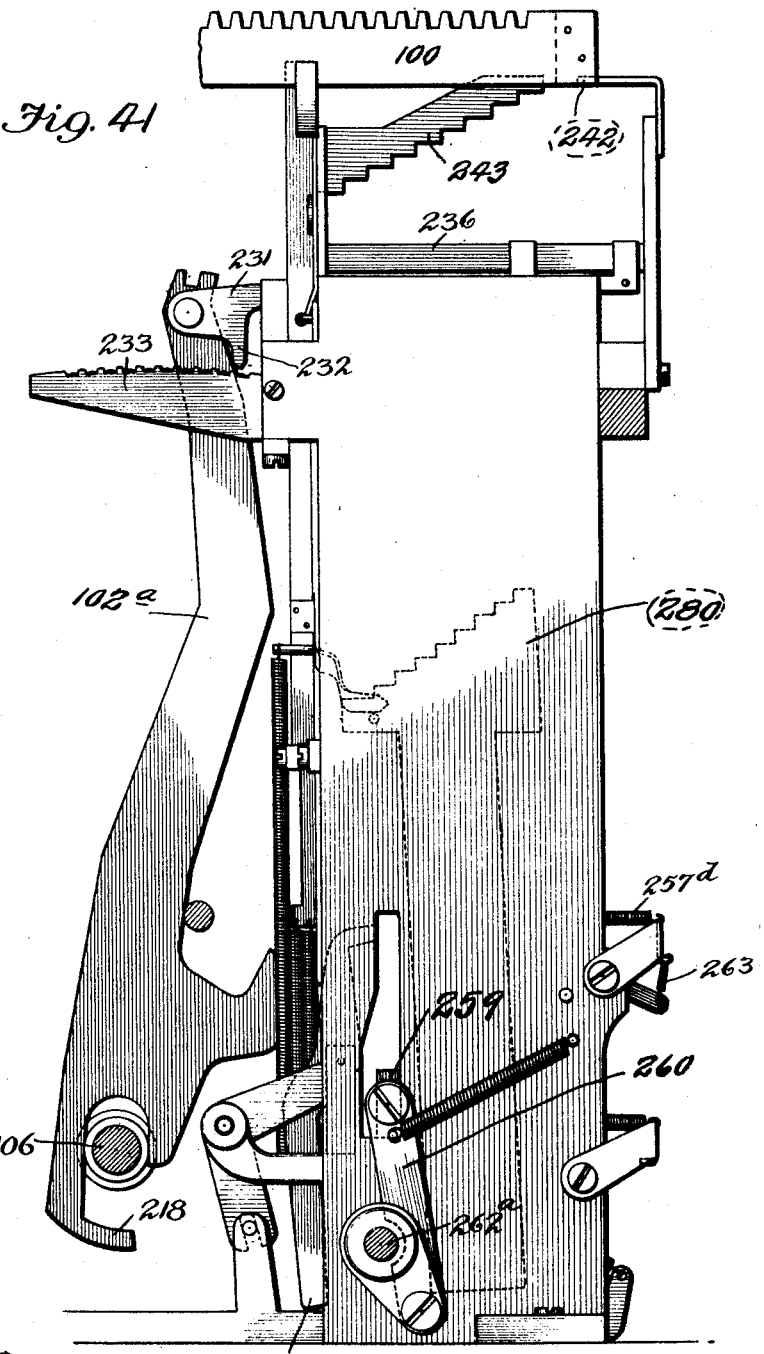

O. THIEME.
CALCULATING MACHINE.
APPLICATION FILED AUG. 1, 1916.

1,317,604.

Patented Sept. 30, 1919.
38 SHEETS—SHEET 31.

Witnesses;
J. Adolph Bishop.
Wm. James

Inventor,
Otto Thieme,
By J. P. Cornwall
Atty.

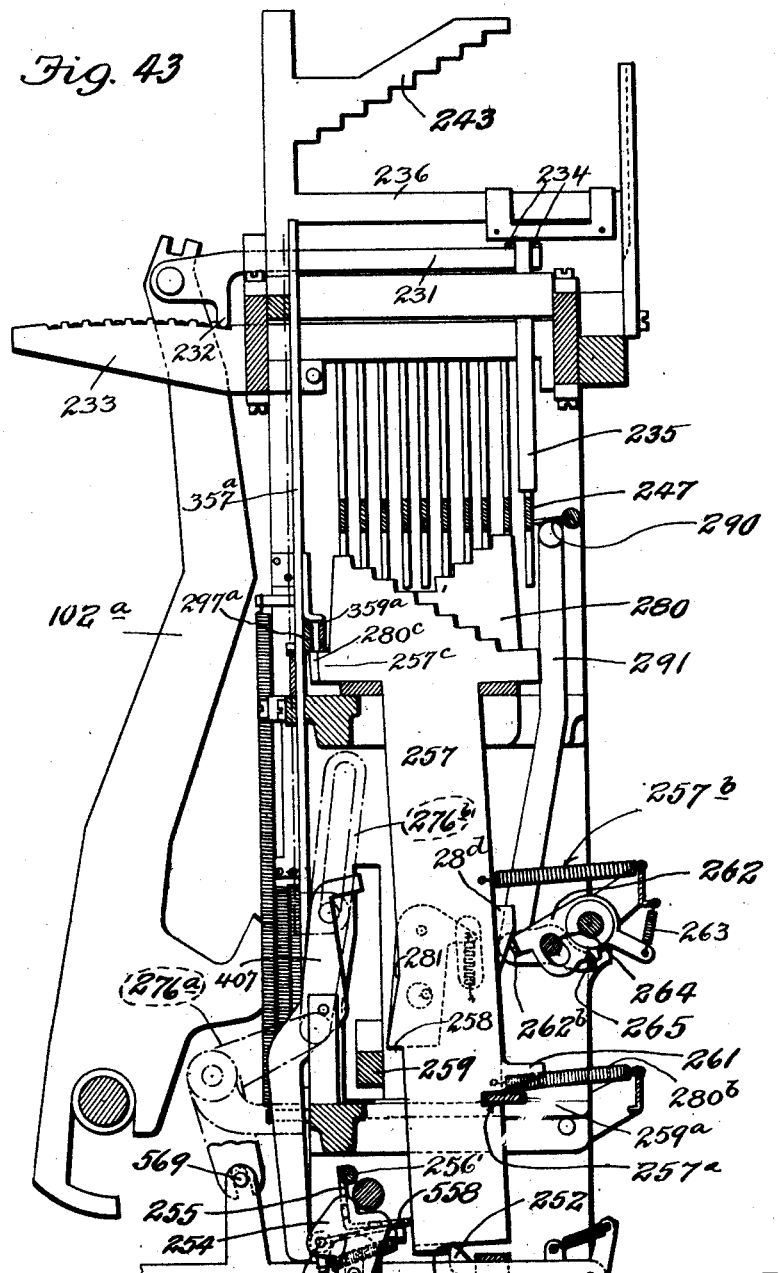

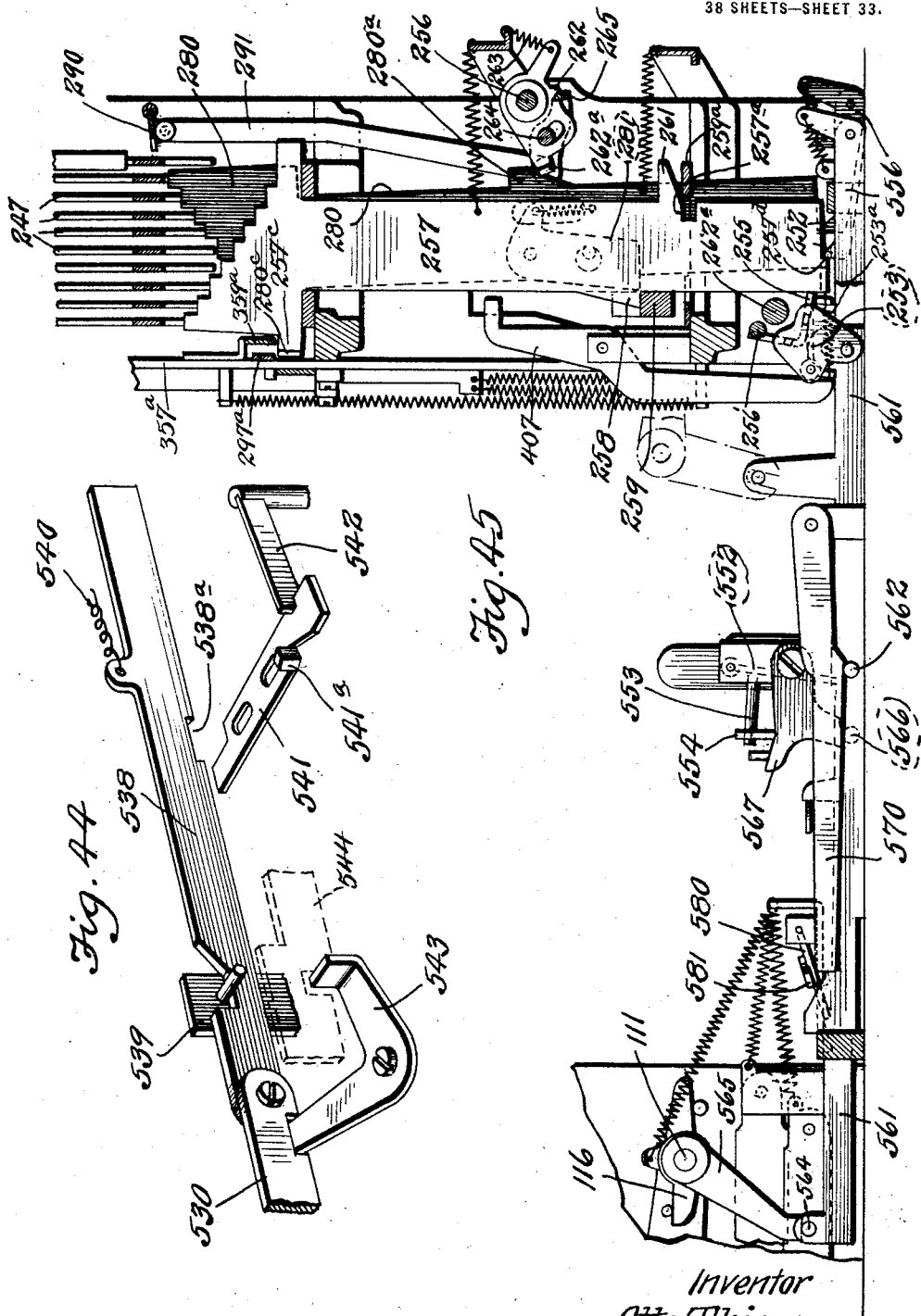

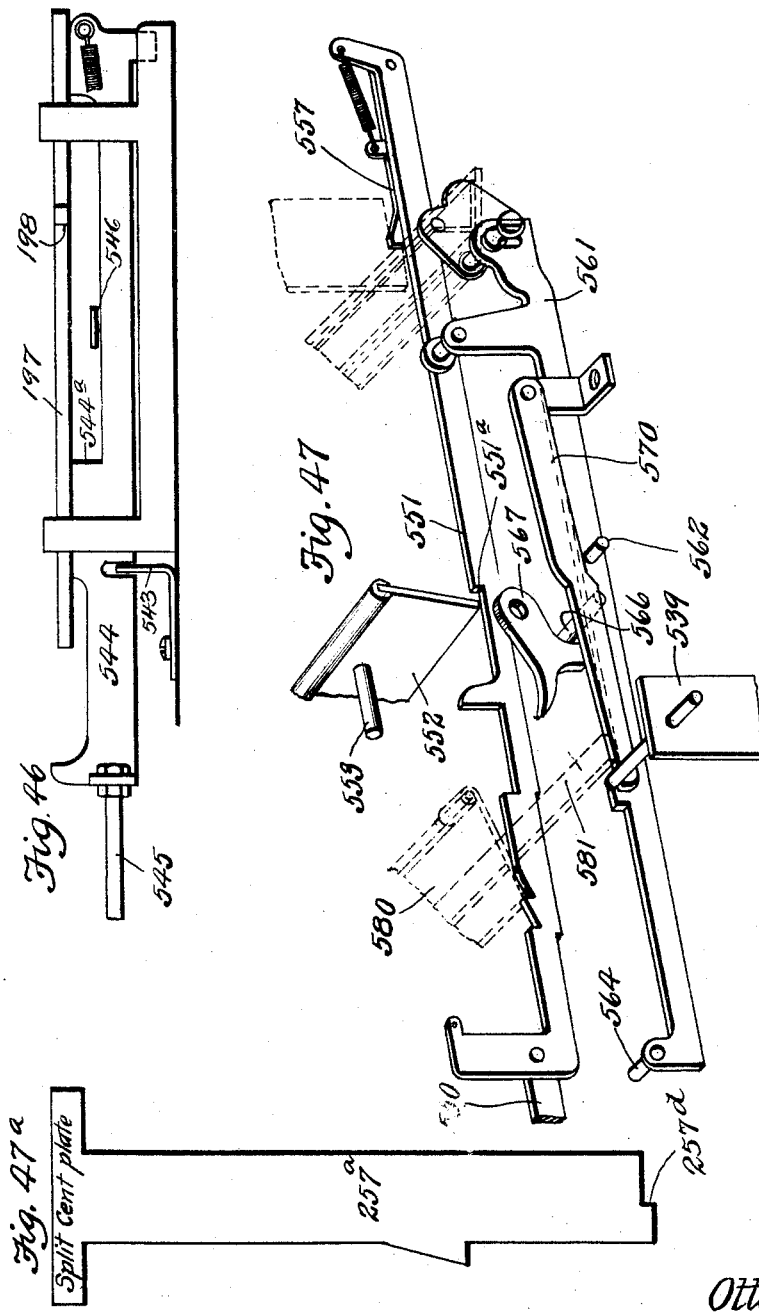

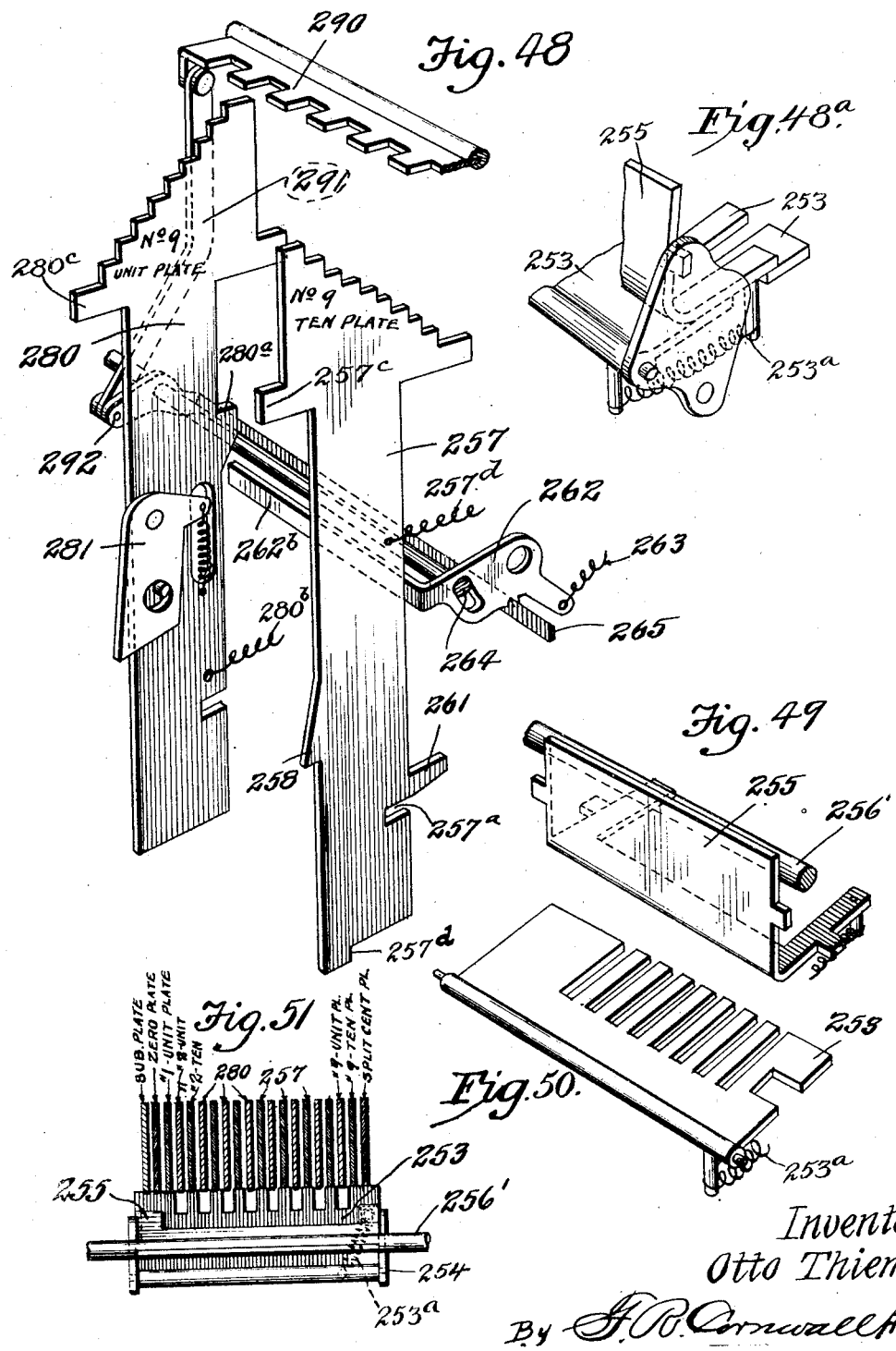

O. THIEME.
CALCULATING MACHINE.
APPLICATION FILED AUG. 1, 1916.
1,317,604.
Patented Sept. 30, 1919.
38 SHEETS—SHEET 36.
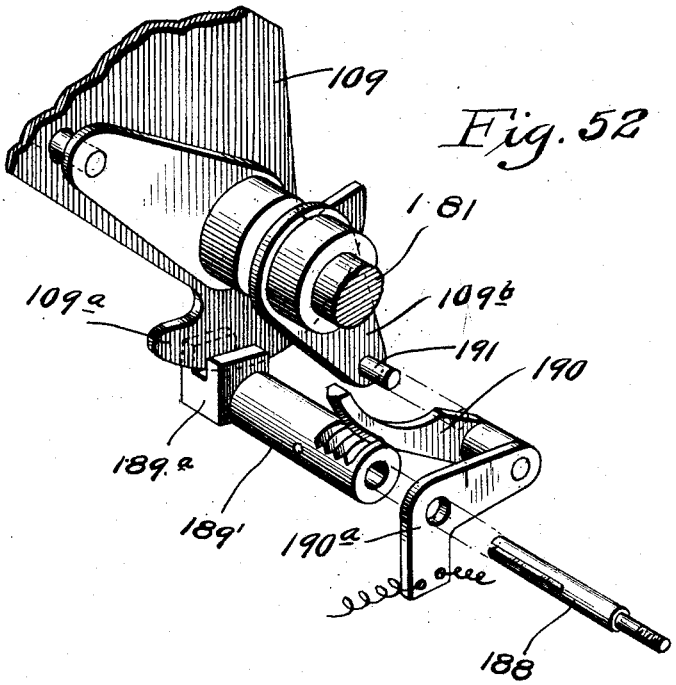
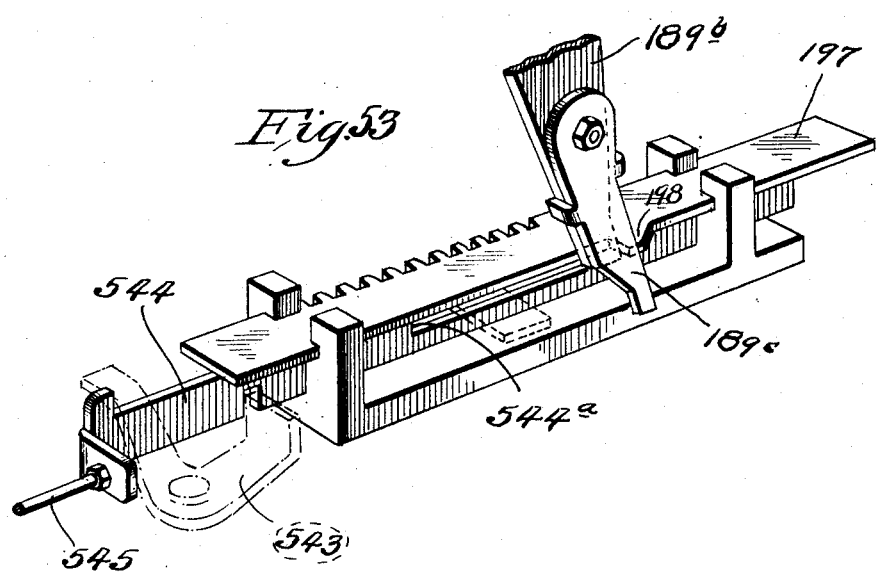
Inventor,
Otto Thieme

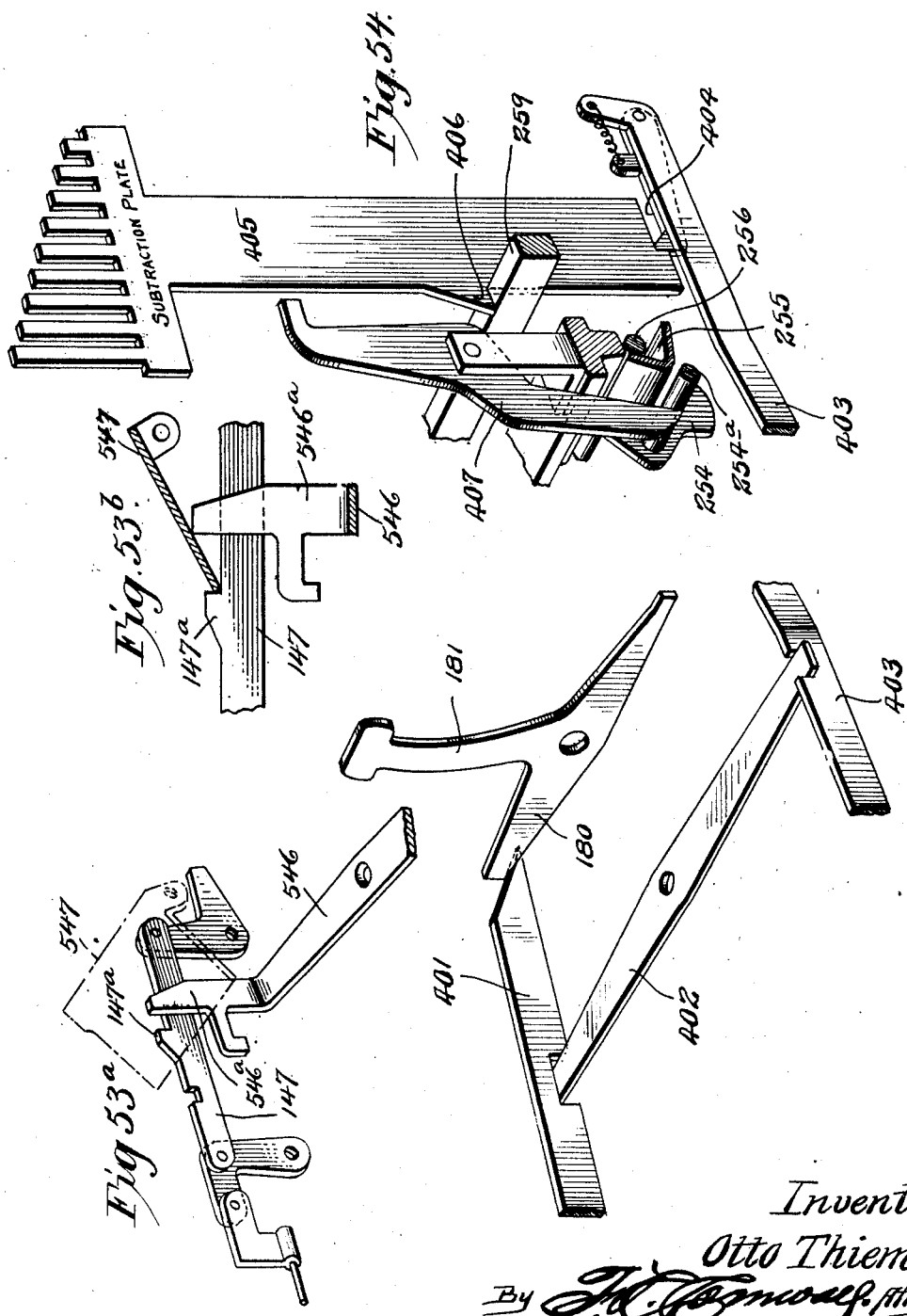

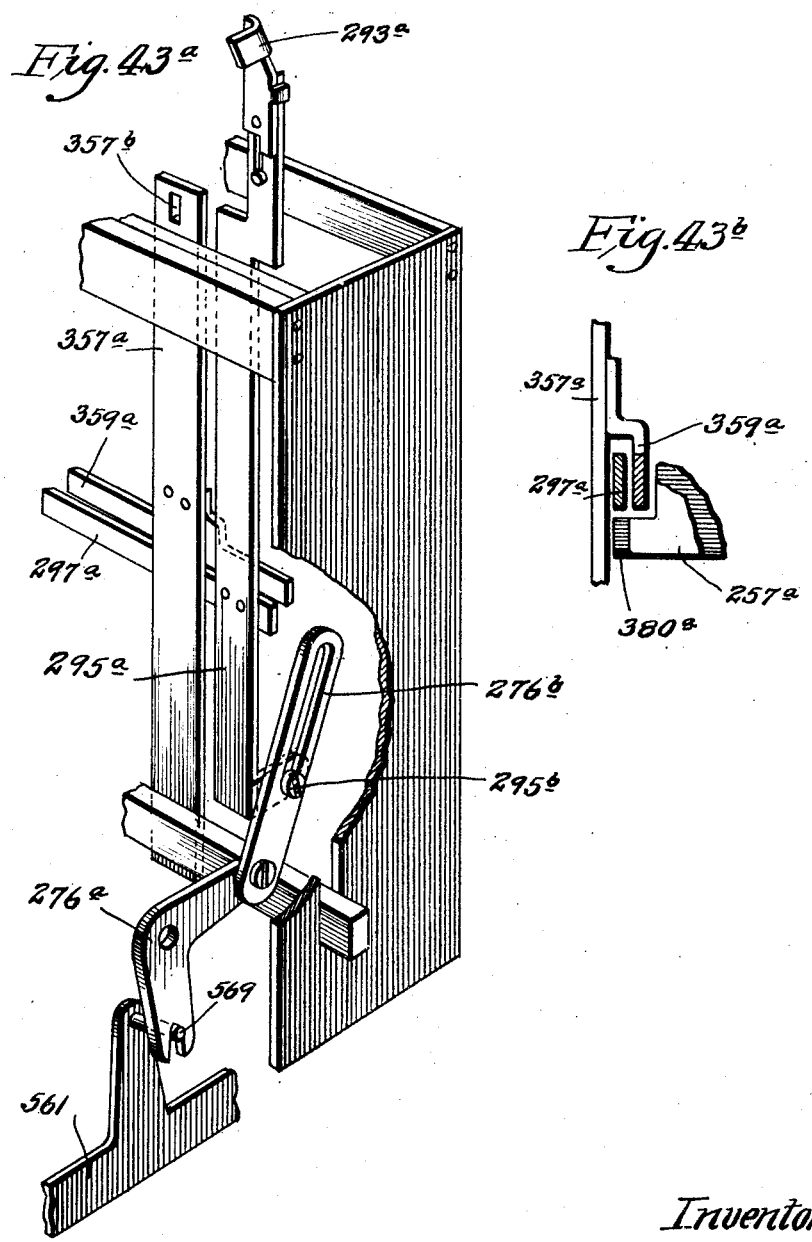

UNITED STATES PATENT OFFICE.

OTTO THIEME, OF ST. LOUIS, MISSOURI, ASSIGNOR TO MOON-HOPKINS BILLING MACHINE COMPANY, OF ST. LOUIS, MISSOURI, A CORPORATION OF MISSOURI.

CALCULATING-MACHINE.

1,317,604.        Specification of Letters Patent.        Patented Sept. 30, 1919.

Application filed August 1, 1916. Serial No. 112,534.

*To all whom it may concern:*

Be it known that I, OTTO THIEME, a citizen of the United States, residing at St. Louis, Missouri, have invented a certain new and useful Improvement in Calculating-Machines, of which the following is a full, clear, and exact description, such as will enable others skilled in the art to which it appertains to make and use the same, reference being had to the accompanying drawings, forming part of this specification, in which—

Fig. 2 is a side elevational view, the casing at the rear end of the machine being removed.

Fig. 3 is a plan view of the base of the machine showing the arrangement of the key bars.

Fig. 4 is a vertical sectional view through the key board of the machine showing the adding keys and motor key in elevation.

Fig. 5 is a horizontal sectional view on line 5—5 of Fig. 4.

Fig. 6 is a detail view of the interlock between the total keys.

Fig. 7 is a vertical sectional view through the key board showing the split cent and multiplier keys in elevation.

Fig. 8 is a modified form of key bar mount.

Fig. 9 is a front elevational view of one of the keys detached.

Fig. 10 is a horizontal sectional view on line 10—10 of Fig. 7.

Fig. 11 is a side elevational view of the upper rear portion of the machine.

Fig. 12 is a vertical sectional view through the upper rear portion of the machine.

Fig. 13 is a top plan view of the groups of totalizer wheels and their carrying frames.

Fig. 14 is a vertical sectional view through the lower rear portion of the machine as seen from the righthand side.

Fig. 15 is a vertical sectional view through the lower rear portion of the machine as seen from the lefthand side.

Fig. 16 is a rear elevational view of the parts shown in Fig. 14.

Fig. 16$^a$ is a detail view of the yielding plungers on the cam operated bars for restoring the carrying segments to position.

Fig. 17 is a plan view of the rear ends of the result keys and adding keys.

Fig. 18 is a front elevational view of the setting up mechanism and its escapement.

Fig. 19 is a side elevational view of the upper part of the mechanism shown in Fig. 18.

Fig. 20 is a detail plan view of part of the mechanism shown in Fig. 19.

Fig. 21 is a plan view of part of the mechanism shown in Fig. 19.

Fig. 22 is a side elevational view as viewed from the right of certain of the key interlocks.

Fig. 23 is a detail view of the rear totalizer releasing and stepping-back mechanism.

Fig. 24 is a plan view of part of the mechanism shown in Fig. 22.

Fig. 25 is a side elevational view of the rear totalizer releasing mechanism showing the same in its operating position.

Fig. 26 is a plan view of the rear ends of the multiplier keys and their connections.

Fig. 27 is a side elevational view of the mechanism shown in Fig. 26.

Fig. 28 is a side elevational view of the escapement mechanism for the front totalizers.

Fig. 29 is a front elevational view of the mechanism shown in Fig. 28.

Fig. 30 is a side elevational view of the printing section.

Fig. 31 is a diagrammatic view showing details of the control for the printing section.

Fig. 31$^a$ is an elevational view showing parts of the printing control mechanism in changed position.

Fig. 32 is a vertical sectional view through the printing section showing the parts in normal position.

Fig. 33 is a similar view showing the parts in the position they occupy after the type hammers have been fired.

Fig. 33$^a$ is a plan view of the restraining pawls which coöperate with the printing plungers.

Fig. 34 is a detail view of one of the printing segments.

Fig. 35 is a detail view of the guiding comb for the printing segments and its associate parts.

Fig. 35ª is a top plan view of the type hammers and printing type.

Fig. 36 is a side elevational view of the total key and its connections.

Fig. 37 is a side elevational view of the first product key and its connections.

Fig. 38 is a side elevational view of the final product key and its connections.

Fig. 39 is a side elevational view of the extend key and its connections.

Fig. 40 is a side elevational view of the decimal key and its connections.

Fig. 41 is a side elevational view of the multiplying section as seen from the right.

Figure 42:
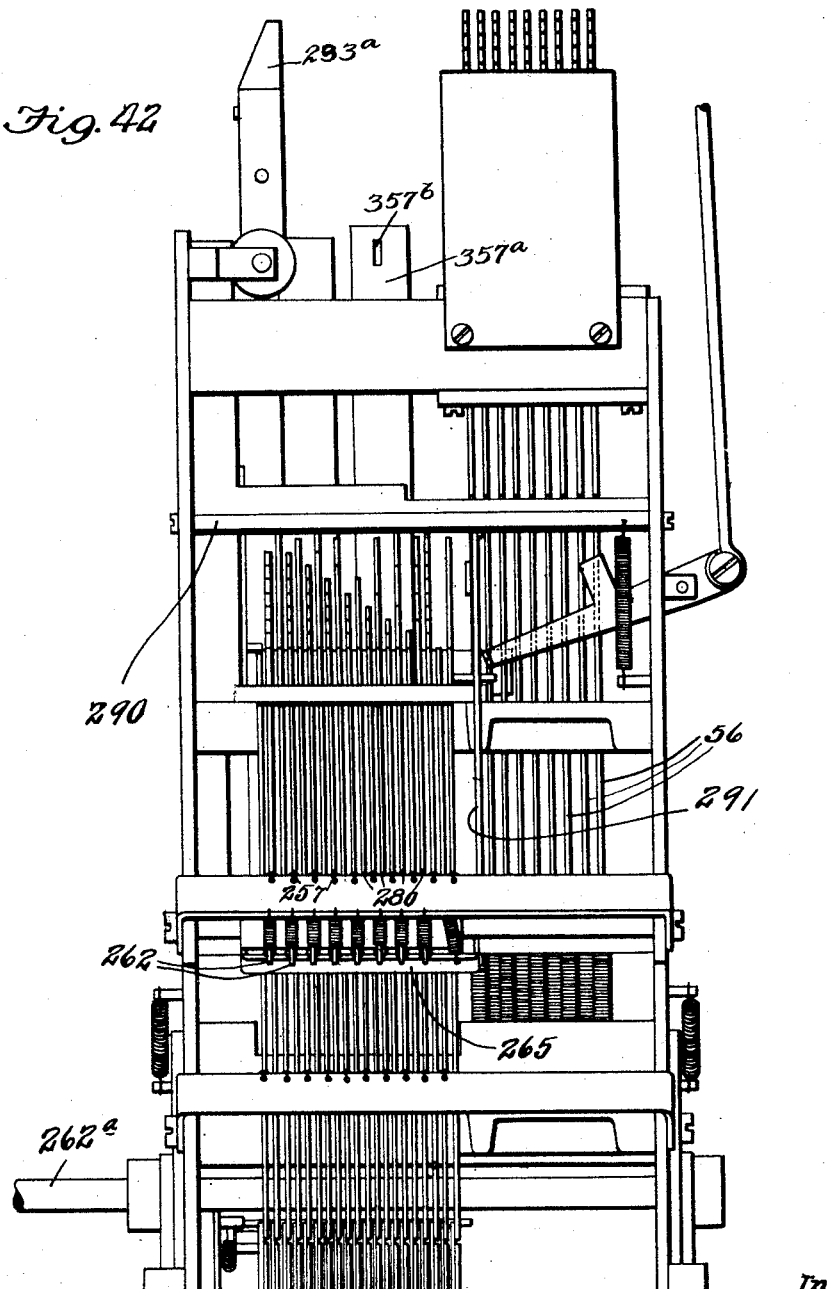

Fig. 42 is a rear elevational view of the multiplying section shown in Fig. 41.

Fig. 43 is a vertical sectional view through the multiplying section showing the tens partial product plate of the nine-key in elevation and the units partial product plate of the nine-key behind the tens plate.

Fig. 43ª is a detail view of the parts operated by the units plates to release the motor bar before the machine completes its second stroke in the operation of multiplication.

Fig. 43ᵇ is a detail sectional view of parts shown in Fig. 43ª.

Fig. 44 is a detail view of the bar operated by the motor key.

Fig. 45 is a detail view illustrating the changed position of the parts as when the multiplier key is depressed.

Fig. 46 is a side elevational view of the error key and its connections.

Fig. 47 is a detail view of the split cent key and its connections.

Fig. 47ª is a detail view of the split cent key.

Fig. 48 is a detail view of the nine, tens, and units multiplier plates and their connections.

Fig. 48ª is a detail view of the parts shown in Figs. 49 and 50 assembled.

Fig. 49 is a detail view of the swinging plate coöperating with the tens and units multiplier plates.

Fig. 50 is a detail view of the comb plate mounted under the swinging plate shown in Fig. 49.

Fig. 51 is a top plan view showing the relation of the plates in the multiplying mechanism to the swinging plate shown in Figs. 49 and 50.

Fig. 52 is a detail view of the locking mechanism for the cams and parts thereof shown detached.

Fig. 53 is a detail view of some of the parts operated by the error key.

Fig. 53ª is a detail view of certain of the parts operated by the error key.

Fig. 53ᵇ is a view, partly in section, of certain of the parts shown in Fig. 53ª.

Fig. 54 is a detail view of the parts connected to the subtraction key.

This invention relates to a new and useful improvement in combined typewriting and calculating machines, the object being to so combine the mechanisms that the printing type of each will strike at the front of the platen thus producing what is commonly known as a visible writing machine.

I do not in this application illustrate or claim any parts of the typewriting mechanism except those which are associated with, or which are controlled by my improved calculating machine. The typewriter and its peculiar novel features form the subject-matter of companion applications filed by me October 9, 1916, Serial No. 124,659, and divisional applications of said parent typewriting machine application, Serial No. 169,582, filed May 18, 1917, for carriage mechanism for writing machines; Serial No. 169,583 filed May 18, 1917, for ribbon vibrating mechanism, and Serial No. 169,584, filed May 18, 1917, for platen operating mechanism.

Many features of the calculating machine illustrated in the accompanying drawings are disclosed in French Patent No. 383719, dated January 16, 1908, and are also illustrated in an application for United States Letters Patent filed by Hubert Hopkins on April 9, 1906, Serial No. 310,739. Wherever it is deemed practical or necessary, the parts which have been adopted from the Hopkins French patent and application, and which is commercially known as the "Moon-Hopkins billing machine", will be pointed out.

My present machine is designed particularly as an improvement upon said "Moon-Hopkins billing machine" having for its principal object the visible writing feature above referred to, and in addition, is a refinement and simplification of the machine disclosed in the said Hopkins French patent and United States application. There are many novel features which it is deemed unnecessary here to detail as they will be specifically described and set forth in the claims.

In operation the machine shown in the accompanying drawings is in the main similar in operation to that described in the French patent and Hopkins' application, above referred to, my present machine being able to perform all of the operations described in said French patent and Hopkins' application and their operations or arithmetical calculations, as they might be called, which have been set forth in other Hopkins patents, will be specifically referred to under appropriate headings.

*Typewriting mechanism.*

1 is the base of the machine, preferably a casting, on which the typewriting and adding machine mechanisms are respectively mounted. 2 are the side frames of the typewriter. 3 the top plate thereof, the latter supporting a laterally movable carriage 4 containing the usual platen 5. This typewriting mechanism of course has the key bars and type for printing words and is a complete and operative structure in and of itself, capable of being detached from the base 1 and operated as an ordinary commercial typewriter independent of any operation of the adding mechanism. There is one feature of this particular form of typewriter which may be mentioned here and that is, being a front strike machine, the key bars are mounted in a vertically movable frame, a portion of which is shown at 6 in Figs. 22 and 28, this frame being moved upwardly when the shift key is operated so that upper case type or other characters may be printed at the printing point. Means are provided upon the operation of this shift key, and incidentally the upward movement of this type carrying frame, to render the adding department of the machine inoperative, as will hereinafter be more fully described.

Another feature, in the nature of an interlock between the typewriting mechanism and the adding mechanism, is a plate, shown in Fig. 22, whereby the typewriter key bars are locked against movement whenever the adding mechanism is being operated. These typewriting key bars are indicated at 7 and each one is provided with a hook 7ª. There is a swinging plate 8 provided with openings to engage said hooks, said plate being normally held out of engagement by a movable part of the adding machine, which adding machine part, when moved, will permit said plate to swing forward and engage all of the hooks on the key bars of the typewriting machine and prevent their operation so long as said adding machine part is displaced from its normal position.

*The key board.*

Figure 1:
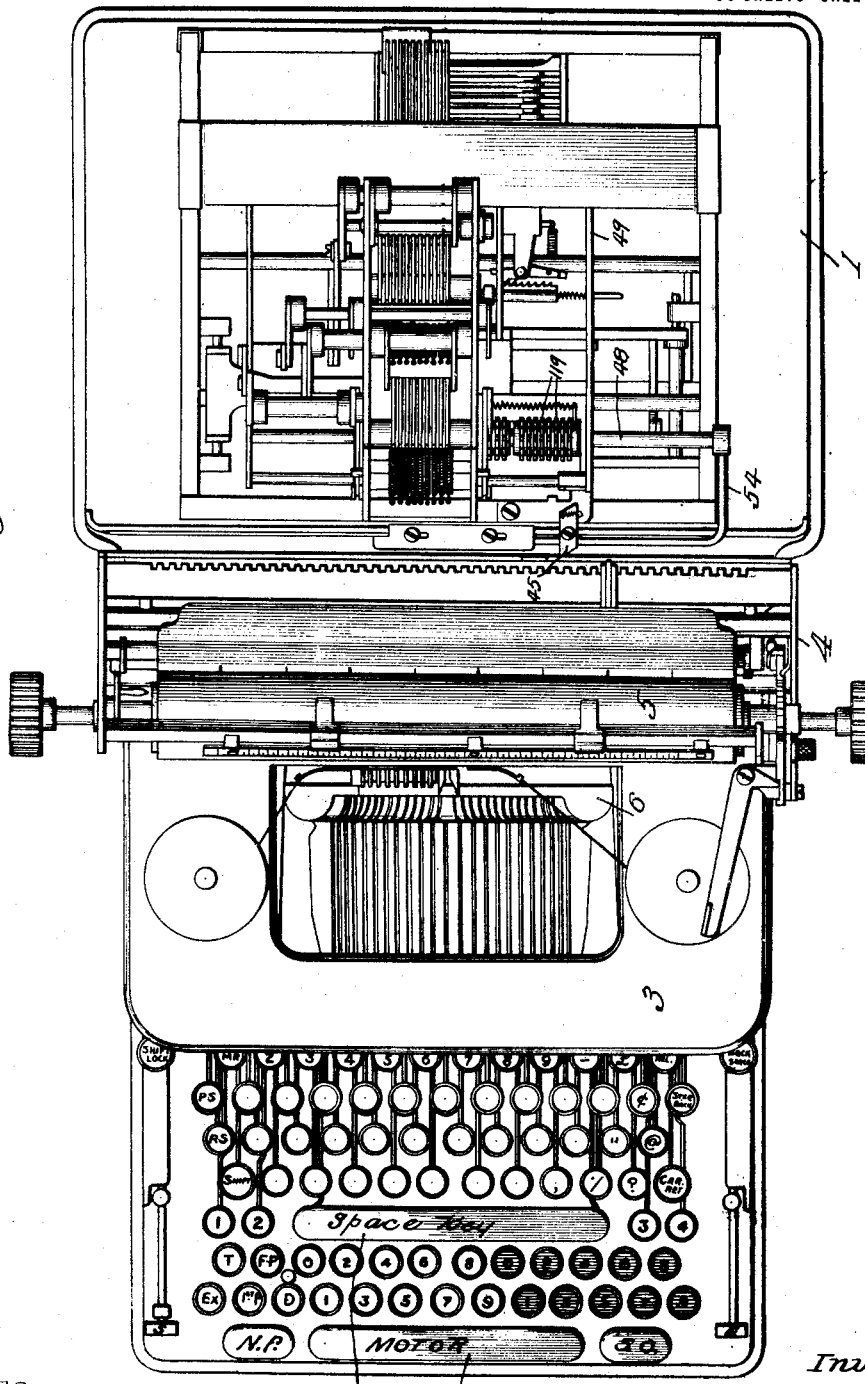
Figure 1 is a top plan view of my improved machine, the casing for the rear end of the machine being removed.

The key board of the combined machine as shown in Fig. 1 consists of the usual typewriter keys arranged in the upper banks and preferably above the space key 9 of the typewriting mechanism. The keys for the calculating machine are below the space key 9, preferably mounted in the base 1. Thus at the lefthand side of the key board are the result keys, having appropriate initials thereon to indicate their function as, for instance, "T" means "total" and when this key is depressed and the machine operated a total will be obtained from a group of forward totalizer wheels; "1st P." means "first product" and when this key is depressed, and the machine operated, the product or number standing in the rear totalizer, whether it represents a product or a remainder, will be obtained, but the pendants which represent the multiplicand or subtrahend will not be restored to normal position, but left so that they can be used again. "F. P." means "final product" and when this key is depressed and the machine operated, the product or number standing in the rear totalizer will be obtained, and at the same time the pendants, which represent the multiplicand, will be restored to normal position so that the multiplying devices will be cleared. This final product key is also used to obtain the remainder from the rear totalizer in the operation of subtraction and at the same time to restore the pendants to normal position, thereby clearing the mechanism of the number set up therein and which represents the subtrahend. "Ex." on the lefthand key in the bottom row, means "extend" and when this key is depressed and the machine operated, a number standing in one of the forward groups of totalizer wheels will be transferred or extended back into the pendants which will thereby be positioned to represent a multiplicand or a subtrahend as the case may be. "D." means "decimal" and when this key is depressed and adding key operated, a decimal will be introduced into the setting up devices of the machine. This "D" key is also employed to place the rear totalizer under control of the racks so that a number set up on the key board may be directly introduced into said rear totalizer, to the exclusion of any group of forward totalizer wheels, thereby rendering said rear totalizer primary in character. This "D" key has a full stroke in certain operations, and a half-stroke in other operations, for purposes which will hereinafter appear. The digit keys of the adding mechanism are shown in the key board as being white with black characters bearing numbers from 1 to 9, including the zero character, while the multiplier keys are of a distinguishing color preferably red and bear characters or numerals on their upper faces corresponding to the adding keys. There is also a subtraction key marked "S", shown at the left of the key board which is movable horizontally and a similarly horizontally movable error key, marked "E" which appears at the right of the key board. These keys and their connections correspond very nearly in purpose and function to similar keys in the French patent and Hopkins's application, before referred to, with the exception of the subtraction key which is not therein shown and described, but which is disclosed, in the main, in the Hopkins Patent No. 1,118,489, dated November 24, 1914.

Whenever a multiplier key is depressed, the motor, not shown herein, but which may be like that disclosed in Hopkins Patent No. 1,025,698, dated May 7, 1912, will, through mechanism such as disclosed in said patent, cause the operating shaft of the machine to be given two complete operations for all of the digit multiplier keys, except 1 and zero, these causing the motor to drive the operating shaft only one complete operation. There is a motor key marked "Motor" which, when depressed, will cause the operating shaft of the machine to make a complete operation as in introducing numbers into the totalizer wheels, taking totals, or performing other arithmetical computations. The key marked "N. P." (meaning nonprint) will also effect a complete motor operation of the main shaft, but the depression of this key disables the printing devices of the adding mechanism and effects an introduction of a number set up on the adding keys into one of the sets of totalizer wheels. The key marked "S. C." (meaning split cent) will, when depressed, effect a complete operation of the main shaft of the machine and cause the machine to operate in a manner similar to the split cent mechanism described in the Hopkins Patent No. 1,026,443, dated May 14, 1912.

The adding keys.

Referring to Figs. 4 and 5, 10 indicates the key shanks having buttons or heads at their upper ends, their lower ends being slotted and slightly upset, as shown in Fig. 9, to receive the ends of the key bars 11. These key bars are pivoted at 12 and have their rear ends bent so that they terminate under vertically movable bars 56, see Figs. 3 and 17. The forward ends of bars 11 are provided with downward extensions fitting in slots in a ball race 13 containing displaceable balls constituting a key lock. These balls are of such size and so arranged that the projection on each key bar is located practically between two balls and when the key is depressed the balls on each side of the projection will be laterally displaced and thus prevent the depression of any other key in the zone of this key locking mechanism. This ball race extends under the multiplier keys, see Fig. 10, and this constitutes an interlock between the multiplier keys and the adding keys. Whenever an adding key is depressed, it will raise one of the bars 56 and will also operate the pin carriage 58 containing setting up pins 63. This pin carriage is thus caused to be stepped leftwardly at each adding key operation, (except when the decimal key is depressed) so as to locate the elevated pin 63 under the stop pins 93 constituting the stationary field of stops. When the lowest digit of the number is set up on the key board, and the motor key depressed, carriage 58 will be bodily elevated to raise the pins 93 whereby when the racks 100 move forwardly they will be arrested in their excursions according to the position of its controlling pin 93. The operation of setting up numbers on the key board and introducing said numbers into a group of front register wheels 119, or into the rear register wheel 268, is the same in all essential particulars as that disclosed in French patent and in the Hopkins application before referred to.

Pin carriage escapement.

Referring to Figs. 18 to 21, 15 indicates a vertically disposed shaft having a gear segment 16 on its upper end entrained with a rack 17 on the carriage 58. 18 is an escapement wheel on shaft 15. 19 is a plate pivoted at 20 between brackets depending from the tracks 57 which support the pin carriage 58. These tracks are pivotally mounted on shaft 59. A spring 21 connected to a pin extending outwardly from the pivot shaft of plate 19 tends to hold the plate 19 downwardly at all times and in order to properly position plate 19 with respect to the escapement wheel 18, I arrange a post 22 on plate 19, which post normally rides upon the upper face of the escapement wheel. The free edge of plate 19 is provided with a comb plate 23, the teeth of which normally lie over shoulders on the upper ends of bars 56 so that whenever an adding key is depressed and a bar 56 raised, the plate 19 will be vibrated. Plate 23 is longitudinally movable with respect to the plate 19 and when so moved from its normal position, the teeth thereof will be displaced with respect to the bars 56 and consequently a key may be operated and a pin 63 in the pin carriage positioned without stepping the machine leftwardly. This displacement of the escapement mechanism occurs when the "D" key is depressed previous to operating the adding key as when introducing a decimal into the machine.

When the plate 19 is lifted by one of the bars 56, it will cause the fixed pallet 24, normally located under the escapement teeth, to engage one of said escapement teeth and hold the escapement wheel practically stationary during the down stroke of the adding key and while the upper end of bar 56, which is being operated, is lifting the pin 63 in its path. 25 is the movable or displaceable pallet pivoted to the down-turned flange of plate 19, said pallet having a slot through which the pivot screw passes and being connected to a spring 26 which tends to move said pallet leftwardly, as seen in Fig. 19. When the plate 19 is lifted and the fixed pallet engages the escapement teeth, the movable pallet is lifted out of engagement with the escapement teeth and when so disengaged will be actuated by the spring 26 so the inner end thereof will pass one tooth and be in position to engage another when the plate 19 is permitted to descend. Upon being released from the fixed pallet the escapement wheel 18, which is entrained with the carriage 58, will displace the movable pallet 25 the length of its slot and against the energy of spring 26. This movement of the escapement wheel is effected by means of the spring 58ª connected to carriage 58 and tending at all times to draw the same leftwardly. The movable pallet 25 has its inner lower edge beveled or inclined so as to permit the restoration of carriage 58 as in ordinary operations of the machine or by the error key.

*Printing mechanism.*

Referring to Figs. 12, 16, 38, and 39, 102 indicates the bars or levers pivoted on the shaft 106, each of these bars or levers being connected by a slot and pin connection to a rack bar 100. These bars or levers 102 have no vertical movement relative to said shaft. 102ª indicates the complementary bars or levers, there being a bar 102ª arranged alongside of each bar 102. The bars 102ª are also pivotally mounted on the shaft 106 and in ordinary operations of the machine, such as setting up a number on the key-board and introducing said number into one of the totalizers, the bars 102ª remain stationary, while the bars 102 operate. There is a slot in the upper end of each complementary bar 102ª which is designed to coöperate with a pin or lateral projection 217 carried by its companion bar 102, whereby when the bar 102ª is lifted to its fullest extent, as when the "E" or "final product" key is operated, the pin 217 will be caused to enter the slot whereby the complementary bars 102ª will move in unison with the bars 102. The bars 102ª have pivotally connected to their upper ends a member 231 which has a tooth 232 designed to coöperate with a series of notches in a segmental bracket 233 fixed to the frame work of the multiplying mechanism. The rear ends of bars 231 have lateral projections 234 (see Fig. 43) which extend on each side of the pendants 235. These pendants 235 are mounted to slide upon rearwardly extending portions 236 of the stepped stop bars 243; hence, whenever the pins 217 are engaged by the bars 102ª, the teeth 232 will be lifted out of the notches in their respective segments and, moving in unison with the bars 102, will slide the pendants on their respective bars 236, either to position said pendants to represent a number, as when the "E" key is depressed and the machine operated, or to restore said pendants to zero position, as when the "final product" key is depressed and the machine operated.

Each of the bars 102 has an ear or extension 102ᶜ which is connected by a link 30 to an arm 31 pivotally mounted on a shaft 32 arranged in the side frame plates 33 of the printing section, (see Fig. 12). The pivot pin connecting the link 30 and arm 31 forms a stud or shoulder which normally lies two spaces in advance of its complementary type carrying arm 34, (see Fig. 32). The arm 31 being connected to a rack must be operated at every movement of its controlling rack, but the complementary type carrying segment on arm 34 is not necessarily so operated,—the positioning of the type carrying segment being controlled by devices so that the printing mechanism may be disabled in certain operations, as by depression of the non-print key, or during multiplying operations when the tens and units partial products are being retained, and in subtracting operations. The purpose of locating the controlling stop shoulder at the joint between rod 30 and arm 31 two spaces in advance of arm 34, is to provide a lost motion, whereby when in non-printing position the type carrying members will be retracted or depressed below the printing point on the platen. Thus after making a printing impression the type carrying parts, by being so depressed, will expose the printed characters to the view of the operator.

In Fig. 34 I have shown one of the type carrying segments detached. The lower end of arm 34 is broadened so as to provide an extended support for a notched segmental rack 35, to the forward end of which is pivotally mounted a type carrying member 36. The upper or forward end of this type carrying member has arranged thereon solid or rigid type characters 37 representing zero 1, 2, 3, etc., to 9, the zero character being uppermost. The inner end of this pivoted type carrying member is connected to a spring 38 which tends to move said inner end up against a pin 39 on bar 34, thereby causing the outer or type carrying part to have a tendency at all times to move away from the platen. These springs 38 thus enable the rigid type to be given an impacting blow which will drive them against the paper after which the springs 38, catching them on their rebound, will hold them away from the paper. 40 indicates a floating type hammer pivoted on the end of arm 41, which arm is held forwardly by a spring 42. Arm 41 is provided with a rearwardly extending portion having a pin 43 which limits the movement of the floating type hammer in passing from its normal position to that in which it makes a printing impression. When the parts are in the position shown in Fig. 32, the floating type hammer rests against a cross arm or bar 44, and in this position, tends to swing the upper end of the type carrying member 36 inwardly toward the platen so as to move the same out of the line of sight of the operator. When, however, the floating type hammer moves with the type carrying part to the printing position shown in Fig. 33, the spring 38 acts on the type carrying part to move the upper end of the same outwardly, as shown in full line in Fig. 33. In this way, the type are prevented from contacting with the paper on the platen, but are enabled to make the rebounding blow above described.

In order to control the movement of the floating type hammer 40, whose excursion is limited to the full line position shown in Fig. 33, I mount a link 45 thereon and engage the rear or hooked end of said link with a pin or projection on the lower end of a restoring arm 46 carried by the lower end of rocking arms 47. These rocking arms are fixed to the shaft 32. This shaft has an arm 48 mounted upon one end thereof (see Fig. 30), which arm has a slot and pin connection with a lever 49 pivoted to frame plate 33, and having a roller 50 on its lower end, which roller normally lies out of the arc of movement of a cam 51 mounted upon cross shaft 86. Shaft 86 is rocked at every operation of the machine, and if the lower end of lever 49 is not restrained, roller 50 will bear upon the periphery of cam 51, and through the energy of spring 52 connected to the upper end of lever 49, will cause lever 49 to rock. Consequently, shaft 32 with its arms 47 and restraining and restoring bar 46, will also be rocked. The arc of movement of the bar 46, whenever it is rocked, comprehends eleven spaces—two spaces being consumed in permitting the arms 34, which bear upon the bar 47, to consume lost motion before they engage studs on rods 30, these two spaces bringing the zero type into printing line when such engagement occurs. Further movement by the type carrying element upwardly, as determined by the rod 30, will successively bring the printing characters from "1" to "9" into printing position. Bar 46 not only permits forward swinging movement of the arms 34, but also permits the upward swinging movement of the arms 41 carrying the floating type hammers 40, by riding under the curved hooked bar 45. The type hammers will move upwardly until arrested by a stop bar 52 carrying a guiding comb plate 53. When the bars 41 contact with the stop bar 52, floating type hammers 40 are arrested in printing position, and are now ready to print when "fired". It is obvious that the single bar 46 which permits the movement of the type carrier and floating type hammers, and simultaneously restores said parts to normal position, will not permit any independent movement or restoration of either of these parts to and from zero printing position, without the others. Of course, the printing type can move upwardly past zero printing position, but the floating type hammers will remain where they are arrested by the bar 52.

Means for firing the floating type hammers, that is delivering an impacting blow upon the lower ends thereof, so that type in the printing line will be caused to strike an impacting blow against the platen, consists of the plunger 60, there being one of such plungers in each column order and for each floating type. These plungers are slotted so as to be guided in their movement, and in addition coöperate with a comb plate 61. Springs 62 connected to the plungers and to a U-shaped plate carried by the lower end of bars 64, place the plungers under tension whenever the main operating shaft of the machine is making the first half of its stroke. This occurs when the type bars and floating hammers are being lifted to printing position. The means for operating the swinging bars 64, consists of slotted links 65 coöperating with a stud on each of said bars, (there being a link on each side of the printing section) which slotted links (see Fig. 30) are connected to arms 66 on shaft 81 (see Figs. 14 and 15). Bars 64 carry a rod 67 which normally restrains the plungers 60 against movement by lying in front of the shoulders on the lower edges thereof, but when the bars 64 are rocked, this restraining means 67 is moved away from the shoulders on the plungers, permitting the plungers to jump forwardly when released at the final movement of bars 64. The means for controlling the plungers is similar in principle to many well known printing devices for adding machines, one of which is depicted in the French patent and Hopkins' application before referred to. In the specific form of hammer release and control shown herein, there is an individual primary restraining pawl 68 for each plunger. These primary restraining pawls have a projection at the lower inner edges designed to fit into the recesses of plunger 60, and a projection at the upper rear ends which is engaged by a stud 35$^a$ on the rear end of the printing segmental rack. When the parts are in the position shown in Fig. 32, which is in normal position, the primary restraining pawl 68 is locked against movement. Pins 69 and 70 limit its movement. As stated before, there is a lost motion of two spaces between the arm 34 carrying the segmental rack 35, and the controlling stud on the connecting link 30. Thus if arm 34 is permitted to move into engagement with said stud, the stud remaining stationary, the printing type carried by arm 34 will be positioned with zero in the printing line. In this position, the stud 35$^a$ will engage the forward end of the primary restraining pawl 68 depressing the same so that all other primary restraining pawls to the right, or of lower order than the one so initially actuated, will be operated to release their respective plungers 60. This means of printing zeros to the right of the digit regardless of the denominational order of the digit, is well known in the art, and is accomplished by slitting the forward ends of the primary restraining pawls and bending one portion, 68ᵇ, laterally, to engage and operate the next adjacent primary pawl of lower order as shown in Fig. 33ᵃ. The rear ends of the primary restraining pawls are provided with shoulders or notches for coöperating with a hinged blocking plate 71 normally held forward by a spring 72. This plate has an outward extension which coöperates with a pin 73 on one of the bars 65. Thus when bar 65 is in its home position, plate 71 will be retracted out of engagement with the primary restraining pawl, but the instant bar 65 starts to move forwardly, pin 73 will be moved away from the plate, permitting it to engage the restraining pawls. As the rear ends of the restraining pawls are lifted, the plate 71, engaging the lowermost shoulders thereof, will hold the actuated restraining pawls in their disengaged position, and by entering the inclined recesses of the other restraining pawls which have not been actuated, will prevent such other restraining pawls from being accidentally displaced.

Means are provided for centering the printing type in the printing line, this means consisting of the bail 74 whose cross arm is designed to enter the notches in the segmental rack of the printing segments, and which bail is mounted on a rock shaft having an arm 75 provided with a stud or roller coöperating with a cam slot of cam 76 mounted on shaft 86 (see Fig. 30). This cam slot is so shaped that the centering bail is not brought into engagement with the segmental racks until just previous to the printing blows struck by the hammers, and said bail is then withdrawn upon the initial restoring movement of the bars so as not to interfere with the restoration of the printing segments.

Means are also provided for guiding the printing segments in their arc of movement, this means consisting of bail-shaped frame 77 having a comb 78 on its free end between the teeth of which the printing segments are guided. Bail 77 is held up by means of a latch bar 79 (see Fig. 35). This latch bar is provided with a roller or projection extending through a slot in one of the frame plates 33 whereby, as the arm 64 rocks forward, it will, upon approaching the limit of its forward movement, engage said projection 79ᵃ and unlatch the comb plate in time to permit its descent to escape the lower thickened portion of arms 34. The guiding comb 78 is depressed by forward extensions on the inner ends of its arms which lie under and engage rearward extensions on tappets 80. These tappets have their lower forward ends provided with inclined portions which are designed to be engaged by the restoring bar 67 on the arms 64. Tappets 80 lie under pins 85 on lifting plates 87, which lifting plates coöperate with the restraining means constituting the secondary and universal control of the plungers 60. This secondary restraining means is in the form of plate 88 pivoted on the side frame plates 33 and having its forward free end bent down so as to engage all of the plungers 60. Thus, even though the plungers 60 are initially released by the restrain-pawl 68, they will be trapped by the plate 88 and restrained from further movement until the type are moved to proper printing position, and the centering means therefor is in place; and finally as the bar 67 approaches the forward limit of its movement, it will engage the tappets and lift the restraining plate 88, thus releasing those plungers which have been initially released, permitting them to strike the floating type hammers, driving their lower ends against bar 90 constituting a stop which arrests the floating type hammers and prevents them from following the type to the platen. In other words, the floating type hammers will, upon being struck an impacting blow by the plungers, transmit that blow to the type carrying elements, swinging them on their pivots and cause the type in the printing line to deliver a rebounding blow on the platen, thus insuring a clean cut and clear type impression.

The movement of the type carrying elements starting from home position is as follows:

First, they will swing outwardly and upwardly until the zero type are in printing line, the continued upward movement then being described in practically a true arc of a circle. When the printing type is in line and the floating type hammers struck, the pivoted printing element will be moved to make a printing impression against the platen and immediately retracted by means of the springs 38. The floating type hammers, due to the necessary clearance, will cause the printing type, after the printing impression, to stand closer to the platen than they did on their upward or positioning movement. As the parts are restored to normal position, floating type hammers 40 will again permit the printing segments to move outwardly slightly until the lower ends of the type hammers strike bar 44, whereupon the type hammers will cause the type carrying elements to be moved inwardly closer to or under the platen. By thus moving the type hammers inwardly under the platen, they not only do not obstruct the view of the operator, but are in a position not to interfere with the type of the typewriting mechanism.

In certain operations of the machine, such as when the non-print key is operated, and in multiplication and subtraction, it is desirable that the printing mechanism be disabled. There are several ways shown in the accompanying drawings for rendering the printing mechanism effective or ineffective according to the operations being performed, but in every instance the control is through an arm 110 which normally lies behind the shoulder on the lower end of the lever 49, see Fig. 30, and when in this normal position, the roller 50 cannot follow the periphery of cam 51 and consequently said lever is not vibrated. It may therefore be said that the printing mechanism is normally disabled and can only be rendered effective by depressing the arm 110. This arm 110 is mounted on rock shaft 111 journaled on the side frame plates 33 between which frame plates the bars 11 of the adding keys pass, as shown in Fig. 32. There is a plate 112 secured to shaft 111 and lying over the bars 11, whereby when any one of said bars 11 is operated said shaft is rocked through the medium of the plate and the arm 110 depressed out of engagement with the lower end of lever 49. To render the printing mechanism effective, as in printing items to be introduced into the machine, it is necessary to hold the bar 110 depressed and this is accomplished by means of a tappet 113 which tappet is pivoted upon the end of an arm 114 loosely mounted on shaft 111. Tappet 113 normally lies behind an extension of the rod 64ª carried by the lower ends of the arms 64 (see Fig. 30). Pin 115 fastened in the arm 110 extends over the arm 114 and also over a rock arm 116 arranged on the end of a sleeve loosely mounted on shaft 111, the outer end of which sleeve carries a depending rock arm 565. Whenever the adding keys are operated the shaft 111 will be rocked by the movement of plate 112 and arm 110 will depress tappet 113 and locate the same under the post on arm 64, thus holding the arm 64 disengaged from the lever 49, as shown in Fig. 31ª. Consequently, when the cam 51 is rocked forwardly the lower end of lever 49 will have moved beyond the restraining influence of arm 110 before the lost motion occasioned by the slot and pin connection 65 will have been taken up and arm 64 is moved forwardly to release the tappet 113. As the arm 64 moves forwardly the post 64ª on the lower end thereof will ride off the tappet 113 permitting the parts to assume the position shown in Fig. 30 in which the arm 110 is again in readiness to engage and lock the lever 49 against movement.

*The total key.*

The principal parts operated by the total key are shown in Fig. 36 and these resemble in all essentials the total key operation of the French patent and Hopkins' application referred to. The total key is connected by a bar 170 to a bell crank 172 whose forward extension lies over pin 183 mounted on an arm 184. To this arm is connected a link 185 which coöperates with tappet 84 carried by the upper end of an arm 85. When the total key is depressed, through the mechanism just above described, tappet 84 is lifted out of the path of a pin 83 which is carried by one of the shifting cams 82, thus, even though the pin carriage has a number set up therein, it cannot be lifted to position any of the pins 93 in the stationary field of stops, whose raised position would interfere with obtaining a correct total. Bell crank 172 is connected to another T-shaped lever 173 by means of a link 174; the forward extension of said T-shaped lever lying over a pin 178 on the lower end of bar 113, which bar is connected to bell crank 114 and cam faced bar 110, which, when moved forwardly, will depress the frame 49 in which the forward totalizer wheels 119 are mounted. At the same time, the rearward extension 179 of the T-shaped lever, above referred to, will engage and lift the horizontal member of the bell crank lever 180—181 causing the cams 82—109 to be shifted to their central or neutral position. The wheels 118 having been drawn into engagement with the racks and the cams 82—109 having been shifted to their neutral position, the depression of the motor key will permit the racks, or such of them as are free to move, to travel forwardly until the register wheels are arrested in their zero position at which time the type will be properly positioned to print the total. By holding the total key down, the number so printed may again be introduced into its totalizer, or if the total key is permitted to rise, said totalizer will stand clear at the end of the total taking operation.

In order to render the printing mechanism effective during this total taking operation, I arrange an arm 117 on the end of shaft 111, which arm has a lateral extension or bent portion at its upper end lying in the path of an extension 172ª on bell crank 172 so that when the total key is depressed this extension 172ª will engage the bent portion of arm 117 and rock the shaft 111 and depress the arm 110, and with it the arm 114, locating the tappet 113 under the post on the end of arm 64. The bell crank lever 172 has also connected to it a rod 526 which operates a cam plate to prevent accidental displacement of the carrying segments during the total taking operations as described in Hopkins' Patent No. 1,026,443, dated May 14, 1912.

*First product key.*

In Fig. 37 I have shown the devices controlled by the so-called "P", or first product key, whose function, when depressed, is to obtain a record of the number represented in the rear register wheels 268, whether this number be in the nature of a product or minuend,—and when so obtained to leave the multiplicand or the subtrahend represented by the pendants 235 in their set up position. When this first product key is depressed, it will not elevate the levers 102ª to a position in which the notches in the upper end thereof will engage the pins 217 on the levers 102 and consequently the pendants 235 will not be restored. The bell crank 303 has an extension 303ª which coöperates with the bent portion of rock arm 117 on the shaft 111 to render the printing devices effective as in the case when the "T" or total key is operated. The operation of the first product key for obtaining the total, product, or minuend, as the case may be, in the rear totalizer wheels 268 performs, in the present instance, an additional function of locking the carrying segments 129 against displacement, this being accomplished by means of a rod 305 operated by the rearwardly extending member of the bell crank 307. This rod 305 is connected to a rock arm 306 on the end of a rock shaft 308 which rock shaft carries a plate 309 which plate is bent or flanged at its free edge so as to engage under the bell cranks 130 of the carrying mechanism, thereby locking said bell cranks to the carrying segments 129. This particular form of carrying mechanism herein shown is described in an application filed by me May 20, 1916, Serial No. 98,853, and I do not deem it necessary to enter into a detail description of the same here.

*Final product key.*

The function of this key is similar to that of the "P" key of the French patent and Hopkins' application, referred to, in that in obtaining a record of the number represented by the rear totalizer wheels 268, the levers 102ª are caused to engage the pins 217 and move the levers 102, thereby restoring the pendants 235 to their zero position. The locking plate 309, before referred to, is operated upon the depression of this final product key and the printing mechanism is rendered effective by the extension 303ᵇ coöperating with the bent portion of arm 117 when this final key is depressed as heretofore described with respect to the total and first product keys.

*The extension key.*

The parts operated by the "Ex." or extension key are illustrated in Fig. 39, but these are different in purpose and function from the parts operated by the "E" key of the French patent. In the present instance, when a number is set up on the key board, it may be directly translated to the pendants 235 and at the same time simultaneously introduced into one of the groups of forward totalizer wheels 118; or, if the "T" key is depressed in conjunction with the "E" key, the number set up on the key board may be transferred back to the pendants 235 without being introduced into one of the forward groups of totalizer wheels; or, if the "D" key is depressed in conjunction with the "E" key the number so extended back to the pendants 235 will be registered in the rear totalizer wheels 268. This extending operation by depressing the "E" key alone or in conjunction with the "T" or "D" keys causes the complementary levers 102ª to be lifted and engaged with the pins 217 on the levers 102; hence the pendants 235 may be positioned to represent a number in the nature of a multiplicand or subtrahend as the case may be.

The bar operated by the "E" or extension key is indicated at 325, Fig. 39, which bar is connected to a rock arm 326 having an upward extension 326ª designed to coöperate with the bent portion of frame 117, whereby upon the operation of the "E" key the number transferred back to the pendant, whether or not introduced into the front or rear totalizers, has a record made thereof.

The rock arm 326 in the present instance is not provided with an extension for depressing the link 185 so as to disable the pin carriage lifting mechanism, as in the operation of the "E" key in the French patent, but like the "R" key of said French patent, the link 185 is permitted to remain in its normal position whereby its controlled tappet 84 will lie in the path of the pin 83, whereby the number set up on the key board may be introduced into the front totalizer in the normal operation of the machine; but if the "T" or "D" keys are depressed in conjunction with the "E" key, the number will not be registered in the forward totalizers (T. and E.), but the number will be registered in the rear totalizers (D. and E.).

The means for lifting the complementary levers 102ª so as to cause their upper ends to engage the pins 217 on the levers 102, whereby both levers will move in unison to position the pendants 235, is the same as that disclosed in the French patent and comprises a link 328 which connects the arm 326 to a bell crank lever 329. The rearward extension of this bell crank lever lies under the pin 222 on an arm 221 fixed to a rock shaft 220 on which shaft is arranged a plate 219 having an overhanging portion 219ª at its forward or free end. This overhanging portion, together with the forward edge of plate 219, engages the curved fingers 218 on the lower ends of levers 102ª. Hence, when the "E" key is depressed, the levers 102ª are lifted so that their upper ends will engage the pins 217 for the purpose of positioning the pendants as before described.

When the "E" key alone is depressed after a number is set up on the key-board, and the machine operated, the cams 82—109 remain in their first position and consequently the number transferred back to the pendants is also registered in one of the forward totalizers,—the machine in registering the number in one of the forward totalizers in this instance operating in the same manner, so far as introducing the number into one of the forward totalizers is concerned, as if the "E" key had not been depressed. However, when the "T" key is depressed in conjunction with the "E" key, the cams 82—109 will be moved to their second or neutral position in which the pin carriage lifting mechanism is disabled and consequently a number set up on the key-board will be transferred back into the pendants without being registered in either the forward or rear totalizers; and when the "D" key is depressed in conjunction with the "E" key, the cams 82—109, being moved to their third position will cause the number transferred back to the pendants to be registered in the rear totalizer to the exclusion of the forward totalizer.

*Decimal key.*

The "D" or decimal key, in the present instance, performs the function of the "D" key of the French patent before referred to and by making it a half stroke key, it will perform the function of the decimal key of the Hopkins Patent No. 1,118,489 dated November 24, 1914. There is, however, in the present instance a different form of escapement mechanism than is disclosed in either of the patents just referred to and consequently the bell crank 341, see Fig. 40, which is operated by the "D" key is provided with an extension 341ª which, in addition to operating the arm 117, also engages a pin 342 on a bell crank 343 connected to a link 344 in turn connected to a bell crank 345 coöperating with a rock arm 346 fixed to a shaft 347. This shaft is mounted in the frame plates 33 of the printing section, see Fig. 20, and carries an arm 348 at its opposite end, which arm lies in front of the comb plate 23, before referred to, whereby when the "D" key is depressed the comb plate 23 moves longitudinally so that different teeth are displaced relative to the bars 56 and the escapement mechanism will not be operated when a digit is set up on the key board to represent a fraction.

*Locking the cams in shifted positions.*

The cams 82—109 are slidingly mounted on shaft 81 and their position is controlled by the bell crank lever 180—181. In the French patent cam 109 was provided with a quadrant which operated in the notches of a post. This construction has been found unsatisfactory, because the inequalities of manufacture prevent perfect registration in all instances. I have, therefore, provided a different construction for locking the cams in their shifted position, consisting of a stud 188 (see Fig. 16) on which is slidingly mounted a sleeve 189′, said sleeve having V-shaped notches in its outer end. The inner or opposite end of this sleeve is provided with a grooved block 189ª to receive the quadrant 109ª of cam 109, and consequently the sleeve will move upon its post in all laterally adjusted positions of the cams 82—109.

190 indicates a locking finger pivoted to a plate 190ª mounted on the stud 188, which latter is secured to the frame of the machine. Finger 190 is operated by a pin 191 on an arm 109ᵇ which arm is connected to cam 109 by a sleeve and operates in unison therewith. Finger 190 is provided with a beveled lower edge so that when depressed it will enter one of the grooves of sleeve 189′, depending upon the previous lateral adjustment of the cams, and will center the cams 82—109 and will lock said cams in their adjusted positions. The upper curved surface of the locking finger 190 is slightly eccentric to the shaft 81, and consequently as the pin 191 travels thereover it will be gradually depressed and finally locked in a groove in the sleeve 189. This construction is advantageous in motor driven machines which are not only speeded up for quick operation, but frequently are subjected to the manipulations of quick operators. Sometimes an operator will press a result key, thereby shifting cams 82—109, and before the cams reach their intended shifted position, the motor key will be operated and the cams locked. In the instance of the fixed post, as disclosed in the French patent, injury would result or the motor would be thrown out, whereas in the present case enough time is given by the gradual depression of the locking finger 190, to center the cams and bring them to proper position, although the result key might not be fully depressed when the motor key was initially operated. The cam 82 which controls the restoration of the carrying segments 129 in the French patent, before referred to, coöperates with swinging tappets on the lower ends of the rods 138 which restore the carrying segments. In my present construction, I provide two plungers 140 on the lower ends of rods 138, which, respectively, restore the carrying segments identified with the front and rear totalizers, depending upon whether the cam 82 is in its first or third position. The inner ends of these plungers are beveled, as shown in Fig. 16ª. Plungers 140 are pressed inwardly, or toward each other, by flat springs 141 assisted by a coil spring 142. When the cam 82 is rocked forwardly, its shoulder 145, which normally lies immediately behind the plunger 140 on the lower end of rod 138 identified with the carrying segments of the forward totalizers, will press said plunger in its path laterally, to one side, shoulder 145 engaging the beveled end of the plunger in doing this. This action results when the cam is in its first position. When the cam is in its second or neutral position, it is located between the plungers and will therefore not operate either plunger when rocked. When the cam is in its third position, its shoulder 145 will engage the plunger on the rod 138 which controls the restoration of the carrying segments identified with the rear totalizer wheels 268. Upon the initial movement of the cam 82 when its shoulder 145 is located behind either of the plungers 140, the plunger operated by the shoulder will be moved laterally and held retracted by the side face of the cam until the cut-away portion 146 of the cam passes the plunger, at which time the plunger will be projected by its spring over the cut-away or heel portion 146 of the cam. As the cam starts rearwardly, the totalizer wheels 119, or 268 as the case may be, are thrown into mesh with the racks 100 and out of mesh with the carrying segments 129. The heel portion 146 of the cam will, upon the initial rearward movement of the cam, pass under the plunger lying therebehind and raise the rod 138 carrying such plunger and in this manner restore the segments 129 during such initial movement of the cam. This restoration takes place before any of the racks commence their forward movement. The purpose of the high portion of the heel 146 is to give the rod 138 a slightly excessive restoring movement to insure the proper latching of the segments 129. When the cam reaches its foremost position, the plunger will drop in front of the shoulder 145 in readiness for another operation, in which position the rod 137 which lies under the forwardly projecting extensions at the upper ends of the carrying segments 129, (see Fig. 12), will be moved out of engagement with said extensions to permit the carrying segments to move to their proper set position in readiness to be again tripped.

Non-print key.

The non-print key indicated at 350 in Fig. 5 is connected to a rock shaft 351 to which the motor key and split cent keys are also connected whereby when this non-print key is depressed, it will operate the motor clutch to effect an operating stroke of the machine. This non-print key is also connected to a key bar 352 (see Fig. 31) which is mounted on the rock shaft and operates a lever 353 whose forward end is bent laterally so as to engage the locking lever 110 and locate the same behind the bar 49 in the event the locking lever is depressed; or if the locking lever 110 is in engagement with the bar 49, to prevent its disengagement therefrom during the time that the non-print key is depressed. In the operation of the non-print key, a number may be set up on the keyboard and registered in the totalizer wheels without being recorded. The non-print key is a motor controlling key, but in addition to rendering the motor effective, also prevents operation of the printing devices.

Interlock between the total taking keys.

When the "T" key is depressed it moves the cams 82—109 to the central or neutral position and when the "F. P." key is depressed, said cams will be moved to the third or righthand position. It is obvious that confusion would result if, when the "T" key was operated, the "F. P." key was depressed, and vice versa.

In Figs. 5 and 6, I have shown an interlock comprising a pivoted member 165 having its forward end bent up and provided with an inclined portion lying under the total key bar 170 so that when the total key is depressed, the plate 165 will be rocked on its pivot. There is another plate 300 provided with a bent up portion at its forward end having an inclined face which coöperates with the final product key bar 301. A link 166 connects the rear end of plate 165 with plate 300 and a spring 167 tends to draw said plates together at all times. However, when either bar 170 or 301 is depressed it will engage the inclined face of plate 165 or 300 and swing the forward end of said plate laterally whereby, through the connecting link before mentioned, the companion plate will likewise be swung laterally so as to move under the key bar and thereby prevent the untimely operation of said last mentioned key bar. The plate 300 is provided with a recess forming a shoulder which shoulder is designed to be located under the bar of the decimal key whenever either of the total keys 170 or 301 is depressed. This limits the movement of the decimal key to its half-stroke which is desirable in cases where machines are constructed without the first product key, as the final product key can be fully depressed, the decimal key depressed half way and the machine operated to produce the same result as if the first product key was present and depressed. The shanks of the result keys, shown in Fig. 9, are recessed so as to coöperate with the plate 400, this plate having a bar 401 extending across the machine to connect with another plate 402. This latter plate is connected to a bell crank lever 403 operated by the split cent key. This plate forms an interlock when any one of the keys associated therewith is depressed. In Fig. 8, I have shown a modified form of key mount for the adding and multiplier keys in which there is a post 405 having a threaded stud at its lower end and a slot across its upper end by which it may be screwed into the base casting 1. There is a threaded bore in the upper end in which fits the screw 406. There is a transverse bore 407 for receiving a stud 408 on the key bar 11, said stud having a reduced annulus whereby when the stud forming the pivotal support for the key bar 11 is inserted in position and the screw 406 turned therein, it will hold the stud 408 in place. In this manner, the key bars and their supporting posts may be removed or introduced into position from above.

*Release and step-back keys.*

These keys, the parts operated by which are shown in Figs. 22 and 25, are decimating keys and for convenience are mounted in the keyboard of the typewriting machine, being marked respectively, "Rel." (meaning release) and "Step back". Each key is connected to a key bar 150 having a pin 151 on its rear end which lies under the forwardly projecting upper ends of bell crank levers 152 whose lower ends are connected to links 153. The parts just described are duplicates of each other in order to simplify manufacture, as the duplicate parts can be made from the same die. The release key when operated will, by virtue of the connections above described cause a rock arm 154 to rock a shaft 155 carrying an arm 156 connected to a vertically movable and rocking bar 365. The upper end of this bar coöperates with two pawls 289 and 298 and the escapement teeth on shaft 269, which pawls control the escapement of the shaft 269 on which the wheels 268 of the rear totalizer are mounted. This escapement mechanism for the rear totalizer wheels in permitting their step-over movement leftwardly in multiplying operations is substantially the same as that disclosed in the French patent. When the step-back key is operated, it will lift the bar 365 and disengage pawls 289 and 298 from the shaft 269, permitting said shaft to return one step toward its normal position at the right. This partial restoration of the shaft to the right is incident upon the multiplication of any number containing more than one decimal by a number containing more than one decimal, there being two clearing racks in the present machine whose purpose and function is similar to the clearing racks of the French patent. Where a multiplicand or multiplier contains digits aggregating more than two decimals, as for instance, when multiplying 10.55 by .45, the wheels 268 will be stepped over leftwardly in the operation of multiplication, but in obtaining the record of the whole number in the product, it is necessary to operate the step-back key a number of times equal to the aggregate number of decimals in the multiplicand and multiplier. In the present example, there are four decimals and the result will be that the whole number printed will be "4" unless the split cent key is operated, in which event the number printed will be "5" if the split in the mills is over four. This step-back key operates upon the bar 365 by lifting it upon its pivotal support on the arm 156, so as to disengage the pawls 289 and 298 and permit shaft 269 to be stepped back one space toward the right. The step-back key will be operated as many times as there are decimals in the multiplicand and multiplier. To illustrate, if 14.8 was to be multiplied by .6, the product would be 8.88. The operation of multiplication would step over the wheels 268 two spaces and if the multiplicand and multiplier, or either of them, contain two decimals the release key must be operated a number of times equal to the decimals in the multiplicand and multiplier, otherwise the product would be printed as "888" (a whole number); but when the release key is operated, the two decimals will be eliminated, (or treated as a whole cent in the extension if the split cent key is depressed) and be located over two clearing racks at the right which are not provided with type. These clearing racks form no part of my present invention and as they are fully shown and described in the French patent, before referred to, further description herein is believed to be unnecessary.

*Locking the forward totalizers in position.*

The forward totalizer wheels 119 are divided into groups, there being a number of wheels in each group equal to the number of actuating racks or decimal racks depending upon the character of work desired. These totalizer wheels are mounted upon a shaft 48 slidingly arranged in a pivoted frame 49, a spring 50$^a$, (see Fig. 13) being employed to normally move the shaft 48 leftwardly. There are teeth 48$^a$ on shaft 48 which coöperate with a pallet lever 47 operated by an arm 46 carrying a tappet 45 at its forward end which tappet coöperates with adjustable blocks on the laterally movable paper carriage in a manner similar to that disclosed in the French patent. There is also a rod 54 connected to the shaft 48 whereby the groups of forward totalizer wheels may be returned to their normal or starting position when the paper carriage is moved leftwardly. The rod 54, at or near its point of connection to the shaft 48, coöperates with the slotted end of lever 500 (Fig. 28) which lever is carried by the rear end of a hollow rock shaft 501. The forward end of this shaft carries a crank handle 502 which is provided with indicating numbers intended to be displayed through a sight opening in the front plate of the machine which numbers "1", "2", and "3" mean that the first, (lefthand), second (middle), or third (righthand) group of totalizer wheels 119 are in coöperative relation with the actuating racks. This crank handle 502 is connected to a notched segment 503 and the notches in this segment coöperate with the upper end of a vertically movable plate or bar 504. This bar is held normally displaced by a spring 505 and carries a pin 506 at its lower end which coöperates with the cam face of a horizontally sliding bar 507, the latter having a pin 508 at its rear end which coöperates with a cam $509^a$ mounted on a shaft $262^a$ which shaft is connected to a pinion $263^a$ coöperating with a segmental gear $264^a$ identified with the multiplying mechanism, (see Fig. 22) as in the French patent before referred to. Whenever the power shaft of the machine is operated for any purpose the cam 509 will be vibrated and plate 504 lifted into one of the notches of the segment 503, that is, the reception of the upper end of plate 504 into a notch in segment 503 depends upon the proper operative position of a group of totalizer wheels 119. If said totalizer wheels, for any reason, are not in proper operative position, the bar 504 cannot be raised and consequently the motor will be automatically thrown out. On the other hand, if cam 509 is permitted to make its stroke with the freedom which it is intended it shall enjoy in the normal operation of the parts, then during such stroke the groups of forward totalizer wheels 119 will be locked against any lateral movement relative to the actuating racks until said racks shall have completed their movement.

There are times in the operation of the machine when the locking of the forward totalizer wheels against lateral displacement shall extend beyond one complete operation of the power shaft, as in multiplying, where, as stated before, the power shaft makes two complete operations in multiplying any number by the digit running from "2" to "9" inclusive. While the forward groups of totalizer wheels do not receive or accumulate the tens and units partial products incident to multiplying operations (wheels 268 are the product wheels), yet it is obvious that wheels 119 must be locked against any movement which might interfere with the proper operation of wheels 268 during the two consecutive operations of the machine incident to introducing the tens and units partial products into the wheels 268. I therefore provide a stud 509 on the bar 561 which is operated by the multiplier keys ranging from 2 to 9, which stud coöperates with a lever 511 pivoted on the base of the machine, (see Fig. 26), the outer end of which lever coöperates with a bell crank lever 512, (see Fig. 22), having a notched forward end coöperating with a pin 513 on bar 507. By this construction, whenever the bar 561 is operated by any of the multiplier keys, it will place the bell crank 512 in position to engage and lock the bar 507 in its forward position during two complete operations of the machine whenever a multiplier key from 2 to 9 inclusive is depressed. When the zero or one (1) multiplier key is depressed, only one operation of the machine is necessary; therefore neither of these keys operates the bar 561.

The bar 504 is provided with a cam projection which coöperates with a pin on the plate 8, before referred to, so that whenever the bar 504 is lifted into the notch in the segmental rack 503, meaning that the adding machine is performing an operation, the typewriter key bars 7 must be locked, otherwise the escapement of the paper carriage with the adjustable stops or blocks mounted thereon, and which are in control of the adding machine parts, might interfere with the proper operation of the adding mechanism by the untimely release or positioning of certain parts thereof. I therefore permit plate 8, which has a spring connected thereto to move the same forwardly, to move forward and engage all racks $7^a$ on the typewriter key bars 7, thus locking them and the space key of the typewriting mechanism against movement whenever the adding machine mechanism is operating.

So, likewise, when the shift key of the typewriting mechanism is operated to lift the frame in which the type bars of the typewriting mechanism are mounted to cause upper case type or other characters to be printed and which would so position the type bars of the typewriting mechanism that they would interfere with a movement of the type bars of the adding machine mechanism to printing position, I provide a lever 514 having an extension over the lifting frame in which the typewriter type bars are mounted, whereby the lower end of said lever, (see Figs. 22 and 29), which is bent forwardly under the segment 503, will be located above the bar 504 and block its entrance into any one of the notches of the segment 503.

The shaft 501, before referred to, is made hollow so as to receive a push shaft 515, the rear end of which coöperates with a lever 516 whose upper end is designed to engage a pin 517 arranged in an extension of the bell crank 47. Thus when this push rod 515 is vibrated the bell crank 47 carrying the pallets of the escapement mechanism for the shaft 48 will be operated so as to release said shaft and permit the groups of forward totalizer wheels 119 to be stepped leftwardly substantially the same as if tappet 45 was vibrated. This manual control of the forward totalizers stepping them leftwardly by means of the vibrating shaft 515, or restoring them to their home position by means of the shaft 501 is disclosed in Hopkins Patent No. 1,118,489, dated November 24, 1914.

*The motor key.*

The motor key in the present machine is indicated at 525 (see Fig. 7) and is mounted upon the ends of two arms 526 carrying pins 527 lying over the forward ends of bell crank levers 529 connected to rod 530. One of the arms 526 carries an upward extension on its forward end having a cam face which coöperates with a bar 531 to move the same rearwardly into the ball race so as to lock all of the keys controlled by said race against depression during the time that the motor key is depressed. One of the bars 526 is also provided with a hook 526ª which normally passes up through a notch in a locking bar 532, said locking bar constituting the lock for the non-print and split cent keys so that when the motor key is depressed neither the non-print nor split cent keys can be operated, and vice versa. The means for operating this bar comprises a pin 533 on the shank of the motor key bar which coöperates with the cam face of a lever 534 (see Fig. 4), which lever is connected to the locking bar 532 to move the same to and from locking position.

The motor key bar (see Fig. 10) operates a short link 530ª which connects it to the rock arm 535, (see Fig. 22) mounted on a rock shaft carrying an arm 536 having a pin 537 on its end lying under the bar 504. Thus, if the bar 504 is blocked against movement either by the non alinement of the notches in the segments 503 or by the interposition of the bell crank lever when the shift key of the typewriter mechanism is operated, (see Fig. 29), the motor key cannot be depressed; but if the motor key is depressed, the above mentioned parts permitting such operation, then the bar 504 will lock the groups of forward totalizer wheels against displacement independent of any movement of the bar 507.

The long link or rod 530, which is operated by the motor key, is connected to a bar 538, (see Figs. 26 and 44) which has a cam face whose function is to lift the motor release bar 539 and by locating the upper horizontal edge of the bar 538 under the pin on the motor releasing bar, said motor releasing bar will be held elevated and the motor will continue to make revolutions until bar 538, or some companion control of the motor bar 539, is displaced. The bar 538 is drawn rearwardly by a spring 540, but is locked in its forward position by a sliding latch plate 541 which coöperates with a notch 538ª in the lower edge of the bar. A flat leaf spring 542 mounted on a post secured in the base of the machine, tends to hold the latch inwardly at all times, and when the bar 538 is drawn forwardly, this latch will drop into the notch and lock the bar 538 in its forward position and the bar 539 elevated. The means for releasing the latch comprises an arm 189 mounted on a shaft 81, (see Fig. 14) the lower end of which arm, in addition to restoring the error key rack, is provided with oppositely inclined faces to coöperate with a bent-up portion 541ª on the latch bar 541, which bent-up portion is also provided with oppositely beveled edges (see Fig. 26), so that as the arm 189 swings rearwardly, it will pass outside of the beveled extension 541ª, but on its return or forward movement, due to the beveling of the edges of the contacting parts, said bar will pass on the inside of said projection forcing the latch 541 outwardly, thereby releasing the bar 538 and permitting the spring 540 to retract the same and allow the motor bar 539 to descend and to operate the clutch of the motor. 543 indicates a bell crank lever having one end fitting into a notch in the lower edge of bar 530, the opposite end of said bell crank lever being bent upwardly so as to normally register with a notch in the lower edge of the error key bar 544 (see Figs. 26 and 53). This error key bar is connected to the error key by means of a rod 545 and when the motor key is depressed, the bell crank 543 locks the error key against movement; likewise, when the error key is moved rearwardly, the notch passes out of registration with the bent end of the bell crank lever 543 and consequenty the motor key cannot be depressed when the error key is in other than normal position.

In Fig. 14, I have shown the upper end of a link 495 which is operated from the crank shaft of the motor. This link is connected at its upper end to an arm 496 on the rock shaft 81. In order to establish full home position of the link 495, I arrange a spring pressed bar 497 with which said link coöperates as it is completing its stroke, said bar having a pin 498 which engages the link. There is a heavy spring 499 connected to the bar 497 to pull the same forwardly at all times and straighten up the link 495 as the motor is completing its operation.

*The error key.*

The error key is located at the righthand side of the machine (see Fig. 3) and comprises a key head arranged on the forward end of rod 545, above described, the rear end of which rod is connected to the bar 544. This bar has an upward extension at its forward end which is designed to engage and move rearwardly a rack 197 which rack is entrained with segmental gear 73 on the lower end of the escapement shaft 15 (see Fig. 53). This rack 197 is also provided with a shoulder 198 which is designed to be engaged by the rocking arm 189, whereby the translating pin frame may be restored from the operating shaft of the machine through the movement of the arm 189, or it may be independently restored by moving the error key rearwardly. The arm 189$^b$, which is rocked forwardly at each operation of the machine, carries an extension 189$^c$ at its lower end which extension coöperates with a plate (not shown here) to release the motor key on the forward movement of the arm 189$^b$. On its rearward movement, arm 189$^b$ will engage the shoulder 198, and restore the rack 197 to its home position, if said rack has been moved forwardly, the restoring movement of the rack being slightly in excess of the home position of the carriage so as to fully restore all the parts to normal position in readiness for another operation. This error key bar 544 is also provided with a shoulder 544$^a$ which is designed to coöperate with a lever 546 extending across the machine, and whose opposite end (see Fig. 17) coöperates with a latch plate 547 which engages the notches in the links moved by the result keys so that if a result key is depressed, the error key can be operated to release the depressed result key.

In order to accomplish the release of the result keys, as above indicated, the left hand end of lever 546 is provided with an upward extension 546$^a$ which lies under the free end of the latch plate 547. This latch plate is, in the normal operation of the machine, operated upon the rocking of shaft 81, so as to release any of the depressed result keys at about the time said shaft completes its forward rocking movement, but when the error key is operated, the plate is lifted by the projection on the lever 546. In Fig. 36, I have shown the link 174 as being provided with a projection 174$^a$, which, when said link is pulled forward by the operation of the total key, will pass in front of the plate 547 (see Fig. 53$^b$) and lock the total key depressed until the shaft 81 is rocked, or until the error key is operated, to lift the plate 547 from behind the shoulder. Other links pulled forward upon the depression of the other result keys, and which have projections corresponding to the projections 174$^a$ just described, (see "First product key," Fig. 37; "Final product key," Fig. 38; "Extend key" Fig. 39; and "Decimal key" Fig. 40); will also be locked forward by the plate 547, until released as above described. In Fig. 53$^a$, I have shown the left hand end of lever 546, and its relation to the latch plate 547.

Of course, those keys, such as the subtraction key, the non-print key, the multiplier keys, and the split cent key, the depression of any one of which will operate the motor clutch and effect an operation of the machine, without necessitating an additional depression of the motor key, are not "set" in the sense that they position parts to be subsequently operated by the motor key, such as the adding keys, and the result keys; consequently, the operation of any of these motor controlling keys will lock the error key against operation and, as stated before, the occupation by the error key in a position other than normal will lock the motor controlling keys against movement.

*The split cent key.*

The depression of the split cent key, which is a motor controlling key, effects the following: the link 550, which is connected to this key, and pulled forwardly whenever the split cent key is depressed, (see Figs. 10 and 47) is connected at its rear end with a bar 551 which bar has a shoulder 551$^a$ on its upper edge which shoulder is designed to engage the lower edge of a swinging plate 552 whereby a pin 553, projecting forwardly from said plate, will lift the end of a lever 554. The purpose of this lever is to operate a rock shaft 555, (see Fig. 17) and pull down the rod 185 to lift the tappet 85 out of the path of pin 83 on cams 82. The split cent key bar, (see Fig. 47), like the bars connected to the multiplier keys, is provided with a latch 557 on its rear end which latch normally engages a shoulder on the lower end of the split cent plate 257$^x$ which, as described in the Hopkins Patent No. 1,026,443, before referred to, while arranged in the group of multiplying plates, has no shoulders or projections for lifting the cross bars 247. However, when the bar 551 is drawn forwardly, it will move the lower end of plate 257 forwardly, which plate will rock an L-shaped frame 255, and its comb plate 253, (see Figs. 43 and 49), the free edges of which frame and plate lie in front of all of the multiplier tens key plates, the zero and "one" multiplier key plates, the subtraction key plate, and the split cent key plate. Thus, whenever any of the keys controlling these plates is operated, the frame 255 will be rocked. There is an end plate 254 carried by this frame which end plate carries a pin 256 which engages a slot in the rear end of complementary motor bar 561. This bar 561 is thus caused to be moved forwardly whenever the subtraction key, a multiplier key, or the split cent key is operated. This bar 561 is provided with a pin 562 designed to coöperate with the cam face of a lever 570 pivoted to a post on the base of the machine (see Fig. 27), the free or forward end of said lever lying under the pin on the motor bar 539, so that whenever bar 561 moves forwardly the motor bar will be operated. The forward end of the bar 561 is provided with a pin 564 which engages the bell crank lever 565 (see Figs. 30 and 31), the other member of said bell crank lever lying under the pin 115 which is carried by the locking lever 110. The purpose of this construction is to lock the lever 110 up into engagement with the lower end of lever 49 whenever bar 561 is moved forwardly so as to prevent any operation of the printing devices in this position of bar 561. Bar 561 is further provided with a pin 566 which coöperates with a tappet 567, said tappet lying under a lever 568, (see Fig. 26) which lever at its opposite end coöperates with bell crank 180 which shifts the cams 82—109 to their third position whenever the split cent key is depressed.

I have heretofore described how the operation of this bar 561 will operate lever 511 (see Fig. 26) so as to move the bell crank 512 to lock the bar 507 in its forward position.

Bar 561 is also provided with a pin 569 which coöperates with bell crank 276$^a$ carrying the links 276$^b$ which are designed to operate as described in the Hopkins Patent No. 1,026,443, before referred to.

I do not deem it necessary to describe in detail the operation of the split cent key and the function it performs in causing the totalizer wheels 268, after registering a product containing decimals, to record and compute said decimals as whole numbers. It might be mentioned that in drygoods houses and other business institutions whose bills contain items in yards and fractions of a yard, the price per yard being so many cents and so many mills, or fractions of a cent, to carry out the extensions as whole numbers, splitting the cent at some point, usually between four and five mills, i. e., if the number of yards multiplied by the price per yard is four mills or less, the extension is carried out and the mills omitted or eliminated; whereas, if the computation resulted in a decimal of five mills or more, the extension would be carried out as a whole cent, and this is the subject matter of one of the Hopkins patents, before referred to, and therefore need not be described in detail here.

Multiplying mechanism.

In the French patent and Hopkins application, before referred to, the operation of multiplication is performed by setting up either directly or through the control of the extend key a number which is represented by the pendants 235. These pendants are positioned over vertically movable bars 247 which coöperate with the tens and units multiplying plates 257 and 280 respectively. In so far as my present machine is concerned, the parts just above mentioned may be in all respects similar to those of the French patent. In the French patent, however, when the pendants 235 are moved to represent a number and a multiplier key is operated, the vertical vibration of bar 259 will lift first the tens and then the units multiplying plates, said plates being guided at their upper and lower ends so as to partake of a rectilineal reciprocal movement carrying with them on their upward movement the bars 247 and such of the pendants 235 as might be in their paths so as to locate the stepped stop bars 243 in proper position to determine the forward movement of the racks 100 through the pins or stop projections 242. In the Hopkins Patent No. 1,118,489, dated November 24, 1914, is shown a modified form of multiplying mechanism disclosed in the French patent, in which Hopkins Patent No. 1,118,489, the multiplying plates are rocked on a pivot shaft so as to control the position of the stepped stop bars 243.

In my present construction, I have shown the tens and units multiplying plates whose lower ends are shifted so that they will be successively placed under control of the lifting bar 259. Bar 259 is reciprocated vertically at every operation of the machine through the medium of the link 260 connected to a crank arm on shaft 262$^a$ carrying the pinion 263$^a$ which is driven by the segmental gear 264$^a$ (see Fig. 22). Each of the multiplier keys shown in Figs. 3, 7, and 10 is connected by a bell crank lever 250$^a$ to rods 250, which rods are in turn connected to bars 251. Thus, whenever a multiplier key is depressed the bar 251 connected therewith is pulled forwardly. Each of the bars 251 is provided with two notches, shown in dotted lines in Fig. 27, which are designed to coöperate with a plate 580 pivoted in suitable brackets extending up from the base of the machine, said plate extending over all of the multiplier key bars (see Fig. 47) and being provided with an extension 581 projecting over a lug with an inclined face extending up from the auxiliary bar 561, whereby when any bar 251 is drawn forward, the bar 561 moving in unison therewith, will withdraw its support from under the lug 581, permitting the plate 580 to drop into the notches of the bars 251, (that is, into the forward notches of the bars 251, which have not been moved, and into the rearmost notch of the actuated bar 251). In this manner, the actuated bar 251 is temporarily locked in its forward position until, by the operation of the motor, the tens plate is caught and lifted by the vertical vibration of the bar 259. The bar 561 is provided with a pin 566 (see Fig. 27) which lies under the inclined face of a lifting arm 567, the outer end of said arm being located under a lever 568, said lever being pivoted to the frame of the machine at 568ª. The opposite end of this lever is provided with a pin which lies over the horizontal end of bell crank 180—181, (see Fig. 17), so that whenever the bar 561 is pulled forwardly, upon the operation of any of the multiplier keys, the bell crank 180—181, will shift cams 82—109 to their third position, so as to place the wheels 268 under control of the racks.

When the lever 568 is raised, as above described, it will also operate a lever 554, (see Figs. 17 and 26) so as to disable the carriage lifting mechanism as described in connection with the split cent key.

The bars 251 are also provided with shoulders similar to the shoulder on the split-cent key bar 551, and which shoulders assist in swinging the plate 552 and operating the lever 554. Each of the multiplier bars 251 is provided at its rear end with a pawl 252 which is normally located behind the shoulder 257ᵈ on the lower edge of each tens multiplying plate 257 (see Figs. 43 and 48), so that when a multiplier key is depressed, the particular tens multiplying plate controlled thereby has its lower end pulled forward, as shown in Fig. 45, and through the medium of the L-shaped frame 255 will cause the supplemental motor bar 561 to be drawn forward whereby the lever 563 is lifted so as to raise the motor bar 539 to start the motor.

Referring now to Fig. 51, it will be seen that the lower edges of the subtraction plate, the zero multiplying plate, the plate operated by the "1" multiplier key, the split cent plate, and all of the tens multiplier plates of the remaining digits lie behind a comb plate 253, which comb plate is mounted in the head plate 254 carried by the L-shaped swinging plate 255 pivoted on the rod 256' heretofore described. This L-shaped plate is cut out to receive the comb plate as shown in Fig. 49 and practically forms a continuation of the comb plate in coöperating with the subtraction, zero multiplier keys, and the split cent key. Thus, whenever a subtraction key, a zero multiplier key, the "1" multiplier key, the split cent key, or a tens digit multiplier key from "2" to "9" inclusive, is operated, the plate 253 will be swung forwardly so that the head plate 254, which is connected to the auxiliary motor bar 561, will be moved forward so as to lift the motor bar 539 and operate the machine. There is some lost motion in the connections between the depression of any of the above mentioned keys and the auxiliary motor bar in order that the tens multiplier plates, the subtraction plate, etc., may be located over the lifting bar 259 before the motor starts its operation. Each tens multiplier plate is provided with a shoulder 258 (see Figs. 43, 45 and 48) which, when the lower end of said plate is pulled forwardly by the depression of a multiplier key, is located over the bar 259 whereby upon the operation of said bar the plate will be raised to engage and lift the bars 247 and the positioned pendants 235, a distance determined by the shoulders on the upper edge of the lifted plate. The principles of operation of the multiplying mechanism disclosed in the accompanying application are substantially the same as those shown and described in the Hopkins French patent; but in order to give a brief explanation of that construction, it may be stated with respect thereto, and to the present construction, that whenever a tens multiplying plate is lifted, the shoulders on its upper edge will engage and lift all of the bars 247 lying in their respective paths, so that as bars 247 are lifted to varying heights, they will carry with them such of the pendants 235 as may be located thereover,—the pendants having been previously positioned to represent a number. The pendants 235 normally lie over the rearmost bar 247, shown at the right in Fig. 43, and are raised by zero shoulders on the shifted tens and units multiplier plates whenever either of said shifted plates are lifted one step to place the rearmost shoulders on bars 243 in front of stops 242 on the racks 100 permitting said racks to move forwardly slightly to assume the zero position. The tens multiplier plates in lifting the forwardly positioned pendants 235 will position the stepped stop bars 243 controlled by said pendants so that said stepped stop bars will control the racks 100 by permitting their forward movement until they are arrested by the pin 242 (see Fig. 41). Pin 242 in this instance is located two spaces behind (and above) the zero shoulder of the stepped stop bar 243 for the purpose of enabling said rack 100 to move forward to bring the zero type into the printing line as before described.

The tens stop bars only select the tens partial product of any number multiplied by a digit, positioning the stepped stop bars accordingly. For instance, if 654 was to be multiplied by "9", the number "654" would first be transferred back to the pendants 235, after which the "9" multiplier key would be operated. The tens partial products of "654" multiplied by "9" are "543" which number is introduced into the wheels 268. After the tens partial products are introduced into the wheels 268, said wheels are stepped leftwardly one space so that when the units partial products (456) are introduced into said wheels, they will be added to the tens partial product so that the wheels 268 will stand to represent the complete product. This may be represented as follows;

*Example.*

```
 654
   9
 ---
 543  registered on first operation of machine.
 456  registered on second operation of machine.
 ---
5886  complete product registered.
```

Each tens multiplier plate 257 is provided with a notch 257$^a$ which coöperates with a bar 259$^a$, which bar engages and locks the multiplier plates against vertical movement when they are in their retracted or normal position. However, when the plates are shoved forwardly off of the bar 259$^a$ and onto the bar 259, the plate so positioned will be lifted to obtain the tens partial products, as above described. As stated above, only one operation of the shaft 81 is necessary when the subtraction plate, the zero multiplier plate, the "1" multiplier plate, the split cent key plate, and the tens digit multiplier plates from "2" to "9" inclusive, are shifted, and for this reason, the lower ends of these plates are located opposite or immediately in the rear of the teeth of comb plate 253 (see Fig. 51) so that whenever any of the lower ends of any of these particular plates are shifted forwardly, the L-shaped plate 255 will be rocked forwardly on its shaft 256'. In addition to shifting the bar 561 forwardly so as to operate the clutch release of the motor through the bar 539, as shown in Fig. 47, (the lever 570 pivoted to a bracket secured to the base plate of the machine being lifted by the pin 562 on the bar 561 engaging its cam surface, the forward end of the lever being located under the cross pin in the upper end of the motor bar 539 and lifting said motor bar to release the motor clutch when the bar 561 is moved forwardly) the forward rocking of the frame 255 will, by means of the bar 254$^a$ carried by its lower end (see Fig. 54), operate a lever 407 pivoted to a bracket secured to one of the cross pieces of the framing of the machine. This lever has a rearward extension at its upper end lying in the path of movement of the inclined face 406 of the subtraction plate 405 (see Fig. 54) so that if the subtraction plate is operated, it will, when raised, rock the lever 405 to move the bar 561 forwardly. In being restored to its normal position, the lower end of lever 407 will rock the frame 255 rearwardly so as to shift the bar 561 rearwardly and permit the motor clutch bar 539 to descend when the shaft 81 has completed one rocking stroke.

The above description applies to the operation of the bars 561 when the subtraction plate is shifted. When any of the other plates requiring but a single operation of the shaft 81 are shifted, they will also rock the frame 255 forwardly so as to shift the bar 561. The lower end of the shifted plate which has been lifted by the bar 259 is located above the comb plate 253, carried by frame 255, and consequently does not interfere with the rearward rocking of the L-shaped frame 255. As the shifted plate descends, it is drawn rearwardly by its spring, the slot in the rear end thereof being slightly wider than the thickness of the locking bar 259$^a$ so as to permit an easy reëngagement between the shifted plate and the locking bar 259$^a$.

As shown in Fig. 45, the plate 253 is pivotally mounted under the rearwardly extending portion of the L-shaped frame 255, and is held upwardly against the lower face of the frame 255 by means of a spring 253$^a$ (see also Figs. 49 to 51). By this construction, the plate which is being lowered, can engage the teeth of comb plate 253 and depress the same slightly without rocking the frame 255. Each tens multiplier plate has a companion units plate which must be subsequently operated, and means for effecting this with respect to the "2" to "9" tens multiplier plates inclusive, (the 0 and 1 multiplier plates have no controlling tens plate because there are no tens partial products resulting from their operation) is a projection 261, which projection contacts with a controlling plate 262 arranged in its path. This controlling plate is normally held with its forward end depressed by means of the spring 263. There is one of these controlling plates for each one of the tens multiplier plates whose operation is to be followed by the operation of a units multiplier plate. A rod 264 limits the rocking movement of the controlling plate 262. A bar 265 engages notches on the lower edge of each plate whereby said plates are held in their rocked position. When the tens multiplier plate 257 is raised, its shoulder 261 will engage a controlling plate 262 and rock the same so that a lateral projection 262$^b$ thereon will be brought into contact with the cam face of a projection 280$^a$ on the companion units multiplying plate 280, causing the said companion units multiplying plate to be swung forward and held out of engagement with the bar 259$^a$. The units multiplying plate 280 is provided with a pivoted shoulder plate 281 which, when the bar 259 descends, is swung on its pivot until the bar 259 is located therebeneath, whereupon, upon the next vibration of said bar, the units multiplier plate will be lifted to position the stepped stop bars 243 and obtain the units partial products which are registered in the wheels 268 and added to the tens partial products previously registered therein. A spring 557ᵈ draws the tens multiplier plate back out of engagement with bar 259 when the bar 260 registers with the notch therein. The units multiplier plate 280 coöperates with a rocking comb plate 290 (Figs. 42, 43, and 48) having spaces between the teeth of which the tens multiplier plates are intended to pass, but the teeth of which are designed to be engaged by the units multiplier plates, whereby said comb plate will be rocked by a units multiplier plate when it reaches its highest position. This comb plate is connected by a link 291 to a lever 292, which lever, or pair of levers, carry the latch bar 265. Thus, when the cam plate is operated, the latch bar 265 is depressed out of engagement with the notch in plate 262, which, being released, swings back to its normal position, so that when the units plate descends its spring 280ᵇ will draw it backward when its notch registers with the bar 259ª. The units multiplier plates pass between the teeth of the comb plate 253 and therefore cannot in any way interfere with the release of the motor bar 539, which release at the end of this second operation of the machine, being effected, by means of the lever 511, bell crank 512, and pin 513 on the bar 507 whose pin 508 coöperates with a cam 509ª operated by the multiplying mechanism, in the manner heretofore described in connection with the operation of the bar 507 which locks the forward totalizers against movement while the multiplying mechanism is making its second stroke to introduce the units partial products into the wheels 268.

It will be observed from the description heretofore given that the forward shifting of any one of the tens multiplier plates and certain of the other plates mentioned which lie in front of the teeth of comb plate 253, will locate the shoulders of said plates over the lifting bar 259 and at the same time push the bar 561 forwardly so as to lift the motor bar 539 and effect an operation of the shaft 81. The bar 561 will remain forward and hold the motor bar 539 elevated for a second operation of the shaft 81, during which the units plate is lifted, except in the instance of the subtraction plate, and consequently only one operation of shaft 81 will result when the subtraction key is operated. The means for moving the shaft 561 rearwardly before the end of the second operation of the main operating shaft 81 in multiplying operations becomes effective when any one of the units plates is raised.

Referring to Fig. 48, it will be seen that the tens plate has a short projection 257ᶜ extending forwardly from the head portion thereof, while the units plate has a relatively long projection 280ᶜ extending forwardly from the head portion thereof. The projections 257ᶜ of all of the tens plates extend under a cross bar 359ª (see Fig. 43), which cross bar is riveted to a vertically movable bar 357ª guided in the frame pieces of the multiplier section. The upper end of this bar is provided with a slot 357ᵇ (see Fig. 42) which slot coöperates with a lever, not shown herein, but which is designed to position the stops controlling the decimal rack bars, as disclosed in said French Patent, No. 383,719 and United States application No. 310,739, before referred to.

The shoulders 280ᶜ on the units multiplier plates, lie under a cross bar 297ª carried by a vertically movable bar 295ª (see Fig. 43ᵇ) whose upper end carries a tappet 293ª for coöperating with the product register stepover mechanism necessary in the operation of multiplication, as fully set forth in the French patent and said United States application before referred to. The lower end of this bar 295ª carries a pin or lateral projection 295ᵇ operating in a slot in a link 276ᵇ, the lower end of which is connected to a bell crank lever 276ª (see Fig. 43ª) having a slot in its lower end for engaging the pin 569 on the bar 561. By this construction, whenever a units plate is lifted, it will carry with it both cross bars 297ª and 359ª together with their vertical bars 357ᶜ and 295ª and consequently, when the pin 295ᵇ reaches the upper end of the slot in the link, bell crank 276ª will be operated and the bar 561 moved rearwardly. In moving rearwardly, the bar 561 will permit the spring connected to lever 511 (see Figs. 3 and 26) to operate said lever so that its outer end will engage the bell crank 512 and lift its forward extremity from behind pin 513 or bar 507. Thus, whenever the bar 561 is in its rearward position at the end of a single or double multiplying stroke, the bar 507 will be released and the forward totalizers unlocked. The plate 580 is also depressed until the operating shaft has started to lift the units multiplier plate. The object of so locking the multiplier key down is to insure the second operation of the machine.

*The subtraction key.*

The subtraction key 400 is in the form of a push rod located at the left-hand side of the machine and at its rear end is connected to a bar 401 (see Fig. 54), which bar has a beveled inclined rear end to coöperate with the bell crank 180—181 so as to shift the cams 82—109 to their third position when the subtraction key is pressed rearwardly and thus place the wheels 268 under control of the racks 100. The bar 401 also rocks the lever 402, which lever operates the bar 403 having a pawl 404 at its rear end similar to the multiplying key bars. When the subtraction key is pushed rearwardly, bar 403 is moved forwardly so as to cause the pawl 404 which engages a shoulder at the lower edge of the subtraction plate to move said lower end of the subtraction plate 405 forwardly and cause its shoulder 406 to be located over the lifting bar 259. This subtraction plate will also rock the L-shaped frame 255 forwardly and cause the bar 254ᵃ carried by the head pieces 254 and on which the comb plate 253 is pivotally mounted to engage the lower end of lever 407, thus moving the upper hooked end of said lever rearwardly so as to locate the same in the path of the inclined upper face of shoulder 406. When the subtraction key is pressed rearwardly and the L-shaped frame 255 is rocked, as above described, the bar 561 will be moved forwardly so as to lift the motor bar and effect an operation of the machine. As subtraction as herein performed requires only one operation of the machine, it will be observed that when the subtraction plate is lifted, the inclined upper edge of the shoulder 406 will engage the upper end of lever 407 and force the L-shaped plate 255 rearwardly and with it the bar 561. This insures but one operation of the machine and avoids complications which might arise if too quick operation of the machine were by any chance made possible in performing computations involving subtraction.

I do not deem it necessary to go into a detailed description of how subtraction is performed as the same is fully set forth in the Hubert Hopkins Patent No. 1,118,489 dated November 24, 1914, this method of subtraction being followed in the present machine.

I claim:

1. The combination of letter printing elements and adding mechanism, of means operated by said adding mechanism for locking the letter printing elements against operation during the time that the adding mechanism is being operated.

2. The combination of letter printing elements and adding mechanism, of means operated by the letter printing elements for preventing the operation of the adding mechanism when the letter printing elements are being operated.

3. In a calculating machine, the combination of a plurality of independently operable totalizers, a total key for controlling the total taking operations of each of said totalizers, and an interlock between the total keys whereby when one of said keys is operated to obtain a total from one totalizer the other is locked against movement.

4. In a calculating machine, the combination of a ball race containing balls, a plurality of keys coöperating with said balls, whereby, upon the operation of one of said keys, said balls are displaced to lock the remaining keys against movement, other keys, locking devices for such other keys, which locking devices are independent of said balls, and a key having means for operating said balls and said independent locking devices, whereby when said last mentioned key is operated, all of the before mentioned keys are locked.

5. In a calculating machine, the combination of a laterally movable pin carriage, means for positioning the pins in said carriage to represent whole numbers and decimals, an escapement mechanism for said carriage comprising a vibrating plate carrying fixed and movable pallets, and a displaceable comb plate connected to said vibrating plate, in combination with means for displacing said comb plate to prevent operation of said pallets, whereby said pin carriage cannot be operated while decimals are being set up therein.

6. In a calculating machine, the combination of a laterally movable pin carriage, means for positioning the pins in said carriage to represent whole numbers and decimals, an escapement mechanism for the carriage comprising a vibrating plate carrying fixed and movable pallets, and a displaceable comb plate connected to said vibrating plate, said comb plate being normally in position to be operated by the pin positioning means, and means for displacing said comb plate whereby the pin positioning means may be operated to position the pins in said carriage without operating said comb plate.

7. In a calculating machine, the combination of digit keys and their operated bars, of a laterally movable pin carriage whose pins are designed to be positioned by said key operated bars to represent whole numbers and decimals in said carriage, a vibrating escapement plate, pallets carried thereby, an escapement wheel coöperating with said pallets for controlling the movement of said pin carriage, said escapement plate carrying an element having projections normally in the paths of movement of said key operated bars, and means for displacing said element whereby said key operated bars may be operated to position the pins in the pin carriage without operating said escapement plate.

8. In a calculating machine, the combination of an adding mechanism, type carriers which are normally inoperative, means for positioning said type carriers, restoring means for said type carriers, type hammers or plungers for coöperating with positioned type carriers, independent restoring means for said type hammers, and means coöperating with the restoring means for the type carriers for preventing movement thereof.

9. In a calculating machine, the combination of adding mechanism including totalizer wheels and actuators, a keyboard for controlling the excursions of movement of said actuators, type carriers normally locked against movement, and means operated from the keyboard for releasing said type carriers to place them under control of said adding mechanism.

10. In a calculating machine, the combination of adding mechanism comprising totalizer wheels, actuators therefor, and a keyboard for controlling the excursions of said actuators, type carriers which are normally locked against operation, said type carriers being controlled by said actuators, and plural means in control of said type carriers to release the same and permit a record being made of certain operations of the machine.

11. In a calculating machine, the combination of adding mechanism comprising a totalizer, actuators therefor, and a keyboard comprising result keys, adding keys and multiplier keys, type carriers which are normally locked against operation, and plural means operated by the adding and result keys respectively whereby when any of them is operated the said type carriers will be released, and means, whereby when said multiplier keys are operated said type carriers will remain locked.

12. In a calculating machine, the combination of adding mechanism comprising a totalizer, actuators therefor, and a keyboard for controlling the excursions of said actuators, type carriers the position of whose type is determined by said actuators, means for normally locking said type carriers against operation, said last mentioned means comprising a locking lever, and plural means coöperating with said locking lever to release said type carriers.

13. In a calculating machine, the combination of registering wheels, actuators therefor, means for restoring said actuators, type carrying arms which are designed in certain operations to be placed under control of said actuators, but which, in other operations are locked against movement during the excursions of the actuators, locking devices for said type carrying arms, means for releasing said locking devices, restoring means for the type carrying arms, plungers for effecting a printing impression, and restoring means for said plungers.

14. In a calculating machine, the combination of register wheels, actuators therefor, means for determining the excursions of said actuators, restoring means for said actuators, type carrying arms, which, in certain operations of the machine, are placed under control of the actuators, floating type hammers whose initial movement in the printing position is under control of said type carriers, plungers for coöperating with said floating hammers to make a printing impression, and restoring means for said type hammers, type carriers, floating hammers, and plungers.

15. In a calculating machine, the combination of register wheels, actuators therefor, means for determining the excursions of movement of said actuators, type carriers which may be placed under control of said actuators, floating hammers capable of conjoint movement with the type hammers to zero printing position, means for arresting said floating hammers in zero printing position, plungers coöperating with said floating hammers to effect a printing impression of the position type, restoring means for the type carriers and floating hammers, and independently operated restoring means for the plungers.

16. In a calculating machine, the combination of register wheels, actuating mechanism therefor, means for determining the excursions of movement of said actuators, type carriers which may be controlled by said actuators, a platen, said type carriers being normally located below the printing point on said platen, floating type hammers coöperating with said type carriers and being capable of movement therewith to position together with said type carriers to print zeros at the printing line, means for arresting said floating hammers at the zero printing position, plungers for coöperating with said floating hammers to effect a printing impression, means for initially releasing the plungers to be operated, means for finally releasing the plungers to be operated, restoring means for said plungers, restoring means for said type carriers and floating hammers, and restoring means for said actuators, all of which restoring means are operated from a common source of power.

17. In a calculating machine, the combination of adding mechanism, printing mechanism controlled thereby, means for normally locking said printing mechanism against movement, a key, in control of said locking means and connections operated by said key for preventing accidental displacement of said printing mechanism locking means when said key is operated.

18. In a calculating machine, the combination of adding mechanism, printing mechanism controlled thereby, means for normally locking said printing mechanism against movement, a total key and its connections, which latter include releasing devices for said locking means.

19. In a calculating machine, the combination of register wheels, actuators therefor, carrying segments coöperating with said register wheels, swinging latches for releasing said carrying segments when the register wheels move from "nine" to zero, a key and its connections which latter include means for locking said latches against movement when said key is operated.

20. In a calculating machine, the combination of two or more groups of register wheels, of actuators therefor, of a cam for determining which group of register wheels shall be placed under control of said actuators, and means for locking said cam in adjusted positions, said means comprising a notched member movable with the cam, and a pivoted member operated by the cam whereby said pivoted member is caused to engage a notch to lock said cam in its adjusted position.

21. In a calculating machine, the combination of two or more groups of register wheels, actuators therefor, separate total keys and their connections whereby the totals may be obtained from each group of register wheels, and an interlock between said total keys whereby when one of said total keys is being operated to cause one of said groups of register wheels to yield its total, the other of said total keys will be locked against movement.

22. In a calculating machine, the combination of a group of register wheels and an escapement mechanism coöperating therewith, whereby said wheels are automatically stepped over as in the operation of multiplication, a manually operable step-back key coöperating with said escapement mechanism whereby said register wheels may be stepped back one step at a time, and a release key coöperating with said escapement mechanism whereby when said release key is operated, said register wheels are returned to their normal or home position.

23. In a calculating machine, the combination of groups of totalizer wheels and their actuators, means for placing a selected group of totalizer wheels under the control of said actuators, and locking means for preventing accidental lateral displacement of said selected group of totalizer wheels when out of engagement with said actuators.

24. In a calculating machine, the combination of letter printing elements, a movable frame in which the same are mounted, adding mechanism having recording devices associated therewith, said adding mechanism comprising groups of totalizer wheels and their actuators, means for placing a selected group of totalizer wheels under control of said actuators, and means operated by said movable frame for preventing the operation of the adding mechanism when said frame is moved to a certain position.

25. In a calculating machine, the combination of groups of totalizer wheels and their actuators, a notched segment operable in conjunction with said groups of totalizer wheels, a bar designed to coöperate with the notches of said segment whereby a selected group of totalizer wheels is alined with said actuators, and means for operating said bar.

26. In a calculating machine, the combination of groups of totalizer wheels and their actuators, of a notched segment operable in conjunction with said groups of totalizer wheels, a bar designed to coöperate with the notches of said segment whereby a selected group of totalizer wheels is alined with said actuators, and means designed to be interposed between said notched segment and said bar for preventing the operation of the latter.

27. In a calculating machine, the combination of groups of totalizer wheels and their actuators, a notched segment operable in conjunction with said groups of totalizer wheels, a bar designed to coöperate with the notches of said segment whereby a selected group of totalizer wheels is alined with said actuators, and plural means for operating said bar.

28. In a calculating machine, the combination of two sets of totalizer wheels, swinging frames in which they are mounted, respectively, bars connected to said frames, said bars carrying yielding plungers having inclined beveled inner ends, a cam for coöperating with said plungers whereby said frames are rocked to cause one or the other sets of totalizer wheels to be brought into mesh with their actuators, actuators for said totalizer wheels, and means for shifting said cam to its different positions.

29. In a calculating machine, the combination of tens and units multiplying plates, a vibratable bar for successively engaging and operating said plates, means for shifting said plates from an inoperative to an operative position, and a locking bar for holding said plates in an inoperative position.

30. In a calculating machine, the combination of tens and units multiplier plates which are normally in an inoperative position, an actuator for said plates, and means for shifting the lower ends of the tens multiplier plates into operative position wherein said shifted plates are placed under control of said actuator.

31. In a calculating machine, the combination of tens and units multiplier plates, means for shifting the tens multiplier plates to operative position, means on said tens multiplier plates for shifting the companion units multiplier plates into operative position, and lifting means for successively coöperating with said plates.

32. In a calculating machine, the combination of multiplier plates provided with notches, a bar normally located in said notches to prevent operation of said plates, a lifting bar, and a shoulder on said plate for engaging said lifting bar when said plate is disengaged from the first mentioned bar.

33. In a calculating machine, the combination of a shiftable tens multiplier plate having a projection, a rocking member coöperating with said projection, a units multiplier plate which is shifted by said rocking member, and means for successively operating said shifted plates.

34. In a calculating machine, the combination of a tens multiplier plate and its companion units multiplier plate, means for shifting said tens multiplier plate in operative position, means on the tens multiplier plate for shifting its companion units multiplier plate in operative position, means operated by said shifted units multiplier plate for disengaging the same from the operating means.

35. In a calculating machine, the combination of a tens and a units multiplier plate, a lifting bar designed to successively coöperate with said plates, manually controlled means for shifting the tens multiplier plate in operative relation to said lifting bar, means on said tens multiplier plate for placing the units multiplier plate in operative relation to said lifting bar, and means operated by said shifted units multiplier plate for disengaging the same from said lifting bar.

In testimony whereof I hereunto affix my signature in the presence of two witnesses, this 27th day of July, 1916.

OTTO THIEME.

Witnesses:
M. P. SMITH,
M. A. HANDEL.